United States Patent
Matsumoto et al.

(10) Patent No.: US 10,029,731 B2
(45) Date of Patent: Jul. 24, 2018

(54) WORK VEHICLE

(71) Applicant: Kubota Corporation, Osaka-shi (JP)

(72) Inventors: Koichiro Matsumoto, Sakai (JP); Shoichiro Nagaishi, Sakai (JP); Ryo Matsumoto, Sakai (JP); Hiroshi Kawabata, Sakai (JP); Hiroki Nagai, Sakai (JP); Masahiro Izumi, Sakai (JP); Masaki Takaoka, Sakai (JP); Tasuku Teraoka, Sakai (JP); Takashi Kumashiro, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 15/368,909

(22) Filed: Dec. 5, 2016

(65) Prior Publication Data
US 2017/0158242 A1 Jun. 8, 2017

(30) Foreign Application Priority Data

Dec. 7, 2015 (JP) .................................. 2015-238752
Apr. 26, 2016 (JP) .................................. 2016-088383

(51) Int. Cl.
B62D 21/09 (2006.01)
B62D 25/08 (2006.01)
B60R 16/04 (2006.01)
B62D 27/02 (2006.01)
B60K 11/08 (2006.01)
B60K 17/22 (2006.01)
B62D 25/12 (2006.01)
B60K 26/02 (2006.01)
H01M 2/10 (2006.01)

(52) U.S. Cl.
CPC .............. *B62D 21/09* (2013.01); *B60K 11/08* (2013.01); *B60K 17/22* (2013.01); *B60K 26/02* (2013.01); *B62D 25/084* (2013.01); *B62D 25/12* (2013.01); *B62D 27/02* (2013.01); *H01M 2/1083* (2013.01); *B60Y 2200/223* (2013.01); *B60Y 2304/05* (2013.01); *H01M 2220/20* (2013.01)

(58) Field of Classification Search
CPC .. B60K 1/04; B60K 5/02; B60K 11/08; B60R 16/04; B62D 21/09; B62D 25/084; H01M 2/1083
See application file for complete search history.

(56) References Cited

U.S. PATENT DOCUMENTS 5,678,648 A * 10/1997 Imanishi ................ B60K 11/08
180/68.1
5,873,224 A * 2/1999 Murakawa ............. A01D 34/64
56/11.4
(Continued)

FOREIGN PATENT DOCUMENTS

JP 2011126531 A 6/2011
JP 2013139229 A 7/2013

Primary Examiner — Frank B Vanaman
(74) Attorney, Agent, or Firm — The Webb Law Firm

(57) ABSTRACT

A work vehicle includes a prime mover unit disposed in a front part of the vehicle body, a driving part located in a rear part of the vehicle body, a battery disposed between the prime mover unit and the driving part, a base frame disposed in a lower part of the vehicle body and a center pillar that extends upward from the base frame. The prime mover unit includes a radiator disposed immediately forward of the center pillar.

34 Claims, 28 Drawing Sheets

(56) References Cited

U.S. PATENT DOCUMENTS

| | | | | |
|---|---|---|---|---|
| 6,318,485 B1* | 11/2001 | Osuga | ............... | B60K 17/08 |
| | | | | 180/312 |
| 2005/0011684 A1* | 1/2005 | Uemura | ............ | A01D 69/00 |
| | | | | 180/6.24 |
| 2006/0279086 A1* | 12/2006 | Kishibata | ........ | H01M 2/0245 |
| | | | | 290/31 |
| 2009/0004554 A1* | 1/2009 | Reed | ............ | B60R 16/04 |
| | | | | 429/97 |
| 2012/0018237 A1* | 1/2012 | Kovach | .......... | H01M 2/1083 |
| | | | | 180/68.5 |

* cited by examiner

WORK VEHICLE

CROSS-REFERENCE TO RELATED APPLICATIONS

This application claims priority to Japanese Patent Application Nos. 2015-238752 and 2016-088383 filed Dec. 7, 2015, and Apr. 26, 2016, respectively, the disclosures of which are hereby incorporated in their entirety by reference.

BACKGROUND OF THE INVENTION

Field of the Invention

The present invention relates to a work vehicle such as a tractor.

Description of Related Art (1) First Related Art

As one example of a work vehicle, there is a tractor disclosed in JP 2011-126531A. This tractor includes: a vehicle body frame; a prime mover unit disposed in a front part of a vehicle body; a driving part disposed in a rear part of the vehicle body; and a battery disposed between the prime mover unit and the driving part, and is also provided with a center pillar (a frame structure) that has a partition part and left and right supporting frame parts made of die cast aluminum, and that is divided into three portions. This center pillar partitions the storage space in the front part of the vehicle body into a first space that is a front space disposed on the same side as the prime mover unit, and a second space that is a rear space disposed on the same side as the battery.

In this tractor, the center pillar made of die cast aluminum is divided into three portions so that a step supporting part that supports left and right front ends of a boarding step, a battery supporting part, an attachment seat that supports a hydraulic controller for power steering, and so on can be integrally installed to the center pillar, and the center pillar is able to carry out multiple functions.

However, with the above-described configuration, three types of dies are required for the partition part, the left supporting frame part, and the right supporting frame part in order to enable the center pillar to carry out multiple functions, and therefore the manufacturing cost required for enabling the center pillar to carry out multiple functions is high. Also, the shape of the center pillar is limited from the view point of releasability, and it is difficult to change the shape of the center pillar when peripheral devices that are to be supported by the center pillar are changed or added.

Therefore, it is desirable to make it easier to change the shape of the center pillar while reducing the manufacturing cost required for enabling the center pillar to carry out multiple functions.

(2) Second Related Art

As another example of a work vehicle, there is a tractor disclosed in JP 2013-139229A. This tractor includes: a supporting plate that supports a battery from below; and a supporting frame that has a shape that straddles the battery such that an installation space for installing the battery is formed between the supporting frame and the supporting plate. The supporting frame is provided with, for example: left and right supporting members; a connecting member that connects upper ends of the left and right supporting members; and an auxiliary member that connects upper and lower intermediate parts of the left and right supporting members is fixed to an upper surface of the supporting plate, and the auxiliary member located close to a positive terminal and a negative terminal of the battery is formed in a straight line that extends above the positive terminal and the negative terminal and spans the left and right supporting member.

With the above-described configuration, when an operator removes the battery from or brings the battery into the installation space for installing the battery in order to perform maintenance on the battery, the operator is required to perform an operation such as lifting up the battery from above the supporting plate, and there is the risk of the positive terminal of the battery being brought into contact with the auxiliary member of the supporting frame.

In other words, it is desirable to avoid the risk of the positive terminal of the battery being brought into contact with the supporting frame and causing a short circuit when removing the battery from or bringing the battery into the installation space.

SUMMARY OF THE INVENTION

[1] A work vehicle corresponding to First Related Art is a work vehicle that includes:

a vehicle body frame;

a prime mover unit disposed in a front part of a vehicle body;

a driving part disposed in a rear part of the vehicle body; and a battery disposed between the prime mover unit and the driving part:

the vehicle body frame including:

a base frame disposed in a lower part of the vehicle body; and a center pillar disposed between the prime mover unit and the driving part, the center pillar extending upward from the base frame;

the prime mover unit including a radiator disposed immediately forward of the center pillar;

the driving part including a steering wheel disposed above the battery; and the center pillar including:

a partition that is made of a steel plate, the partition dividing a storage space, formed in the front part of the vehicle body, fore and aft into a first space adjacent the prime mover unit and a second space adjacent the battery;

a first supporting member that is made of a steel plate and supports the partition from below;

a second supporting member that is made of a steel plate and supports the radiator from below;

a third supporting member that is made of a steel plate and supports the steering wheel; and a mounting platform that is made of a steel plate and on which the battery is mounted, the partition, the first supporting member, the second supporting member, the third supporting member and the mounting platform being configured as an integrated structure by welding.

With this configuration, the center pillar serves as the partition in the storage space, the supporting member for the radiator, the supporting member for the steering wheel, and the mounting platform for the battery.

The center pillar is an integrally welded structure that does not require a die, and therefore, it is possible to eliminate the cost of the die, and it is easier to change the shape of the center pillar when peripheral devices that are to be supported by the center pillar are changed or added, compared to the case of the center pillar made of die cast aluminum that requires a die, for example.

As a result, while reducing the manufacturing cost required for enabling the center pillar to carry out multiple functions, it is possible to make it easier to change the shape of the center pillar when peripheral devices that are to be supported by the center pillar are changed or added, and the center pillar is suitable to carry out multiple functions.

In one preferred embodiment, the mounting platform has a front end thereof extending forward of the first supporting member to serve as the second supporting member.

According to the above configuration, it is possible to, for example, simplify the configuration of the center pillar by reducing the number of parts compared to the case where a dedicated steel plate member that constitutes the second supporting member is newly added to the center pillar.

In one preferred embodiment, the partition includes a frame shape with a central portion thereof forming an air inlet port for the radiator, the partition further including an extension part that is bent to extend rearward from an upper edge of an inner peripheral edge of the partition, the inner peripheral edge defining the air inlet port, and the third supporting member has an upper part thereof welded to the extension part.

According to the above configuration, a steel plate portion in a central portion of the partition, which is unnecessary after the air inlet port has been formed, is effectively used to weld the partition to the upper part of the third supporting member, and thus it is possible to firmly weld the partition and the supporting member to each other without increasing the length of the third supporting members in the upward direction.

In one preferred embodiment, the third supporting member is located rearward of the air inlet port to take on an attachment orientation in which flat surfaces of the third supporting member do not face the air inlet port.

According to the above configuration, it is possible to prevent the amount of air to/from the radiator from being reduced due to the flat surfaces of the third supporting member facing the air inlet port of the partition.

In one preferred embodiment, the center pillar includes a fourth supporting member that is made of a steel plate, the fourth supporting member supporting the third supporting member while being supported by the base frame, the fourth supporting member is curved into an inverted U shape to straddle the battery in a left-right direction, the fourth supporting member taking on an attachment orientation in which flat surfaces of the fourth supporting member do not face the air inlet port, and the third supporting member has a lower end thereof welded to an upper surface of the fourth supporting member.

According to the above configuration, the third supporting member is supported by the base frame, with the fourth supporting member being interposed therebetween. The fourth supporting member has a wide width in the left-right direction so as to straddle the battery, and is highly stable. Also, for example, compared to the case where the third supporting member is directly supported by the base frame, the length of the third supporting member in the top-bottom direction is shorter, and the third supporting member is more strong and stable.

As a result, it is possible to support the steering wheel by using the third supporting member, with high strength and high stability.

Also, it is possible to prevent the amount of air to/from the radiator from being reduced due to the flat surfaces of the fourth supporting member facing the air inlet port of the partition.

In one preferred embodiment, the fourth supporting member is formed asymmetrical in the left-right direction, one of left/right upper parts of the fourth supporting member adjacent positive terminal of the battery being located more forward relative to the vehicle body, than the other of the left/right upper parts of the fourth supporting member adjacent the negative terminal.

According to the above configuration, it is possible to prevent the positive terminal of the battery from being brought into contact with the upper part of the fourth supporting member and causing a short circuit when the battery is to be attached to or removed from the mounting platform from the rear side.

In one preferred embodiment, the vehicle body frame includes a fixing mechanism that fixes the battery on the mounting platform, the fixing mechanism including:

left and right rods that are supported by left and right side parts of the fourth supporting member so as to be swingable in a top-bottom direction;

a pressing member that spans the left and right rods so as to be slidable relative to the left and right rods; and left and right nuts that are attached to male screw parts formed on respective free ends of the left and right rods, and the pressing member being swingable between: a fixing position at which the pressing member comes into contact with a corner part of a front end upper part of the battery; and a retracted position at which the pressing member goes rearward of a lower end of the battery.

According to the above configuration, when fixing the battery at a predetermined position on the mounting platform, an operator brings the battery to the predetermined position on the mounting platform, and then fastens the left and right first nuts, with the fixing mechanism being located at the fixing position. Thus, the operator can fix the battery at the predetermined position on the mounting platform under a condition where the battery is pressed against the mounting platform by the pressing member.

Also, when removing the battery from the predetermined position on the mounting platform, the operator performs an operation to unfasten the left and right first nuts. Thus, the operator can release the force of the pressing member that presses the battery against the mounting platform, and displace the fixing member such that the fixing member swings from the fixing position to the retracted position. Then, by displacing the fixing mechanism such that the fixing mechanism swings to the retracted position, it is possible to easily take out the battery rearward, from the position on the mounting platform, without causing a problem in which the fixing mechanism hinders the movement of the battery.

In one preferred embodiment, the center pillar includes a reinforcing member that is made of a steel plate, and spans the first supporting member and the third supporting member such that the reinforcing member takes on an attachment orientation in which flat surfaces of the reinforcing member do no face the air inlet port, and a lower end of the reinforcing member is welded to the first supporting member, and an upper end of the reinforcing member is welded to the third supporting member.

According to the above configuration, it is possible to reinforce the center pillar while preventing the amount of air to/from the radiator from being reduced due to the flat surfaces of the reinforcing member facing the air inlet port of the partition.

In one preferred embodiment, the radiator includes a dust proof net at a rear part thereof, the dust proof net being configured to be removable upward from the radiator, and the partition includes a guide part that guides dust fallen downward from the dust proof net to a position below the radiator, the guide part being curved so as to take on a rearward-lifted orientation in which the guide part extends from a lower edge of the inner peripheral edge in a rearward and upward direction.

According to the above configuration, it is possible to effectively use a steel plate portion in a central portion of the partition, which is unnecessary after the air inlet port has been formed, to prevent a problem in which dust that has fallen from the dust proof net flows inward of the center pillar from the air inlet port and builds up.

Also, it is possible to reinforce a lower part of the partition and improve the strength of the center pillar without adding a new reinforcing member.

In one preferred embodiment, the work vehicle further includes:

a transmission unit disposed in the rear part of the vehicle body; and a power transmission shaft that extends below the radiator and transmits power from an output part of the prime mover unit to an input part of the transmission unit wherein the center pillar includes left and right leg parts that are supported by a top panel of the base frame, and a space for extending power transmission shaft is formed between the center pillar and the top panel, the top panel has a front part thereof located below the radiator, an opening being formed in the front part for allowing entrance of the power transmission shaft when the power transmission shaft is attached or removed, and the mounting platform includes a recessed part extending forward from a rear end of the mounting platform for allowing entrance of the power transmission shaft when the power transmission shaft is attached or removed.

According to the above configuration, when the power transmission shaft is inserted into or removed from the space between the top panel and the center pillar, an operator can easily change the orientation of the power transmission shaft to a rearward-lifted orientation for insertion and removal and to a horizontal orientation for power transmission coupling, without being hindered by the top panel or the mounting platform, by using the opening of the top panel and the recessed part of the mounting platform.

As a result, it is easier to insert/remove the power transmission shaft from above the top panel, into/from the space between the top panel and the center pillar.

In one preferred embodiment, the work vehicle further includes a tilt unit that supports the steering wheel such that the steering wheel is swingable in a top-bottom direction, wherein the tilt unit includes:

a swing member that swings integrally with the steering wheel about a first pivot shaft that is orientated in a left-right direction;

a gas spring that assists an operation to swing the swing member; and an operation lever that is operated between a lock position at which the swing member is prevented from swinging in the top-bottom direction, and an unlock position at which the swing member is allowed to swing in the top-bottom direction, and the third supporting member includes:

a first supporting part that supports the swing member, with the first pivot shaft being interposed therebetween;

a pivot shaft that is orientated in the left-right direction and supports one end of the gas spring such that the one end of the gas spring is relatively swingable; and a second supporting part that supports the operation lever such that the operation lever is swingable.

According to the above configuration, the driver can easily adjust the height of the steering wheel according to the driver's physical build by operating the operation lever to swing and operating the steering wheel to swing.

Also, the third supporting member of the center pillar can also serve as a supporting member that supports the tilt unit. As a result, it is possible to enable the center pillar to carry out multiple functions, while, for example, simplifying the configuration by reducing the number of parts compared to, for example, the case where a dedicated supporting member that supports the tilt unit is newly added.

In one preferred embodiment, the operation lever is supported by the first pivot shaft so as to be relatively swingable.

According to the above configuration, it is possible to reduce the number of parts required for the tilt unit, compared to the case where a dedicated pivot shaft that supports the operation lever is provided.

Also, since the first supporting part also serves as the second supporting part, it is possible to enable the center pillar to carry out multiple functions, while, for example, simplifying the configuration of the center pillar.

In one preferred embodiment, the work vehicle further includes a power steering unit of a hydraulic type, wherein the power steering unit includes:

a hydraulic control part that is supported by the swing member;

a hydraulic hose that is connected to the hydraulic control part; and a hydraulic pipe that is made of metal and is connected to the hydraulic hose, and the center pillar has a holder at a lower end thereof, the holder being made of rubber and holding the hydraulic pipe.

In one preferred embodiment, the center pillar includes a mounting part at the lower end thereof, the mounting part defining a positioning elongated hole, and the holder includes a fitting hole in an upper surface thereof for receiving the hydraulic pipe from above, and the holder further includes a protrusion on a bottom surface thereof to be fitted into the elongated hole from above.

According to the above configuration, when attaching the hydraulic pipe to a predetermined position of the center pillar, an operator can mount the holder on the mounting part such that the holder is prevented from being displaced in the horizontal direction, by fitting the protrusion of the holder into the elongated hole of the mounting part. Then, after mounting the holder, it is possible to prevent the protrusion of the holder from becoming separated from the elongated hole of the mounting part by fitting the hydraulic pipe into the fitting hole of the holder from above.

As a result, it is possible to fix and hold the hydraulic pipes at the predetermined position of the center pillar such that the holder prevents the hydraulic pipe from resonating, while improving the attachability of the hydraulic pipe.

In one preferred embodiment, the center pillar includes left and right side walls that are each made of a steel plate and are located on left and right sides of the partition, and lower ends of the left and right side walls are welded to the first supporting member, and inner surfaces of the left and right side walls are welded to lateral ends of the partition.

According to the above configuration, the strength of the center pillar is improved.

In one preferred embodiment, the work vehicle further includes: an under panel that is U-shaped in top plan view and covers the battery from behind, wherein the left and right side walls of the center pillar include left and right positioning members welded respectively thereto, each of the left and right positioning members being made of a steel plate and curved into a U-shape to form a vertically elongated slit between the left/right positioning member and an outer surface of the left/right side wall, and the under panel include vertically elongated insertion parts at left and right front ends thereof, each of the insertion parts being inserted into the slit associated therewith.

According to the above configuration, when attaching the under panel to a predetermined attachment position, an operator can easily position the under panel relative to the predetermined attachment position by inserting the left and right insertion parts of the under panel into the slits of the left and right side walls.

Also, since the left and right side walls also serve as positioning members for positioning the under panel, it is possible to enable the center pillar to carry out multiple functions.

In one preferred embodiment, upper ends of the left and right positioning members are inclined in a rearward-lifted orientation, lower ends of the left and right positioning members are inclined in a rearward-lowered orientation, and inner surfaces of the upper ends and inner surfaces of the lower ends are formed as first guide surfaces that guide and position the insertion parts in a top-bottom direction.

According to the above configuration, an operator can easily and accurately position the under panel relative to the predetermined attachment position in terms of the top-bottom direction.

In one preferred embodiment, intermediate parts of the left and right positioning members are inclined so as to be gradually separated from the side walls in a rearward direction, and inner surfaces of the intermediate parts are formed as second guide surfaces that guide and position the insertion parts in a left-right direction.

According to the above configuration, an operator can easily and accurately position the under panel relative to the predetermined attachment position in the left-right direction.

In one preferred embodiment, the work vehicle includes: a hood that swings in the top-bottom direction between a closed position at which the hood covers the prime mover unit, and an open position at which the hood exposes the prime mover unit to an outside, wherein the left and right side walls are inclined rearward such that front end edges of the left and right side walls are inclined rearward relative to the vehicle body, in an upward direction, left and right inner surfaces of the hood each includes a seal supporting part, the left and right seal supporting parts have rear end edges that are inclined rearward by an inclination angle that is the same as an inclination angle of front end edges of the left and right side walls and face the left and right front end edges when the hood is at the closed position, and the left and right rear end edges include left and right sealing members that span upper ends and lower ends of the left and right front end edges and that are brought into linear contact with the left and right front end edges when the hood is at the closed position.

According to the above configuration, it is possible to increase the degree of intimate contact between: the left and right side walls; and the hood-side left and right sealing members when the hood is at the closed position, compared to when, for example, the front end edges of the left and right side walls and the rear end edges of the left and right seal supporting parts are orientated in a vertical direction.

In one preferred embodiment, the center pillar includes left and right guide plates that extend forward from the left and right side walls, and the left and right guide plates are formed so as to be brought into contact with the left and right inner surfaces of the hood, respectively, and guide the hood to a predetermined position in the left-right direction when the hood is operated to close.

According to the above configuration, when the hood is operated to close, it is possible to accurately position the left and right sealing members on the hood side, at appropriate positions in the left-right direction, relative to the front end edges of the left and right side walls. As a result, it is possible to reliably bring the left and right sealing members into linear contact with the front end edges of the left and right side walls.

In one preferred embodiment, the work vehicle further includes: a hood that swings in the top-bottom direction between a closed position at which the hood covers the prime mover unit, and an open position at which the hood exposes the prime mover unit to an outside, wherein the hood include left and right leaf springs on left and right inner surfaces thereof spanning upper ends and lower ends of the left and right side walls, to be brought into surface contact with outer surfaces of the left and right side walls, respectively, when the hood is at the closed position, and the left and right leaf springs are formed such that rear end edges of the left and right leaf springs are inclined laterally outward relative to the vehicle body, in a rearward direction, respectively.

According to the above configuration, when the hood is operated to be closed, the rear end edges of the left and right leaf springs are brought into contact with the outer surfaces of the left and right side walls, and thus it is possible to position the hood relative to the center pillar in the left-right direction.

When the hood is at the closed position, the left and right leaf springs are in surface contact with the left and right side walls as described above, and thus it is possible to avoid, over a long period, the risk of unnecessary gaps being formed between the hood and the left and right side walls, without using a rubber trim having low durability.

In one preferred embodiment, the work vehicle includes: an upper panel that covers an upper part of the center pillar from above, wherein a front end of the upper panel is covered from above by a rear end of the hood at the closed position, and an upper part of the partition of the center pillar is in internal contact with the front end of the upper panel.

For example, if the front end of the upper panel and the rear end of the partition are adjacent to each other in the front-rear direction, and the front end of the partition and the rear end of the hood at the closed position are adjacent to each other in the front-rear direction, it is necessary to improve the finishing accuracy of the adjacent end surfaces in order to form constant gaps between the adjacent end surfaces and thereby provide a good appearance.

In contrast, according to the above configuration, the gaps between the adjacent end surfaces cannot be seen from the outside, and it is possible to provide a good appearance of the area around the rear end of the hood without improving the finishing accuracy of the adjacent end surfaces.

In one preferred embodiment, the work vehicle further includes:

a lock mechanism that fixes and holds the hood at the closed position, wherein the lock mechanism includes:

a hook member that swings between a lock position and an unlock position;

a spring that biases the hook member to return to the lock position;

an operation rod that allows the hook member to be operated to swing to the unlock position against the force of the spring; and a rod on which the hook member at the lock position catches, wherein the partition has an upper end thereof a third supporting part that supports the hook member and the spring, and a fourth supporting part that operably supports the operation rod.

According to the above configuration, the partition of the center pillar also serves as a supporting member for the lock mechanism, and it is possible to enable the center pillar to carry out multiple functions, while, for example, simplifying the configuration by reducing the number of parts compared to the case where a dedicated supporting member for the lock mechanism is separately provided.

In one preferred embodiment, the fourth supporting part includes a coupling part to which an upper panel that covers an upper part of the center pillar from above is coupled, the coupling part being formed integrally with the fourth supporting part.

According to the above configuration, it is possible to, for example, simplify the configuration by reducing the number of parts compared to the case where the fourth supporting part and the coupling part are separately provided for the partition.

In one preferred embodiment, the work vehicle further includes:

a cooling fan disposed immediately forward of the radiator;

an air cleaner disposed forward of the radiator and above the cooling fan; and a fan shroud that spans the partition and the cooling fan, wherein the fan shroud has an upper part thereof an air passage forming part for forming an air passage between the upper part of the fan shroud and an upper part of the partition, the partition has, at one of left and right ends of an upper part thereof, an air passage hole that is formed to allow air to flow into the air passage, and the air passage forming part has, at the other of the left/right ends thereof disposed opposite the air passage hole in a left-right direction of the vehicle body, a connection hole that is formed to connect the air passage to an air intake part of the air cleaner.

According to the above configuration, it is possible to prevent the sound of intake air from increasing due to the air passage hole and the connection hole facing each other.

In one preferred embodiment, the work vehicle includes: an air intake port that allows air to be taken into the storage space from a foot space of the driving part, wherein the partition includes a sound isolation wall that is formed so as to be curved and extend in a rearward and upward direction from a lower edge of an inner peripheral edge of the partition, the inner peripheral edge defining the air passage hole.

According to the above configuration, it is possible to prevent intake air sound from increasing and leaking from the air intake port due to the air passage from the air intake port in the foot space to the air passage hole of the partition being aligned in a straight line.

Also, a steel plate portion of a right side upper part of the partition, which is unnecessary after the air passage hole has been formed, is effectively used as the sound isolation wall, and therefore, it is possible to, for example, simplify the configuration by reducing the number of parts compared to the case where another member is provided as the sound isolation wall.

In one preferred embodiment, the center pillar includes a fifth supporting member that is made of a steel plate and that rotatably support a swing pivot shaft that is provided at a lower part of an accelerator lever integrally with the lower part, the swing pivot shaft has a small diameter part that is formed on an end of the swing pivot shaft and a large diameter part disposed adjacent to the small diameter part, the fifth supporting member is curved into a U-shape such that a first supporting plate part thereof for rotatably supporting the small diameter part is faced to a second supporting plate part thereof for rotatably supporting the large diameter part, the fifth supporting member being welded to lateral outer surfaces of the third supporting member, the first supporting plate part includes a round hole into which the small diameter part is inserted, the second supporting plate part includes a first recessed part into which the large diameter part is inserted, the first recessed part includes: a hole-shaped part that has the substantially same diameter as the large diameter part; and a slit part that spans one end edge of the second supporting plate part and the hole-shaped part, and the slit part has a slit width thereof with substantially the same dimension as a diameter of the small diameter part for receiving the small diameter part.

According to the above configuration, it is possible to enable the center pillar to serve as a supporting member that supports the accelerator lever. With this configuration, it is possible to enable the center pillar to carry out multiple functions while, for example, simplifying the configuration by reducing the number of parts compared to the case where a dedicated supporting member for the accelerator lever is separately provided.

Also, the fifth supporting member is curved into a U-shape, and therefore, it is possible to stably support the accelerator lever at two points on the first supporting plate part and the second supporting plate part while simplifying the configuration by reducing the number of parts compared to the case where the first supporting plate part and the second supporting plate part are separately provided.

Also, it is easier to attach the accelerator lever, which is integrated with the swing pivot shaft, to the fifth supporting member from the outside of the fifth supporting member in the rightward direction, by using the first recessed part of the second supporting plate part.

In one preferred embodiment, the swing pivot shaft includes a friction type holding mechanism that holds the accelerator lever at a desired operation position, the holding mechanism includes:

a male screw portion that is formed on the small diameter part;

a receiving member that is fixed to a predetermined position on the small diameter part;

an elastic member fitted onto the small diameter part between the receiving member and the first supporting plate part;

a nut that is attached to the male screw portion; and a tube-shaped spacer that is located between the receiving member and the nut for setting a fastening limitation position of the nut.

According to the above configuration, for example, by inserting the swing pivot shaft into the round hole and the slit part of the fifth supporting member after fitting the elastic member and the spacer onto a predetermined position on the swing pivot shaft where the receiving member is fixed, and performing an operation to fasten the second nut onto the inserted swing pivot shaft from the lower end of the swing pivot shaft up to the fastening limitation position that is restricted by the spacer, an operator can easily set a friction holding force, which results from the deformation of the elastic member caused by the fastening operation and is applied to the accelerator lever, to a predetermined appropriate value.

In other words, the operator can easily and reliably attach the holding mechanism such that the friction holding force applied to the accelerator lever is set to the predetermined appropriate value.

In one preferred embodiment, the work vehicle includes:
a constant speed setting lever disposed adjacent to the accelerator lever, wherein the swing pivot shaft for the accelerator lever is set to be orientated in a top-bottom direction, and the accelerator lever includes a swing arm that extends from the swing pivot shaft to an outside of the fifth supporting member in a lateral direction, and that is linked with a speed control lever of the prime mover unit, the fifth supporting member is set such that the first supporting plate part is located on a lower side, the second supporting plate part is located on an upper side, and an intermediate plate part that spans the first supporting plate part and the second supporting plate part is located at a rear end of the fifth supporting member, the first supporting plate part includes the round hole a rear part thereof; and at positions forward of the round hole, the first supporting plate part further includes: a stopper that receives the swing arm at a forward idling position; and a second recessed part that allows arrangement of the constant speed setting lever between the round hole and the stopper, the second supporting plate part includes the first recessed part at a rear part thereof, and at a position rearward of the first recessed part, the second supporting plate further includes a guide hole for restricting movement of the constant speed setting lever, and the intermediate plate part includes a third recessed part that allows displacement of the swing arm to a retracted position that is set at a position rearward of the swing pivot shaft.

According to the above configuration, the fifth supporting member serves as a restriction member that restricts the accelerator lever from swinging forward from the idling position and as a guide member that restricts the constant speed setting lever from moving. Therefore, it is possible to enable the center pillar to carry out multiple functions, while, for example, simplifying the configuration by reducing the number of parts compared to the case where a dedicated restriction member and a dedicated guide member are separately provided.

Also, when attaching/detaching the swing arm to/from a predetermined attachment position on the cover panel that covers the swing arm and so on from behind, an operator can reduce the amount of protrusion from the fifth supporting member of the swing arm in the leftward direction by positioning the swing arm at the retracted position by operating the accelerator lever.

Consequently, when attaching/detaching the cover panel, it is possible to prevent a problem in which the cover panel is brought into contact with the swing arm and it becomes difficult to attach/detach the cover panel to/from the predetermined attachment position.

In one preferred embodiment, the center pillar includes a fifth supporting part that supports an electrical component that is provided in a vicinity of the center pillar.

According to the above configuration, it is possible to enable the center pillar to serve as a supporting member that supports the electrical component that is provided in the vicinity of the center pillar. As a result, it is possible to, for example, simplify the configuration by reducing the number of parts compared to the case where a dedicated supporting member for the electrical component is added.

[2] A work vehicle corresponding to Second Related Art is a work vehicle that includes:

a supporting plate that supports a battery from below; and a supporting frame that has a shape that straddles the battery to form an installation space for installing the battery between the supporting frame and the supporting plate;

wherein the battery is located in the installation space so as to take on a predetermined orientation in which a positive terminal and a negative terminal of the battery are located downstream in a direction in which the battery is removed from the installation space;

the supporting frame includes a frame part located on the same side as the positive terminal of the battery when the battery is installed in the installation space; and an upper part of the frame part has a retracted portion that is formed upstream of the positive terminal in the direction in which the battery is removed, the retracted portion opening a space above the positive terminal in top plan view.

According to the above configuration, the supporting frame includes the above-described retracted portion, and therefore, when an operator removes the battery from or brings the battery into the installation space for the battery in order to perform maintenance on the battery, even if the operator lifts the battery above the supporting plate, for example, it is possible to avoid the risk of the positive terminal of the battery being brought into contact with the supporting frame.

Also, the battery is installed in the installation space so as to take on the above-described predetermined orientation, and therefore, although the supporting frame includes the above-described retracted portion, the entirety of the supporting frame can be located so as to surround the battery in the installation space together with the supporting plate. With this configuration, it is possible to protect the battery installed in the installation space by using the supporting plate and the supporting frame.

As a result, it is possible to avoid the risk of the positive terminal of the battery being brought into contact with the supporting frame and causing a short circuit when the battery is removed from or brought into the installation space, without impairing the supporting frame's function of protecting the battery.

In one preferred embodiment, the supporting frame has a second frame part that is located on the same side as the negative terminal of the battery when the battery is installed in the installation space; and an upper part of the second frame part is located upstream of the negative terminal in the direction in which the battery is removed, and opens a space above the negative terminal in top plan view, and the retracted portion is located upstream of the upper part of the second frame part in the direction in which the battery is removed.

According to the above configuration, the space above the negative terminal of the battery installed in the installation space for the battery is open, and the space above the positive terminal is more widely open than the space above the negative terminal.

As a result, it is easier to remove the battery from or bring the battery into the installation space for the battery, and it is possible to more reliably avoid the risk of the positive terminal of the battery being brought into contact with the supporting frame and causing a short circuit when removing the battery from or bringing the battery into the installation space.

Also, for example, when the battery runs out and needs to be jump-started, an operator can remove a power line from the positive terminal and the negative terminal of the battery while maintaining the battery in the state of having been installed in the installation space, and the operator can connect the positive terminal and the negative terminal of the battery to the positive terminal or the negative terminal of the battery of a rescue vehicle that is not shown in the drawing, via a booster cable.

In other words, it is possible to improve workability when performing jump-start.

In one preferred embodiment, the retracted portion is shaped to open a space on a lateral side of the positive terminal when seen in a lateral direction that is orthogonal to the direction in which the battery is removed, and the supporting frame has a second frame part that is located on the same side as the negative terminal of the battery when the battery is installed in the installation space; and the second frame part includes a recessed part at a lateral portion thereof for opening a space on a lateral side of the negative terminal when seen in the lateral direction, the recessed part being formed upstream of the negative terminal in the direction in which the battery is removed.

According to the above configuration, it is possible to direct the power line that is routed from the side that is opposite the direction in which the battery is removed, to the battery in the installation space, via the outside of the supporting frame in the lateral direction, to the positive terminal or the negative terminal from the outside of the supporting frame in the lateral direction, by bending the power line by a small angle. Thus, it is possible to effortlessly connect the power line to the positive terminal and the negative terminal of the battery.

As a result, it is easier to route the power line when connecting the power line to the positive terminal or the negative terminal of the battery. Also, it is possible to improve the durability of the power line.

In one preferred embodiment, the supporting frame is made of a steel plate that is curved into an inverted U shape, and a top plate part of the supporting frame is formed into a crank shape that includes the retracted portion.

With this configuration, it is possible to easily obtain the supporting frame that includes the retracted portion and that has the shape that straddles the battery, by using press processing. Also, it is possible to reduce the weight of the supporting frame.

In one preferred embodiment, the work vehicle further includes:

a receiving member that receives an end of the battery in the installation space located on an upstream side in the direction in which the battery is removed; and a fixing member that fixes the battery at a position between the fixing member and the receiving member, wherein the fixing member includes a supporting member having an insulating property, the supporting member supporting an upper edge of the battery located on a downstream side in the direction in which the battery is removed.

According to the above configuration, it is possible to fix the battery installed in the installation space, using the fixing member or the like. As a result, it is possible to prevent fretting, which is a phenomenon in which the contact surfaces of the supporting plate and the battery are damaged due to the battery slightly sliding relative to the supporting plate.

Also, the supporting member that supports an upper edge of the battery, the upper edge being close to the positive terminal and the negative terminal, is insulative, and therefore, even if a problem in which the supporting member is brought into contact with the positive terminal and the negative terminal of the battery occurs, it is possible to prevent a short circuit from occurring between the terminals due to this contact.

Other features, and advantageous effects achieved thereby will become apparent from reading the following description.

BRIEF DESCRIPTION OF THE DRAWINGS

FIG. 14 is a perspective view of a primary portion showing the center pillar, an accelerator lever, and so on;

FIG. 19 is a perspective view of a primary portion showing a fifth supporting member, the accelerator lever, and so on;

DETAILED DESCRIPTION OF EMBODIMENTS

First Embodiment

The following describes a first embodiment applied to a tractor that is an example of a work vehicle.

Figure 1:
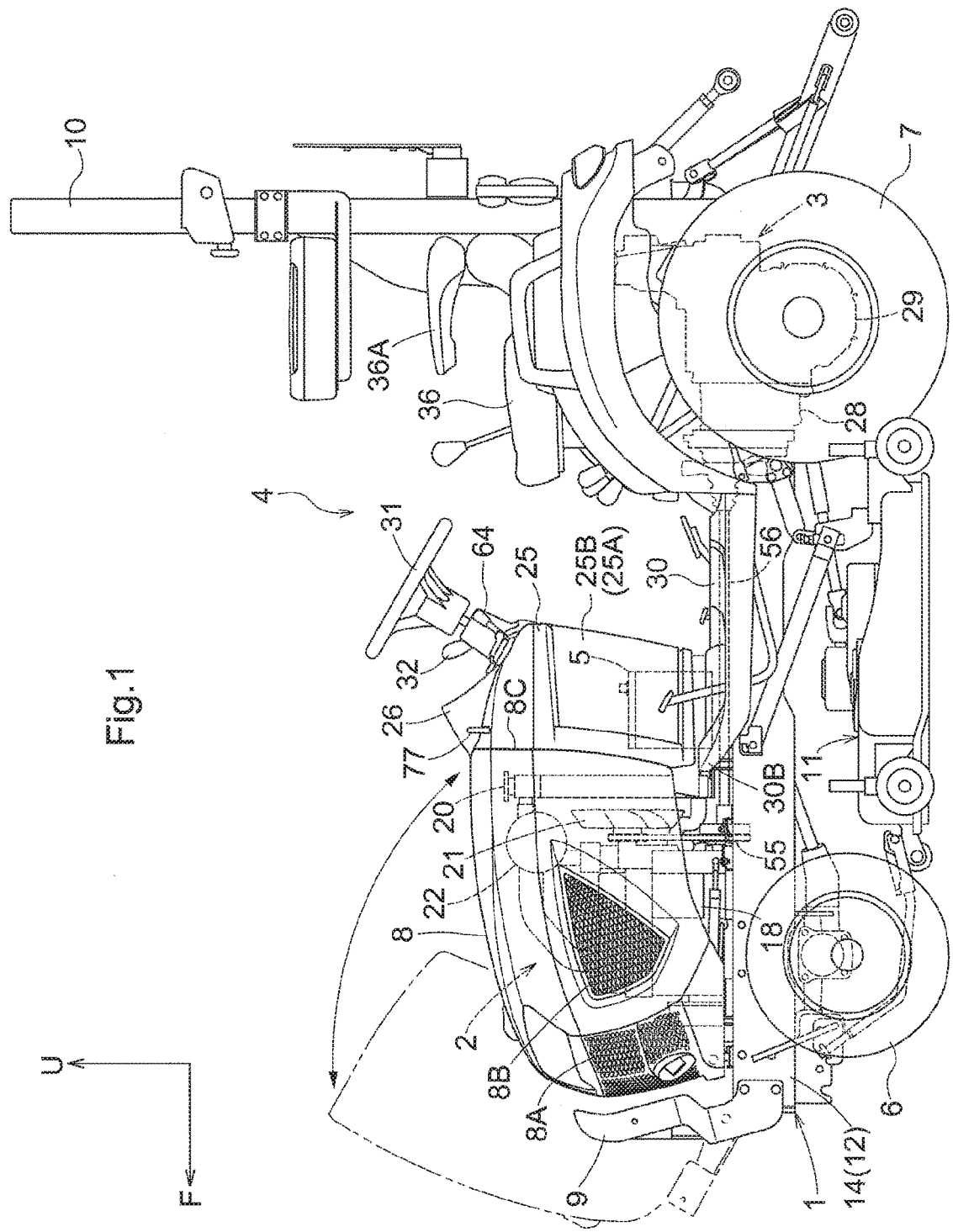
FIG. 1 is a view of a first embodiment (the same applies to the following drawings up to FIG. 23), showing a left side view of a tractor that is an example of a work vehicle.

Note that the direction indicated by the arrow with a mark F shown in FIG. 1 is the forward direction of the tractor, and the direction indicated by the arrow with a mark U is the upward direction of the tractor.

Figure 2:
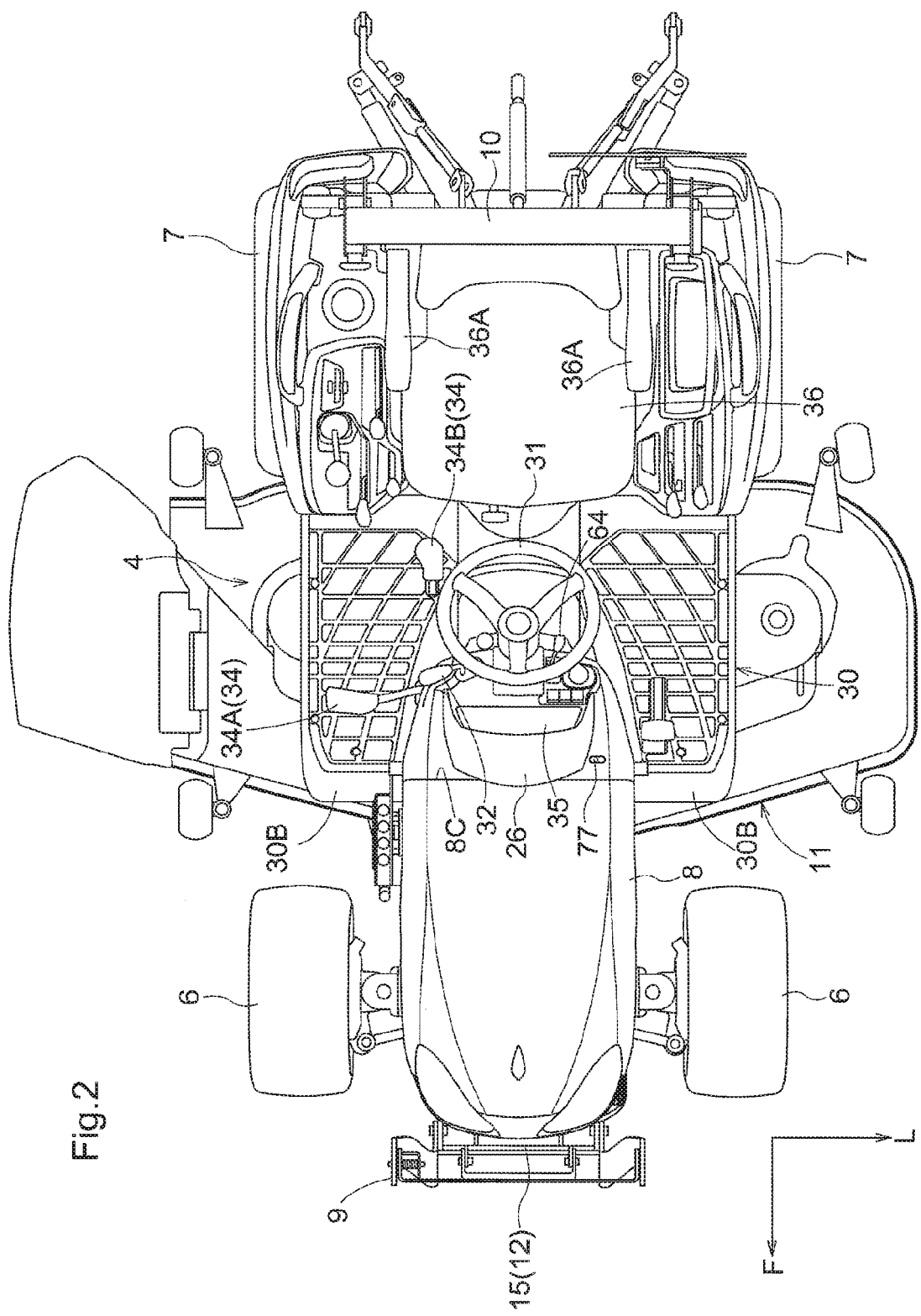
FIG. 2 is a plan view of the tractor.

The direction indicated by the arrow with the mark F shown in FIG. 2 is the forward direction of the tractor, and the direction indicated by the arrow with a mark L is the leftward direction of the tractor.

Overall Configuration

As shown in FIGS. 1 and 2, the tractor described in the present embodiment as an example includes, for example: a vehicle body frame 1 that constitutes the framework of a vehicle body; a prime mover unit 2 disposed in a front part of the vehicle body; a transmission unit 3 and a driving part 4 of a boarding type that are located in a rear part of the vehicle body; a battery 5 disposed between the prime mover unit 2 and the driving part 4; left and right front wheels 6 that are steerable and are driven by a driving force from the prime mover unit 2; left and right rear wheels 7 that are driven by a driving force from the prime mover unit 2; a hood 8 that is configured to open and close by swinging, and covers the prime mover unit 2; a front guard 9 that is made of a steel plate, and is located immediately forward of the hood 8 to protect the hood 8; a protection frame 10 that is coupled to a rear end of the vehicle body frame 1; and a mower 11 disposed on an underbody between the left and right front wheels 6 and the left and right rear wheels 7.

As shown in FIGS. 1 to 6, the vehicle body frame 1 includes, for example: a base frame 12 disposed in a lower part of the vehicle body; the center pillar 13 that extends upward from the base frame 12, between the prime mover unit 2 and the driving part 4.

The base frame 12 includes, for example: left and right side members 14 that are each made of a steel plate and are elongated in the front-rear direction; a front end member 15 that is made of a steel plate and spans the front ends of the left and right side members 14; and a top panel 16 that is made of a steel plate and is coupled to central parts of the left and right side members 14 in the front-rear direction. The base frame 12 forms a space 17 between the front end member 15 and the front end of the top panel 16, where a prime mover unit is to be located. A front part of the top panel 16, which extends from a position below a radiator 20 to a front part of the vehicle body, is curved so as to take on a frontward-lowered orientation in which the front part is inclined toward a position below the prime mover unit 2.

As shown in FIGS. 1 and 3 to 7, the prime mover unit 2 includes, for example: a water-cooled type engine 18 that is supported by a front part of the vehicle body frame 1 so as to be vibration-proof; the radiator 20 disposed immediately forward of the center pillar 13; a cooling fan 21 disposed rearward of the engine 18 and immediately forward of the radiator 20; and an air cleaner 22 disposed forward of the radiator 20 and above the cooling fan 21. The prime mover unit 2 is stored in a storage space that is formed in a front part of the vehicle body.

As shown in FIGS. 1, 3 to 5, and 7, the storage space is formed with, for example: the hood 8 of a rear-open type; a bottom panel 24 disposed below the battery 5; an under panel 25 that is U-shaped in top plan view and covers the battery 5 and so on from behind; and an upper panel 26 that covers an upper part of the center pillar 13 and so on from above.

As shown in FIGS. 1, 3, 4, and 7, the hood 8 swings in the top-bottom direction about a pivot shaft (not shown) disposed in a front end lower part of the vehicle body and is orientated in the left-right direction, between a closed position at which the hood 8 covers the prime mover unit 2, and an open position at which the hood 8 exposes the prime mover unit 2 to the outside. The hood 8 includes: a first exhaust part 8A that allows gas to be exhausted from the storage space to a front part of the vehicle body; and left and right second exhaust parts 8B that allow gas to be exhausted from the storage space to the outside of the vehicle body in a lateral direction. The under panel 25 includes: an air intake port 25A that allows air to be taken into the storage space from a foot space of the driving part 4; and a dust-proof screen 25B that covers the air intake port 25A.

As shown in FIG. 1, the transmission unit 3 includes, a hydrostatic continuously variable transmission apparatus (hereinafter referred to as "the HST") 28 that is used as a main transmission apparatus; and a transmission case 29 that is joined to a rear surface of the HST 28. Although not shown in the drawings, a gear-type continuously variable transmission apparatus that is used as an auxiliary transmission apparatus, a differential apparatus for rear wheels, and a front wheel clutch that connects and disconnects power transmission to the left and right front wheels 6, and so on are built into the transmission case 29, etc.

As shown in FIGS. 1 to 5 and 8, the driving part 4 includes, for example: a boarding step 30 that is supported by the base frame 12 and so on; the steering wheel 31 that is for steering the front wheels and is located above the battery 5; an accelerator lever 32 disposed at a position that is rightward of and below the steering wheel 31; a constant speed setting lever 33 disposed adjacent to the accelerator lever 32; a transmission pedal 34 disposed in a right-side foot space of the driving part 4; a display panel 35 that displays the number of revolutions of the engine, and so on; and a driving seat 36 that has armrests 36A on the left and right sides. Left and right central portions of a front part of the boarding step 30 each includes a recessed part 30A that allows the entrance of the center pillar 13 and so on. The recessed part 30A is closed by the bottom panel 24 that is detachably coupled to the front part of the boarding step 30 using bolts. The transmission pedal 34 includes a front side pedal part 34A for forward-drive transmission and a rear side pedal part 34B for reversing transmission.

Although not shown in the drawings, the transmission pedal 34 is linked with a trunnion shaft of the hydrostatic continuously variable transmission apparatus provided for the transmission unit 3, via a linkage mechanism for a transmission operation. The transmission pedal 34 is biased by a neutral returning mechanism so as to return to a neutral position. The constant speed setting lever 33 swings in the front-rear direction between a front side constant speed setting position and a rear side constant speed cancelling position, about a pivot shaft that is provided for the base frame 12 and is orientated in the left-right direction. The constant speed setting lever 33 is biased by a cancel returning mechanism so as to return to the constant speed cancelling position. The constant speed setting lever 33 is configured such that when the constant speed setting lever 33 is operated to swing to the constant speed setting position in an advancing state where the front side pedal part 34A is being subjected to a pressing operation, a first locking member that has the shape of a saw blade and that swings integrally with the constant speed setting lever 33 is displaced to an interlock position at which the first locking member can be interlocked with a second locking member that has the shape of a saw blade and that swings integrally with the transmission pedal 34. In this situation, when the pressing operation with the front side pedal part 34A is cancelled, the first locking member and the second locking member are interlocked with each other due to the effect of the neutral returning mechanism and the effect of the cancel returning mechanism, and this interlocking state is maintained. With this configuration, the driver can easily maintain the transmission pedal 34 at a desired pressing operation position on the advancing side, and easily obtain a constant speed advancing state corresponding to the position at which the transmission pedal 34 is held. Also, in this constant speed advancing state, upon the driver performing a pressing operation with the front side pedal part 34A, the second locking member cancels interlocking with the first locking member, and the constant speed setting lever 33 returns to the constant speed cancelling position due to the effect of the cancel returning mechanism. With this configuration, the driver can easily cancel the constant speed advancing state.

Center Pillar

As shown in FIGS. 3 to 5 and 7 to 15, the center pillar 13 is configured as an integrated structure by welding following elements: a partition 40 that is made of a steel plate and partitions the storage space in the front part of the vehicle body into front and rear spaces, namely, a first space adjacent the prime mover part and a second space adjacent the battery side; a first supporting member 41 that is made of a steel plate and supports the partition 40 from below; second supporting members 42 that are each made of a steel plate and support the radiator 20 from below; third supporting members 43 that are each made of a steel plate and support the steering wheel 31; and a mounting platform 44 that is made of a steel plate and on which the battery 5 is mounted, etc.

With this configuration, the center pillar 13 serves as the partition 40 in the storage space, the supporting members 42 for the radiator, the supporting members 43 for the steering wheel, and the mounting platform 44 for the battery.

The center pillar 13 is an integrally welded structure that does not require a die, and therefore, it is possible to eliminate the cost of the die, and it is easier to change the shape of the center pillar 13 when peripheral devices that are to be supported by the center pillar 13 are changed or added, compared to a case where the center pillar 13 is made of die cast aluminum that requires a die, for example.

As a result, while reducing the manufacturing cost required for enabling the center pillar 13 to carry out multiple functions, it is possible to make it easier to change the shape of the center pillar 13 when peripheral devices that are to be supported by the center pillar 13 are changed or added, and the center pillar 13 is suitable to carry out multiple functions.

As shown in FIGS. 3 to 5 and 10 to 15, the first supporting member 41 is curved so as to have, for example: left and right coupling parts 41A that are coupled to the base frame 12 using bolts; a front panel part 41B that extends upward from the left and right coupling parts 41A; and a top panel part 41C that extends rearward from the upper end of the front panel part 41B. The left and right coupling parts 41A serve as left and right leg parts 13A of the center pillar 13. The front panel part 41B and the top panel part 41C have a laterally elongated shape that has a central portion disposed above the base frame 12 and extension portions that extend to the left and the right from the central portion. The central portion of the front panel part 41B includes a pair of left and right first slits 41D that are laterally elongated. The top panel part 41C supports the partition 40 at the central portion thereof, and supports left and right front ends 30B of the boarding step 30 at the left and right extension portions thereof.

With this configuration, it is possible to effectively use the first supporting member 41 of the center pillar 13 as a supporting member that supports the front end of the boarding step 30.

As a result, it is possible to, for example, simplify the configuration of the vehicle body frame 1 by reducing the number of parts compared to, for example, the case where a dedicated supporting member that supports the front end of the boarding step 30 is newly added to the vehicle body frame 1.

The pair of left and right second supporting members 42 extend forward from the front panel part 41B of the first supporting member 41. The left and right second supporting members 42 each includes a round hole 42A for attaching a mount rubber. With this configuration, the left and right second supporting members 42 support the radiator 20 so as to be vibration-proof, using left and right mount rubbers 50.

The pair of left and right third supporting members 43 are adjacent to a rear surface of an upper part of the partition 40. The left and right third supporting members 43 each includes a trapezoid-shaped opening 43A for reducing the weight thereof.

The mounting platform 44 is curved so as to have, for example: left and right coupling parts 44A that are coupled to the base frame 12 using bolts; left and right side panel parts 44B that extend upward from the left and right coupling parts 44A; and a top panel part 44C that spans the upper ends of the left and right side panel parts 44B. The left and right coupling parts 44A serve as left and right leg parts 13A of the center pillar 13. The top panel part 44C supports the battery 5 from below with the bottom panel 24 being interposed therebetween. The mounting platform 44 includes left and right front ends 44D that extend forward from the front end of the top panel part 44C.

The left and right front ends 44D of the mounting platform 44 extend to positions that are forward of the first supporting member 41, and serve as the second supporting members 42.

With this configuration, it is possible to, for example, simplify the configuration of the center pillar 13 by reducing the number of parts compared to the case where dedicated steel plate members that constitute the second supporting members 42 are newly added to the center pillar 13.

The left and right front ends 44D have substantially the same width as the left and right first slits 41D of the first supporting member 41 so that the left and right front ends 44D can be inserted into the left and right first slits 41D. The left and right front ends 44D are inserted into the left and right first slits 41D, and thus extend forward of the first supporting member 41.

With this configuration, when welding the first supporting member 41 and the mounting platform 44 to each other, an operator can easily and accurately position the first supporting member 41 and the mounting platform 44. As a result, the operator can easily weld the first supporting member 41 and the mounting platform 44 to each other such that they are in an appropriate positional relationship.

As shown in FIGS. 3 to 5, 7, and 10 to 15, the partition 40 has a frame shape, and a central portion of the partition 40 includes an air inlet port 40A for the radiator. An extension part 40B is bent to extend rearward from an upper edge of an inner peripheral edge of the partition 40, the inner peripheral edge defining the air inlet port 40A. Upper parts of the left and right third supporting members 43 are welded to the extension part 40B of the partition 40.

Specifically, a steel plate portion in a central portion of the partition 40, which is unnecessary after the air inlet port 40A has been formed, is effectively used to weld the partition 40 to the upper parts of the left and right third supporting members 43, and thus it is possible to firmly weld the partition 40 and the left and right third supporting members 43 to each other without increasing the length of the left and right third supporting members 43 in the upward direction.

As shown in FIGS. 9 to 15, the left and right third supporting members 43 are located rearward of the air inlet port 40A so as to take on an attachment orientation in which their flat surfaces A do not face the air inlet port 40A of the partition 40.

With this configuration, it is possible to prevent the amount of air to/from the radiator 20 from being reduced due to the flat surfaces A of the left and right third supporting members 43 facing the air inlet port 40A of the partition 40.

Note that each of the left and right third supporting members 43 has, as the flat surfaces A, an inner surface 43B that faces the center of the vehicle body in the left-right direction, and an outer surface 43C that faces the outside of the vehicle body in a lateral direction.

As shown in FIGS. 3 to 5, 7, and 10 to 15, the center pillar 13 includes a fourth supporting member 45 that is made of a steel plate, and supports the left and right third supporting members 43, in the state of being supported by the base frame 12.

The fourth supporting member 45 is curved into the an inverted U shape that straddles the battery 5 in the left-right direction so as to take on an attachment orientation in which its flat surfaces A do not face the air inlet port 40A of the partition 40. Lower ends of the left and right third supporting members 43 are welded to an upper surface 45A of the fourth supporting member 45.

With this configuration, the left and right third supporting members 43 are supported by the base frame 12, with the fourth supporting member 45 being interposed therebetween. The fourth supporting member 45 has a wide width in the left-right direction so as to straddle the battery 5, and is highly stable. Also, for example, compared to the case where the left and right third supporting members 43 are directly supported by the base frame 12, the length of the left and right third supporting members 43 in the top-bottom direction is shorter, and the left and right third supporting members 43 are more strong and stable.

As a result, it is possible to support the steering wheel 31 by using the left and right third supporting members 43, with high strength and high stability.

Also, it is possible to prevent the amount of air to/from the radiator 20 from being reduced due to the respective flat surfaces A of the fourth supporting member 45 facing the air inlet port 40A of the partition 40.

Note that the fourth supporting member 45 has, as the flat surfaces A, an upper surface 45A that faces upward, a lower surface 45B that faces downward, left and right inner surfaces 45C that face the center of the vehicle body in the left-right direction, and left and right outer surfaces 45D that face the outside of the vehicle body in lateral directions.

As shown in FIGS. 3 to 5 and 10 to 15, a right side upper part 45E of the fourth supporting member 45, which is adjacent to a positive terminal 5A of the battery 5, is located further forward of the terminals 5A and 5B, relative to the vehicle body, than a left side upper part 45F of the fourth supporting member 45, which is adjacent to a negative terminal 5B of the battery 5, so that the fourth supporting member 45 is asymmetrical in the left-right direction.

With this configuration, it is possible to prevent the positive terminal 5A of the battery 5 from being brought into contact with the right side upper part 45E of the fourth supporting member 45 and causing a short circuit when the battery 5 is to be attached to or removed from the mounting platform 44 from the rear side.

Figure 13:
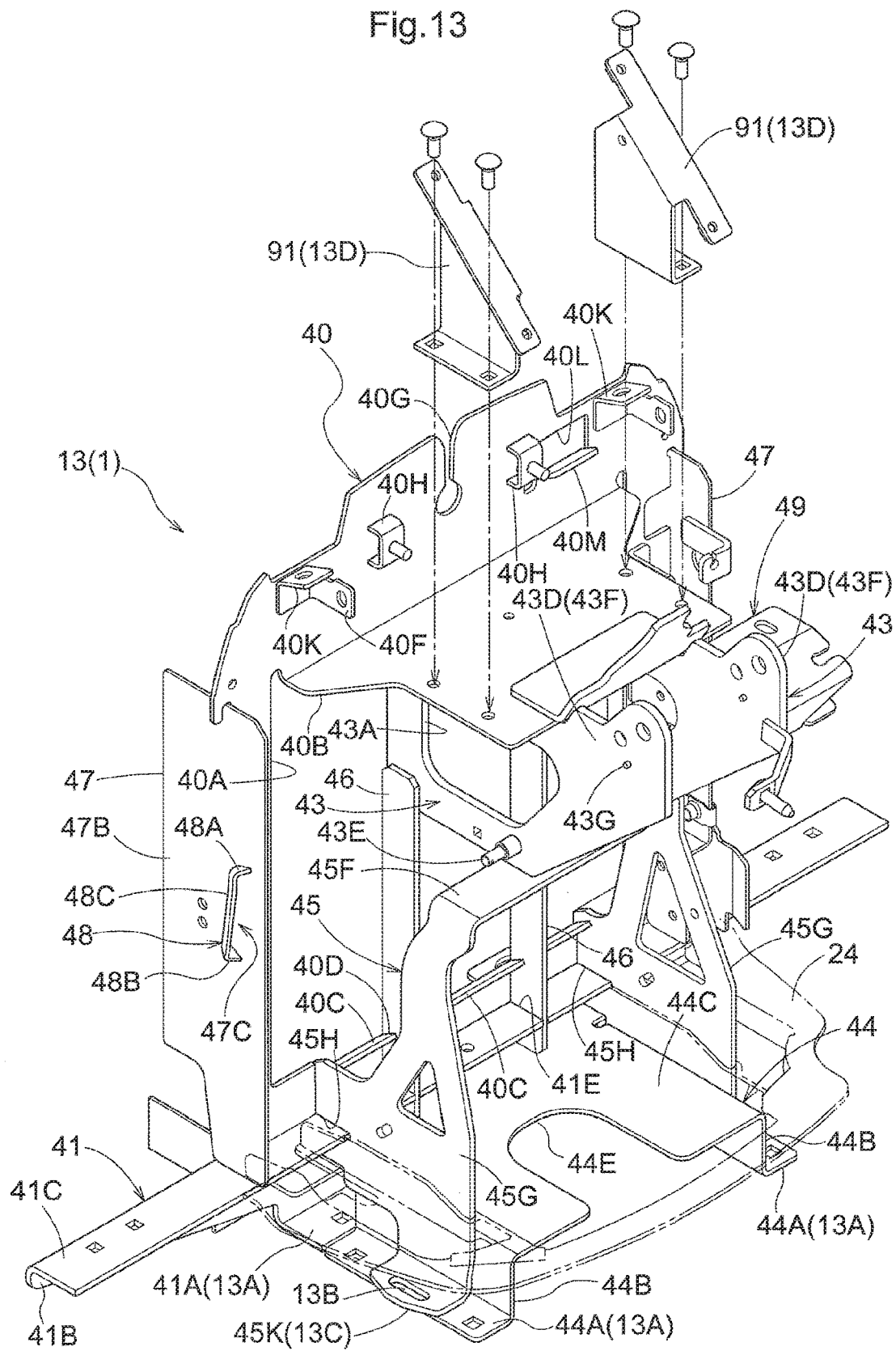
FIG. 13 is a perspective view showing a portion of the center pillar exploded.
Figure 14:
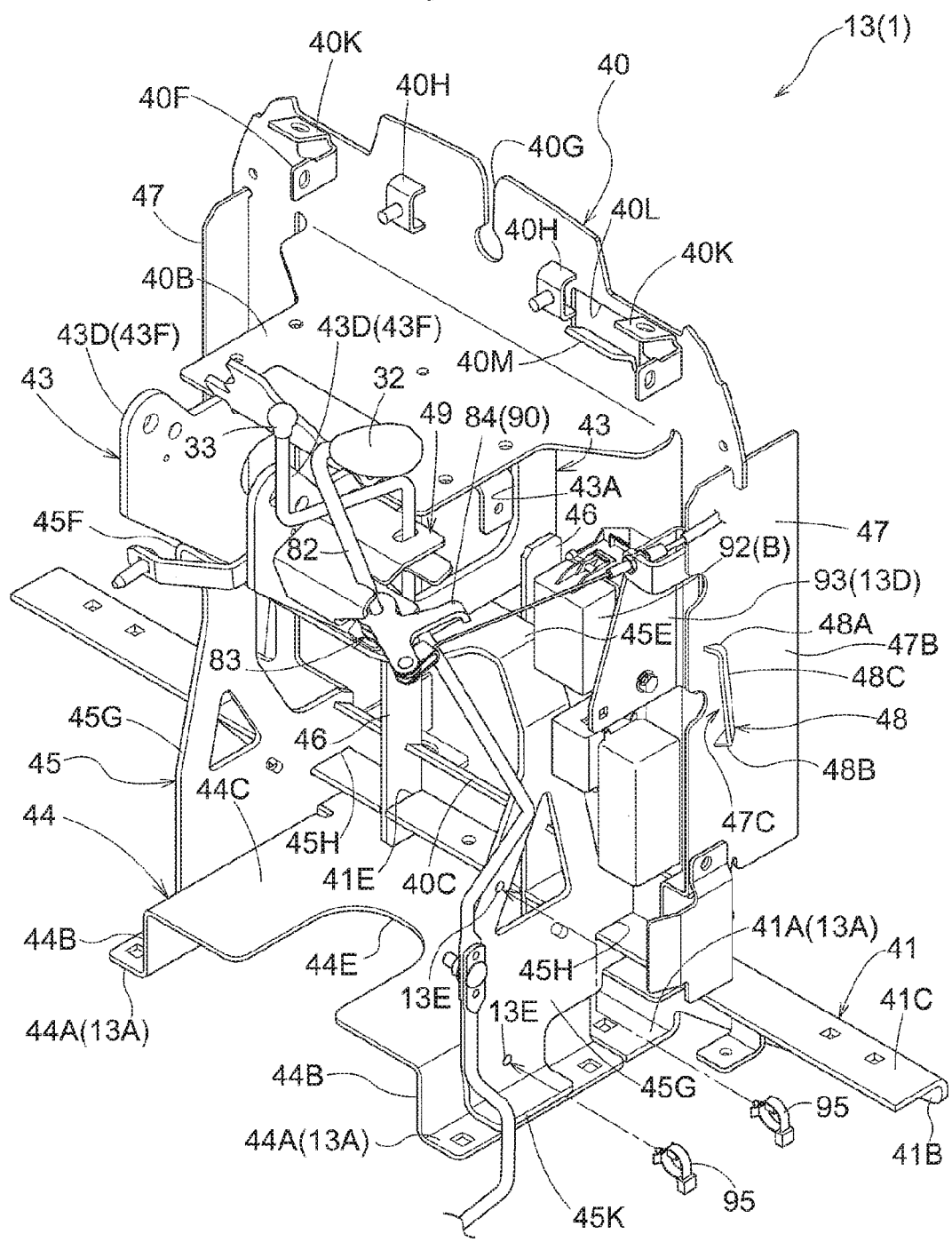
Figure 15:
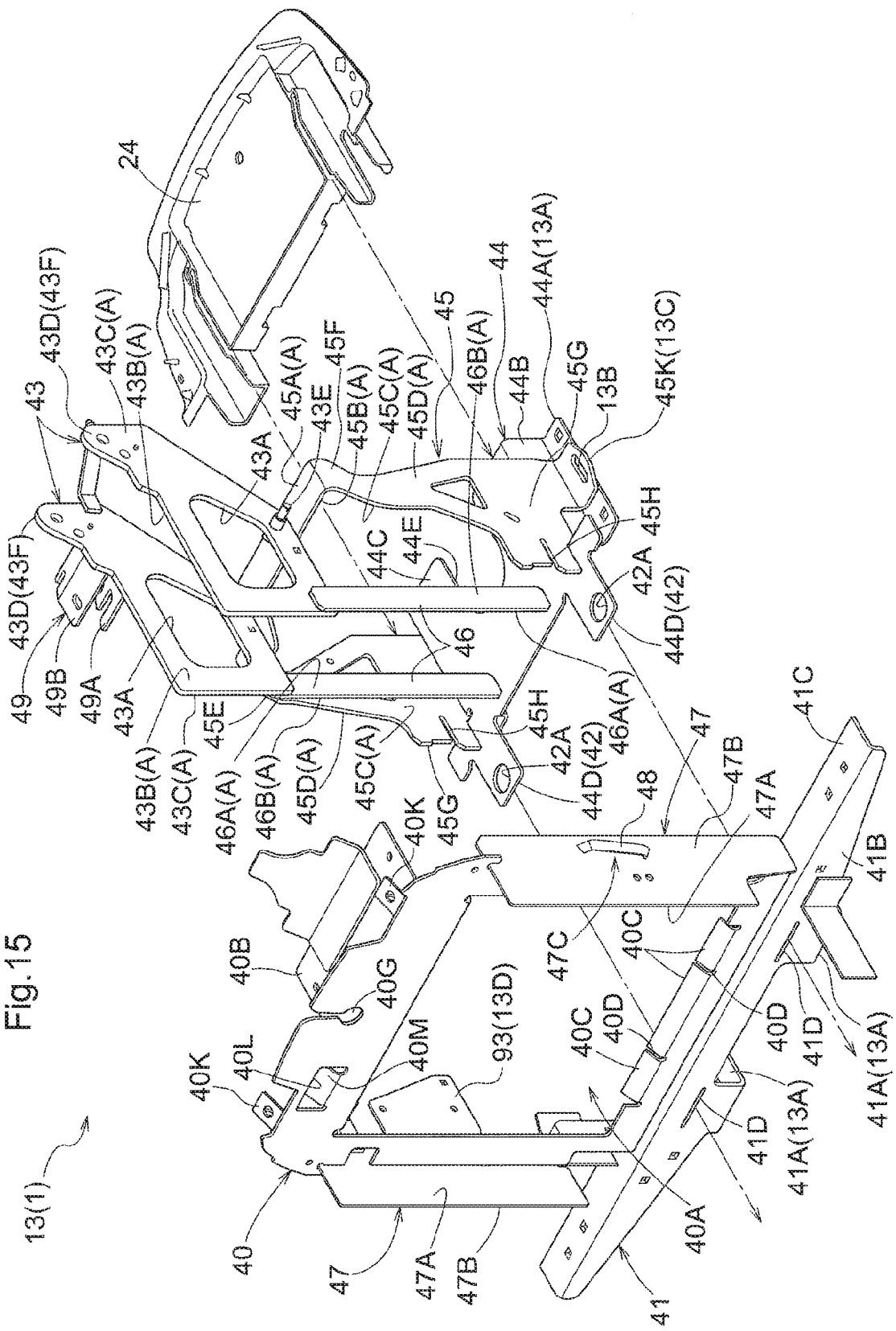
FIG. 15 is an exploded perspective view of the center pillar and a bottom plate that are divided into front parts and rear parts.
Figure 16:
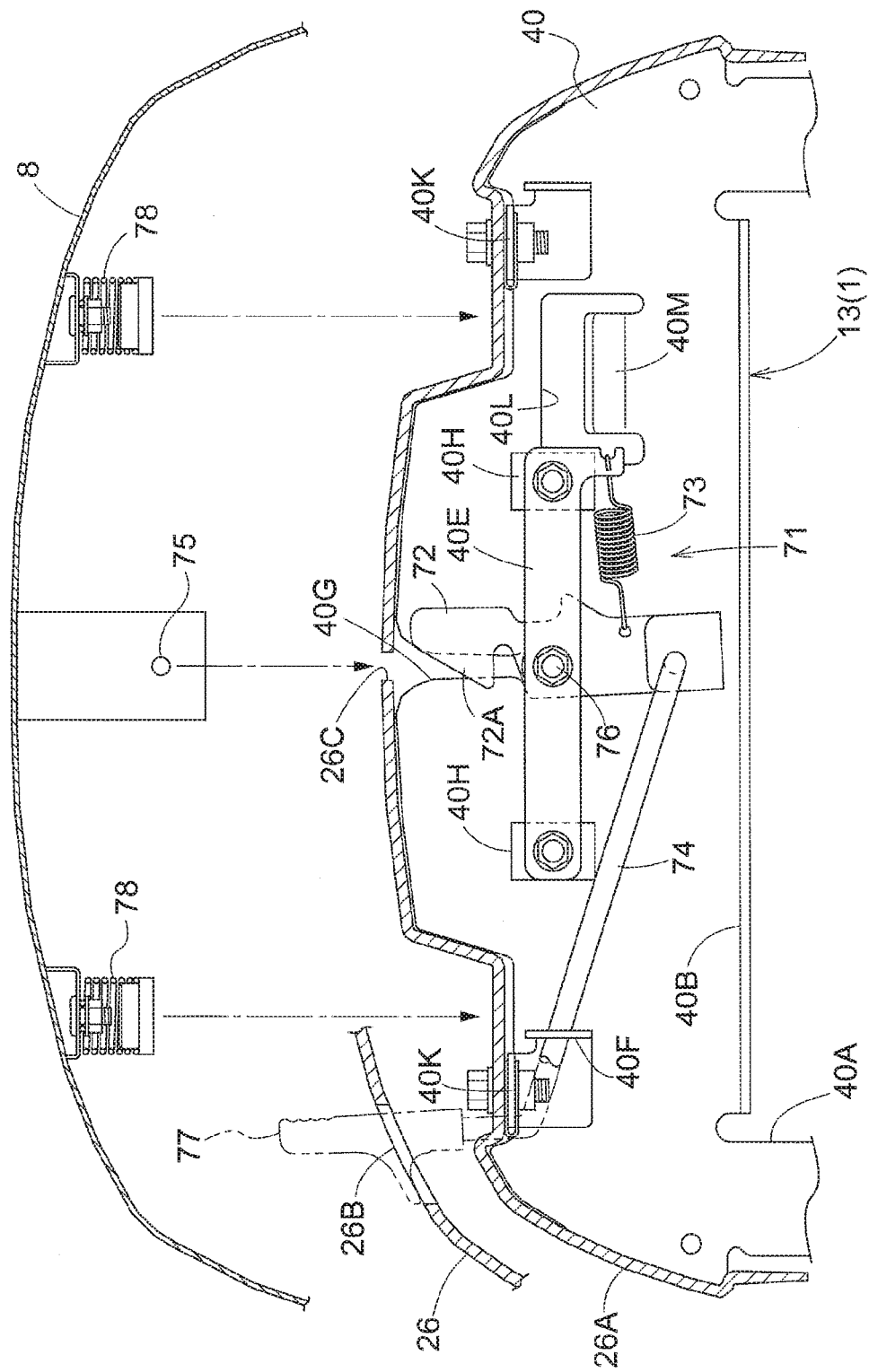
FIG. 16 is a vertical sectional rear view of a primary portion showing an upper part of the center pillar and a state of the hood before being fixed and held by a lock mechanism.
Figure 17:
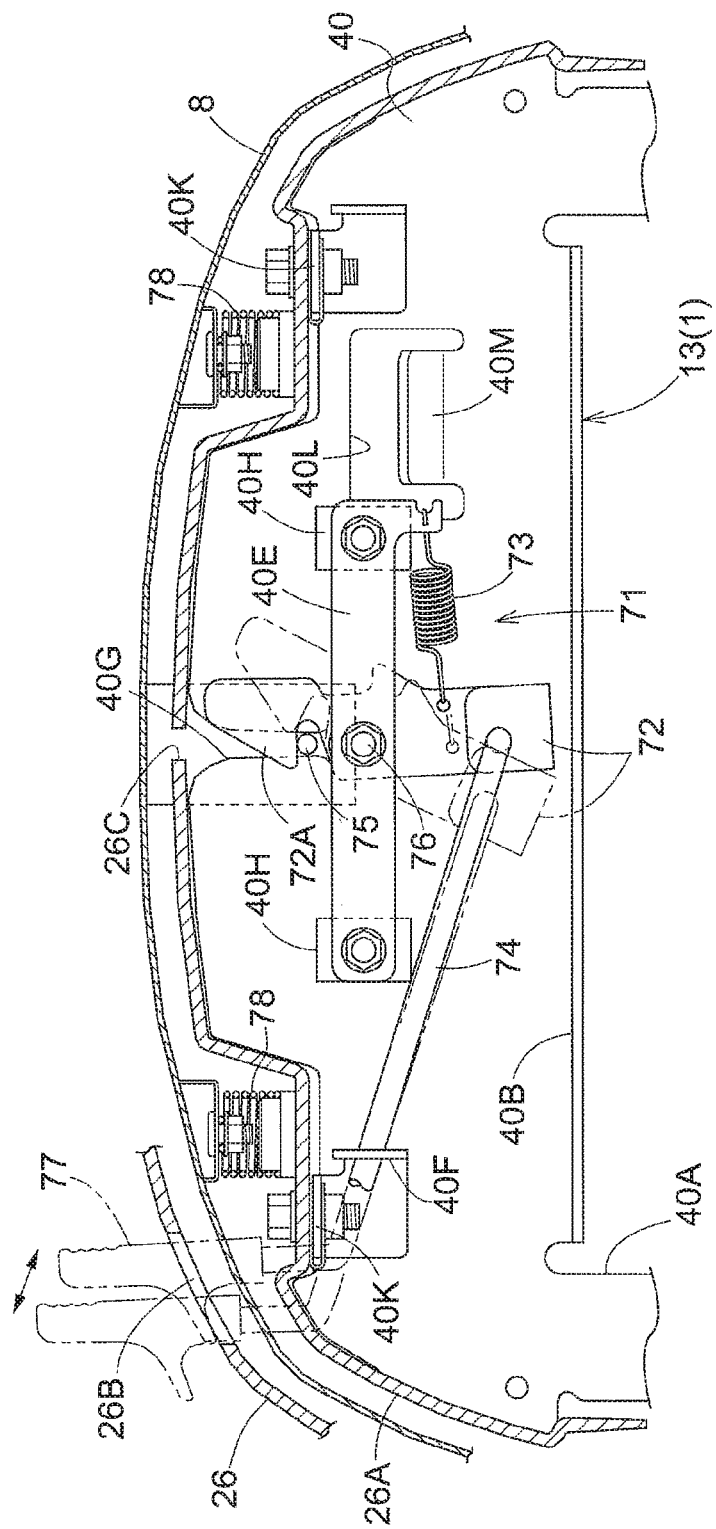
FIG. 17 is a vertical sectional rear view of a primary portion showing the upper part of the center pillar, and a state of the hood that is fixed and held by the lock mechanism and a state of the hood that has been released from the lock mechanism.
Figure 18:
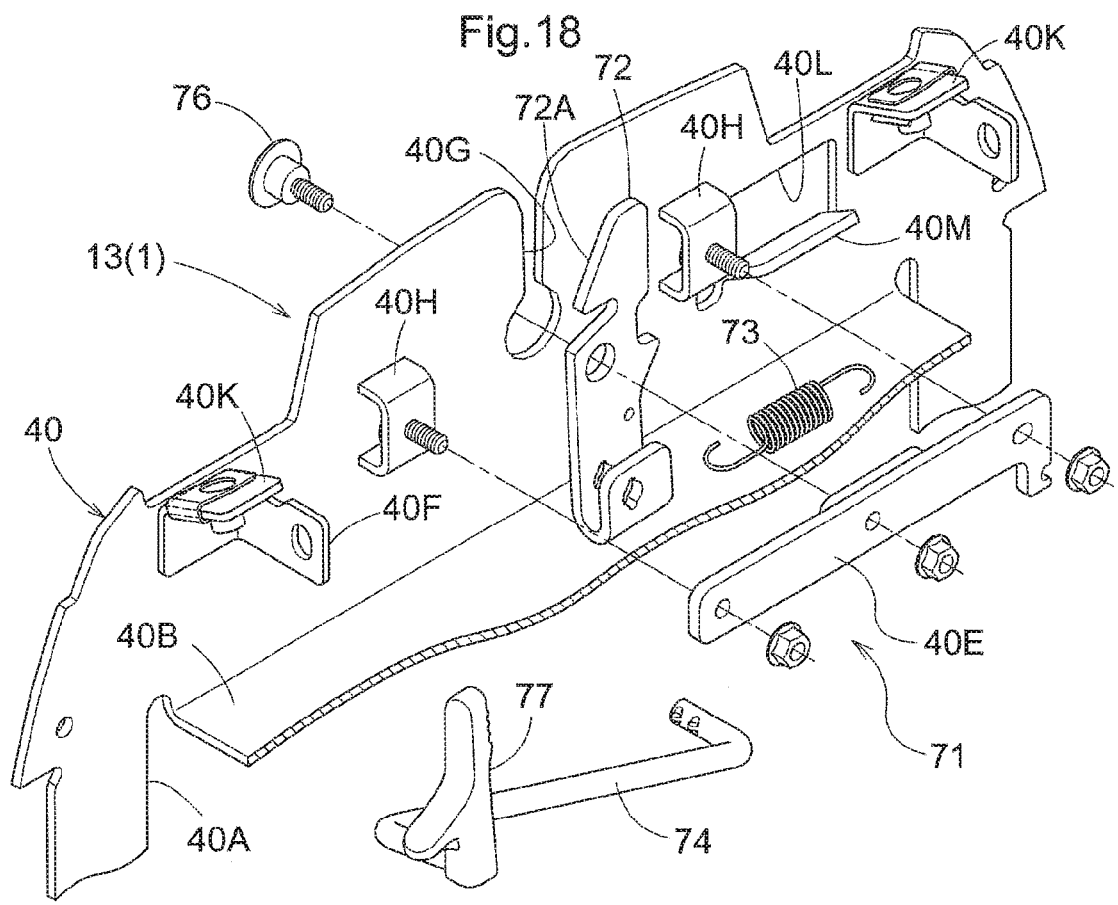
FIG. 18 is an exploded perspective view of a primary portion showing the upper part of the center pillar and the lock mechanism.

As shown in FIGS. 13 to 15, lower parts of the left and right side-plate parts 45G of the fourth supporting member 45 include slits 45H that extend rearward from the front ends of the left and right side-plate parts 45G and into which the top panel part 41C of the first supporting member 41 is inserted. In the fourth supporting member 45, a separation distance between the left and right side-plate parts 45G is set so that the fourth supporting member 45 straddles the battery 5 and the top panel part 44C of the mounting platform 44 in the left-right direction, and so that the left and right inner surfaces 45C are brought into surface contact with the left and right side panel parts 44B of the mounting platform 44.

With this configuration, when welding the first supporting member 41 and the fourth supporting member 45 to each other, an operator can easily and accurately position the first supporting member 41 and the fourth supporting member 45.

As a result, the operator can easily weld the first supporting member 41 and the fourth supporting member 45 to each other in an appropriate positional relationship.

As shown in FIGS. 3 to 5, 7, and 9 to 15, the center pillar 13 includes left and right reinforcing members 46 that are each made of a steel plate and span the first supporting member 41 and the left and right third supporting members 43 such that the left and right reinforcing members 46 take on an attachment orientation in which their flat surfaces A do not face the air inlet port 40A of the partition 40. Lower ends of the left and right reinforcing members 46 are welded to the first supporting member 41, and upper ends of the left and right reinforcing members 46 are welded to the left and right third supporting members 43.

With this configuration, it is possible to reinforce the center pillar 13 while preventing the amount of air to/from the radiator 20 from being reduced due to the flat surfaces A of the left and right reinforcing members 46 facing the air inlet port 40A of the partition 40.

Note that each of the left and right reinforcing members 46 has, as the flat surfaces A, an inner surface 46A that faces the center of the vehicle body in the left-right direction, and an outer surface 46B that faces the outside of the vehicle body in a lateral direction.

As shown in FIGS. 3 to 5, 7, and 10, the vehicle body frame 1 includes a fixing mechanism 51 that fixes the battery 5 at a position on the mounting platform. The fixing mechanism 51 includes, for example: left and right rods 52 that are supported by the left and right side-plate parts 45G that are left and right side parts of the fourth supporting member 45, so as to be swingable in the top-bottom direction; a pressing member 53 that is provided so as to span the left and right rods 52 and so as to be slidable relative to the left and right rods 52; and left and right nuts (first nuts) 54 that are attached to male screw parts 52A that are formed at free ends of the left and right rods 52. The fixing mechanism 51 can be operated to swing between: a fixing position at which the pressing member 53 is in contact with a corner part of a front end upper part of the battery 5; and a retracted position at which the pressing member 53 is located rearward of an lower end of the battery 5.

With this configuration, when fixing the battery 5 at a predetermined position on the mounting platform, an operator brings the battery 5 to the predetermined position on the mounting platform, and then fastens the left and right nuts 54, with the fixing mechanism 51 being located at the fixing position. Thus, the operator can fix the battery 5 at the predetermined position on the mounting platform under a condition where the battery 5 is pressed against the mounting platform 44 by the pressing member 53.

Also, when removing the battery 5 from the predetermined position on the mounting platform, the operator performs an operation to unfasten the left and right nuts 54. Thus, the operator can release the force of the pressing member 53 that presses the battery 5 against the mounting platform 44, and displace the fixing member 51 such that the fixing member 51 swings from the fixing position to the retracted position. Then, by displacing the fixing mechanism 51 such that the fixing mechanism 51 swings to the retracted position, it is possible to easily take out the battery 5 rearward, from the position on the mounting platform, without causing a problem in which the fixing mechanism 51 hinders the movement of the battery 5.

As shown in FIGS. 3 to 7 and 13 to 15, this tractor includes a power transmission shaft 56 that passes below the radiator 20 and transmits power from an output pulley 55 that serves as an output part of the prime mover unit 2 to an input shaft (not shown) of the HST that serves as an input part of the transmission unit 3. The center pillar 13 includes the left and right leg parts 13A that are supported by the top panel 16 of the base frame 12, and a space 57 where a power transmission shaft is to be located is formed between the center pillar 13 and the top panel 16. A front part of the top panel 16 located below the radiator 20 includes an opening 16A that allows the entrance of the power transmission shaft 56 when the power transmission shaft 56 is attached or removed. The mounting platform 44 includes a recessed part 44E that extends forward from the rear end of the mounting platform 44, and that allows the entrance of the power transmission shaft 56 when the power transmission shaft 56 is attached or removed.

With the above-described configuration, when the power transmission shaft 56 is inserted into or removed from the space 57 between the top panel 16 and the center pillar 13, an operator can easily change the orientation of the power transmission shaft 56 to a rearward-lifted orientation for insertion and removal and to a horizontal orientation for power transmission coupling, without being hindered by the top panel 16 or the mounting platform 44, by using the opening 16A of the top panel 16 and the recessed part 44E of the mounting platform 44.

As a result, it is easier to insert/remove the power transmission shaft 56 from above the top panel 16, into/from the space 57 between the top panel 16 and the center pillar 13.

Note that the above-described insertion and removal of the power transmission shaft 56 into/from the space 57 between the top panel 16 and the center pillar 13 can be performed under a condition where the battery 5, the bottom panel 24, the boarding step 30 and so on have been removed from the base frame 12, a space above the base frame 12 is open, and the power transmission coupling between: the output pulley 55 of the engine 18 and the input shaft of the HST; and the power transmission shaft 56 has been released.

As shown in FIGS. 3, 4, 7, and 11 to 15, a rear part of the radiator 20 includes a dust proof net 58 that can be removed upward. The partition 40 includes a guide part 40C that guides dust that falls downward from the dust proof net 58 to a position below the radiator 20. The guide part 40C is curved so as to take on a rearward-lifted orientation in which the guide part 40C extends in a rearward and upward direction from a lower edge of the inner peripheral edge of the partition 40 for the air inlet port.

With this configuration, it is possible to effectively use a steel plate portion in a central portion of the partition 40, which is unnecessary after the air inlet port 40A has been formed, to prevent a problem in which dust that has fallen from the dust proof net 58 flows inward of the center pillar 13 from the air inlet port 40A and builds up on the bottom panel and so on. Also, it is possible to reinforce a lower part of the partition 40 and improve the strength of the center pillar 13 without adding a new reinforcing member.

Note that dust that has been guided by the guide part 40C to a position below the radiator 20 falls down from the opening 16A of the top panel 16 located below the radiator 20, or is guided by a front part of the top panel 16 disposed below the radiator 20 and is inclined in a frontward-lowered orientation, to the space 17 of the base frame 12 between the front end member 15 and the front end of the top panel 16, and is thus discharged to the outside of the vehicle.

The guide part 40C has a width in the left-right direction that spans the left and right side-plate parts 45G of the fourth supporting member 45, and is located above the first supporting member 41. The guide part 40C includes left and right slits 40D into which front parts of the left and right reinforcing members 46 are inserted, and the left and right slits 40D extend forward from the rear end of the guide part 40C. The top panel part 41C of first supporting member 41 includes left and right second slits 41E that are located at positions that face the left and right slits 40D of the guide part 40C so as to extend forward from the rear end of the top panel part 41C, and into which front parts of the left and right reinforcing members 46 are inserted.

With the above-described configuration, the left and right reinforcing members 46 can be provided so as to span the top panel part 44C of the mounting platform 44 and the left and right third supporting members 43. As a result, it is possible to more effectively reinforce the center pillar 13 by using the left and right reinforcing members 46.

Also, when welding the left and right reinforcing members 46 to the first supporting member 41, the third supporting members 43, and so on, an operator can easily and accurately position the left and right reinforcing members 46 relative to the first supporting member 41, the third supporting members 43, and so on. As a result, the operator can easily weld the left and right reinforcing members 46 to the first supporting member 41, the third supporting members 43, and so on such that they are in an appropriate positional relationship.

As shown in FIGS. 3 to 5, 8 to 10, 13, and 15, this tractor includes a tilt unit 60 that supports the steering wheel 31 such that the steering wheel 31 is swingable in the top-bottom direction. The tilt unit 60 includes, for example: a swing member 62 that swings integrally with the steering wheel 31 about left and right first pivot shafts 61 that are orientated in the left-right direction; a gas spring 63 that assists an operation to swing the swing member 62; and an operation lever 64 that is operated between a lock position at which the swing member 62 is prevented from swinging in the top-bottom direction, and an unlock position at which the swing member 62 is allowed to swing in the top-bottom direction. The left and right third supporting members 43 include first supporting parts 43D that support the swing member 62 with the left and right first pivot shafts 61 being interposed therebetween. The left third supporting member 43 includes: a first pivot shaft 43E that is orientated in the left-right direction and supports a lower end of the gas spring 63 so as to allow relative swinging of the lower end; and a second supporting part 43F that supports the operation lever 64 so as to allow the operation lever 64 to swing.

With the above-described configuration, the driver can easily adjust the height of the steering wheel 31 according to the driver's physical build by operating the operation lever 64 to swing and operating the steering wheel 31 to swing.

Also, the third supporting members 43 of the center pillar 13 can also serve as supporting members that support the tilt unit 60. As a result, it is possible to enable the center pillar 13 to carry out multiple functions, while, for example, simplifying the configuration by reducing the number of parts compared to, for example, a case where a dedicated supporting member that supports the tilt unit 60 is newly added.

Although not shown in the drawings, the swing member 62 is made of a steel plate, and is curved into a U shape that has left and right side-plate parts that are in surface contact with inner surfaces of the left and right third supporting members 43, and a top plate part that spans the left and right side-plate parts. The left and right side-plate parts are coupled to the left and right third supporting members 43 so as to be swingable, with the left and right first pivot shafts 61 and so on being interposed therebetween. The left side-plate part includes a second pivot shaft 62A that is orientated in the left-right direction and supports an upper end of the gas spring 63 so as to allow relative swinging of the upper end.

Figure 3:
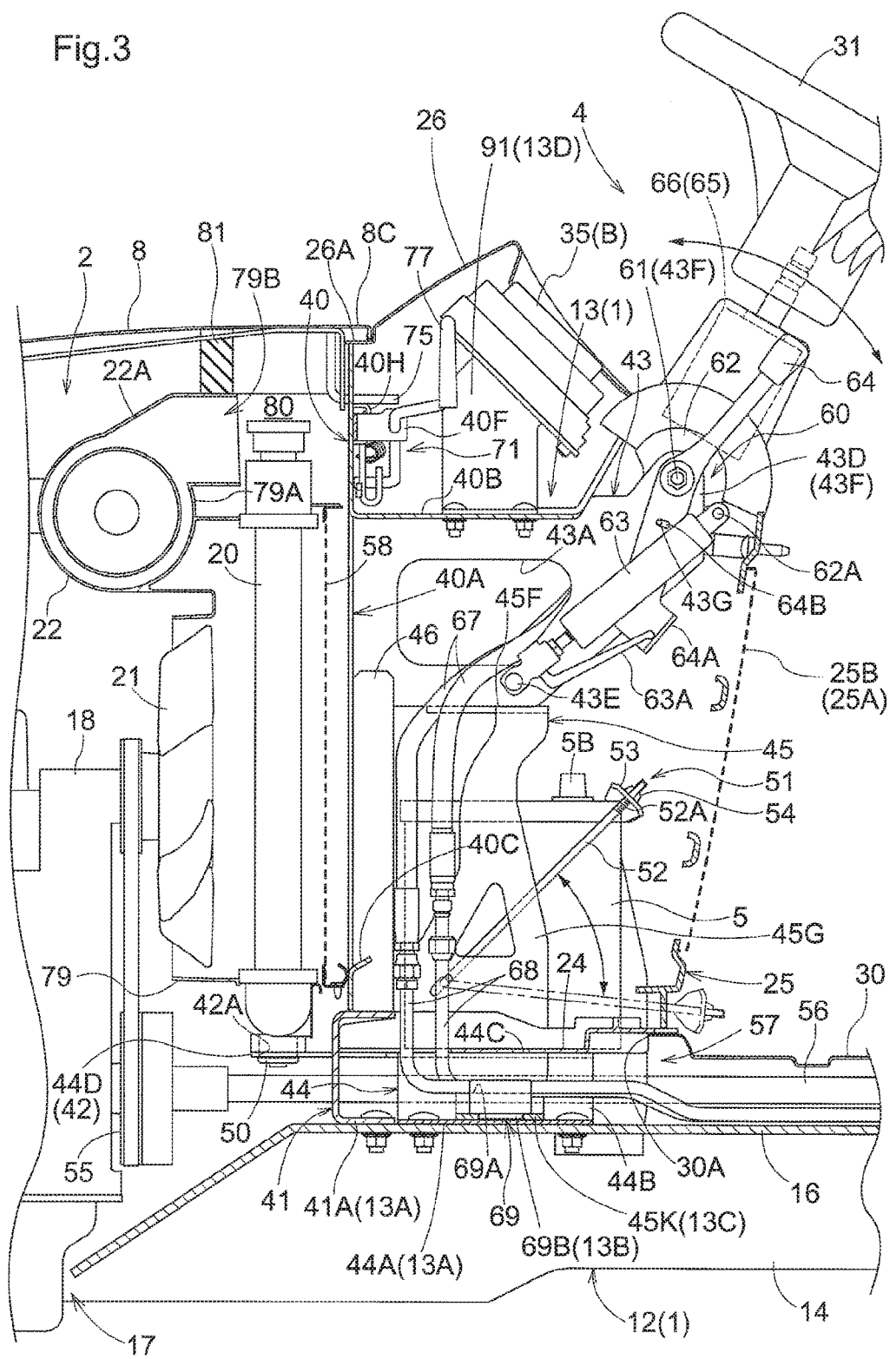
FIG. 3 is a vertical sectional left side view of a primary portion showing a center pillar and an area in the vicinity thereof.
Figure 5:
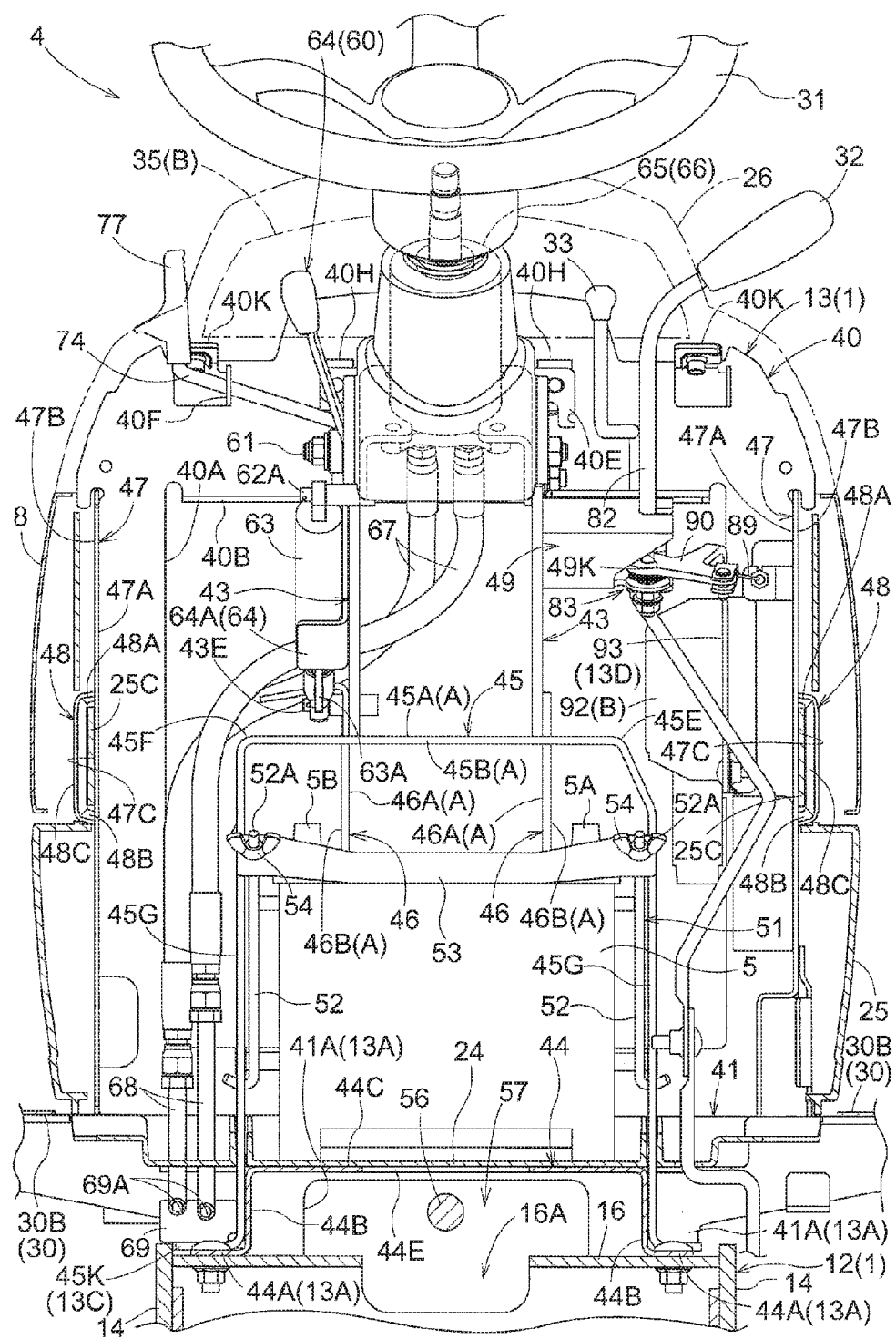
FIG. 5 is a vertical sectional rear view of a primary portion showing the center pillar and the area in the vicinity thereof.
Figure 6:
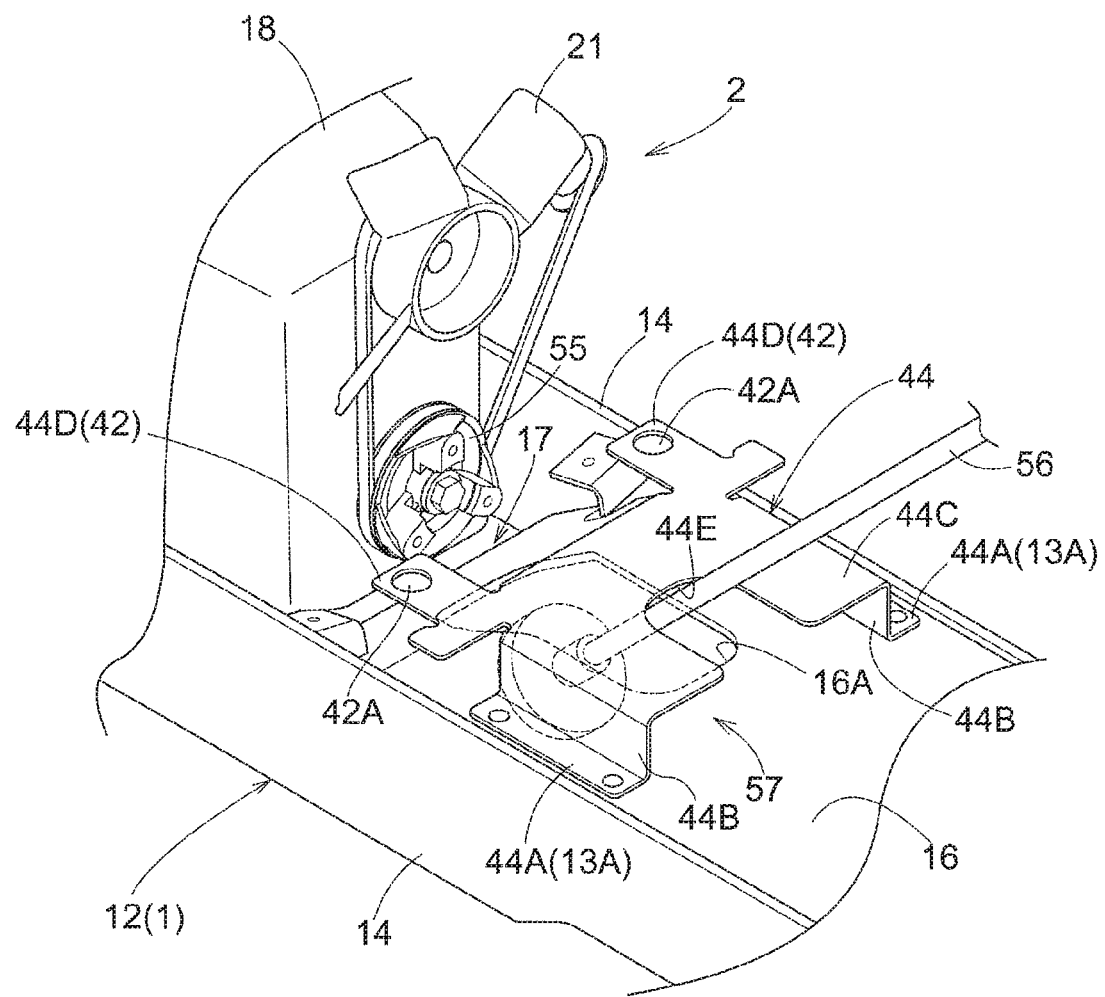
FIG. 6 is a perspective view of a primary portion showing a mounting platform, which relates to attachment and detachment of a power transmission shaft, and an area in the vicinity thereof.
Figure 10:
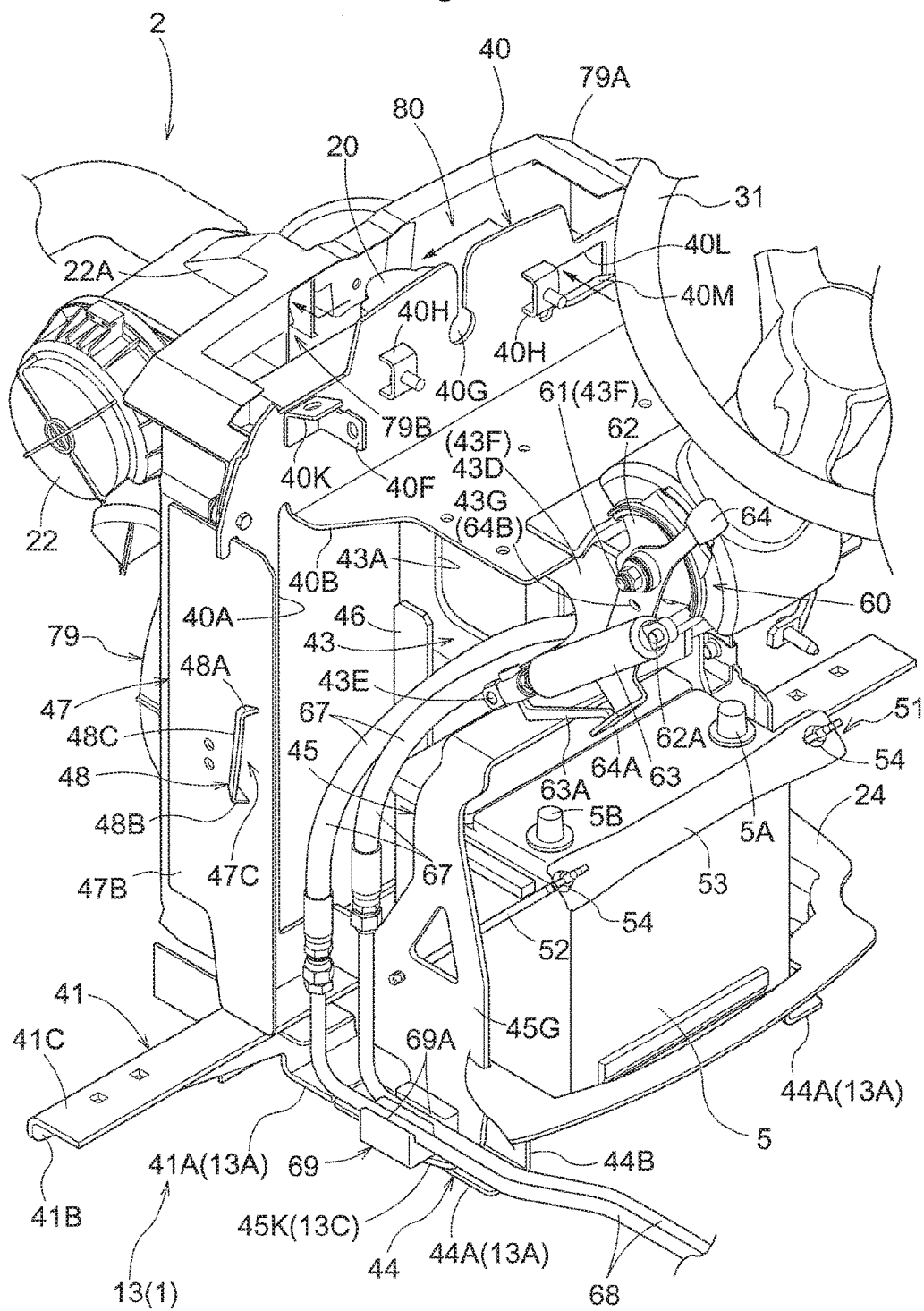
FIG. 10 is a perspective view of a primary portion showing the center pillar and the area in the vicinity thereof.
Figure 11:
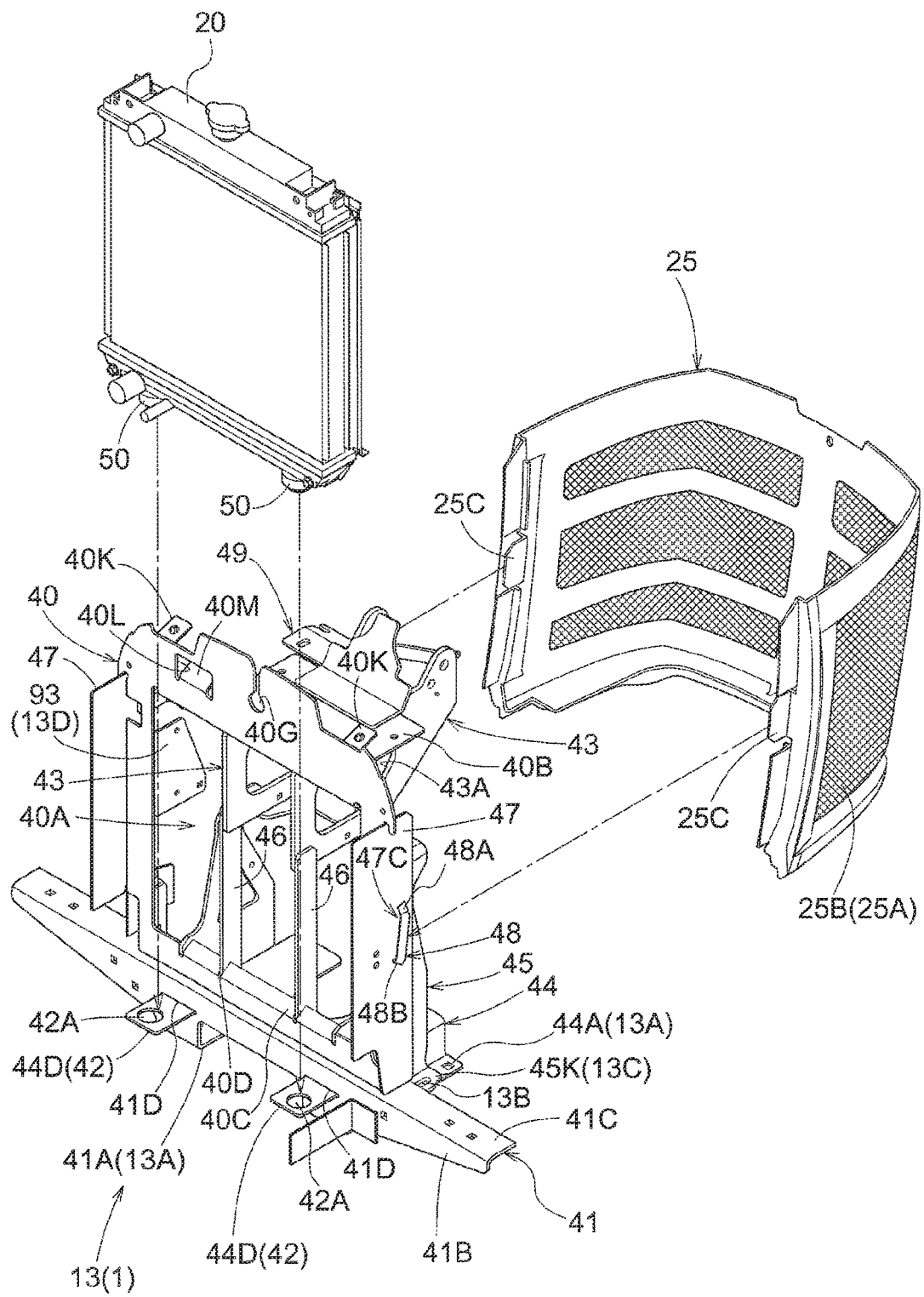
FIG. 11 is an exploded perspective view of a radiator and an under panel relative to the center pillar.

As shown in FIGS. 3, 5, and 10, the end of the gas spring 63 on the piston rod side is supported by the first pivot shaft 43E, and the end of the gas spring 63 on the cylinder tube side is supported by the second pivot shaft 62A. The gas spring 63 includes, for example: a swing arm 63A that swings between a lock position at which the swing arm 63A prevents the gas spring 63 from expanding or contracting and an unlock position at which the swing arm 63A allows the gas spring 63 to expand and contract; and a spring (not shown) that biases the swing arm 63A such that the swing arm 63A returns to the lock position. The operation lever 64 includes an operation piece 64A that is of a one-sided contact type and that presses and moves the swing arm 63A from the lock position to the unlock position in conjunction with the operation lever 64 swinging from the lock position to the unlock position.

With the above-described configuration, upon the operation lever 64 being manually operated from the lock position to the unlock position, the swing arm 63A is displaced in conjunction with the operation so as to swing from the lock position to the unlock position against the force of the spring. As a result of the swing arm 63A being displaced so as to swing, the gas spring 63 is allowed to expand and contract, and it becomes possible to adjust the height of the steering wheel 31.

Upon the manual operation to move the operation lever 64 to the unlock position being cancelled, the swing arm 63A returns from the unlock position to the lock position by swinging, due to the effect of the spring, and this return swing causes the operation lever 64 to return from the unlock position to the lock position by swinging. As a result of this return swing, the gas spring 63 is prevented from expanding or contracting. Thus, it is possible to fix and hold the steering wheel 31 at a desired height.

The operation lever 64 is supported by the left first pivot shaft 61 so as to be relatively swingable.

With this configuration, it is possible to reduce the number of parts required for the tilt unit 60, compared to the case where a dedicated pivot shaft that supports the operation lever 64 is provided.

Also, since the first supporting parts 43D also serve as the second supporting parts 43F, it is possible to enable the center pillar 13 to carry out multiple functions, while, for example, simplifying the configuration of the center pillar 13.

As shown in FIG. 3, the left third supporting member 43 includes a stopper pin 43G that is orientated in the left-right direction and limits the range of swing of the operation lever 64. The operation lever 64 includes an elongated hole 64B that is orientated in the front-rear direction and into which the stopper pin 43G is inserted. Regarding the operation lever 64, a front side operation position at which the front end of the inner peripheral edge that defines the elongated hole 64B is brought into contact with the stopper pin 43G is set as the lock position, and a rear side operation position at which the rear end of the inner peripheral edge is brought into contact with the stopper pin 43G is set as the unlock position.

As shown in FIGS. 3 to 5 and 10, this tractor includes a full hydraulic type power steering unit (hereinafter referred to as "the PS unit") 65. The PS unit 65 includes, for example: a hydraulic control part 66 that is supported by the swing member 62 of the tilt unit 60; hydraulic hoses 67 that are connected to the hydraulic control part 66; and hydraulic pipes 68 that are made of metal and are connected to the hydraulic hoses 67. A lower end of the center pillar 13 includes a holder 69 that is made of rubber and holds the hydraulic pipes 68.

With the above-described configuration, it is possible to prevent the hydraulic pipes 68 from resonating.

Also, it is possible to set the connection points of the hydraulic hoses 67 and the hydraulic pipes 68 at lower positions that are distanced from the hydraulic control part 66. With this configuration, it is possible to elongate the hydraulic hoses 67 that allow the hydraulic control part 66 to swing integrally with the swing member 62 when the height of the steering wheel 31 is adjusted. As a result, it is possible to enlarge the adjustable range of height of the steering wheel 31.

The PS unit 65 includes a steering cylinder (not shown) that is of a double-acting type and steers the left and right front wheels 6. The PS unit 65 includes, as the hydraulic hoses 67: one oil supply hose that guides oil from a hydraulic pump (not shown) to the hydraulic control part 66; two oil supply and drainage hoses that span the hydraulic control part 66 and the steering cylinder; and one oil drainage hose that guides oil from the hydraulic control part 66 to the transmission case 29. The PS unit 65 includes, as the hydraulic pipes 68: one oil supply pipe that is connected to the oil supply hose and guides oil from the hydraulic pump to the oil supply hose; and one oil drainage pipe that is connected to the oil drainage hose and guides oil from the oil drainage hose to the inside of the transmission case 29.

As shown in FIGS. 3, 5, 10 to 13, and 15, a lower end of the center pillar 13 includes a mounting part 13C in which an elongated hole 13B for positioning is formed. An upper surface of the holder 69 includes left and right fitting holes 69A into which the hydraulic pipes 68 are fitted from above, and a bottom surface of the holder 69 includes a protrusion 69B that is fitted into the elongated hole 13B from above. With this configuration, when attaching the hydraulic pipes 68 to predetermined positions of the center pillar 13, an operator can mount the holder 69 on the mounting part 13C such that the holder 69 is prevented from being displaced in the horizontal direction, by fitting the protrusion 69B of the holder 69 into the elongated hole 13B of the mounting part 13C. Then, after mounting the holder 69, it is possible to prevent the protrusion 69B of the holder 69 from becoming separated from the elongated hole 13B of the mounting part 13C by fitting the hydraulic pipes 68 into the fitting holes 69A of the holder 69 from above.

As a result, it is possible to fix and hold the hydraulic pipes 68 at the predetermined positions of the center pillar 13 such that the holder 69 prevents the hydraulic pipes 68 from resonating, while improving the attachability of the hydraulic pipes 68.

In the center pillar 13, left and right supported parts 45K of the fourth supporting member 45 are formed by bending lower ends of the left and right side-plate parts 45G. The supported parts 45K are supported by the base frame 12, with the left and right coupling parts 44A of the mounting platform 44 being interposed therebetween. The left supported part 45K also serves as the mounting part 13C for the holder.

With this configuration, it is possible to enable the center pillar 13 to carry out multiple functions, while, for example, simplifying the configuration by reducing the number of parts compared to the case where the center pillar 13 includes a dedicated part for mounting the holder.

As shown in FIGS. 5 and 7 to 15, the center pillar 13 includes left and right side walls 47 that are each made of a steel plate and are located on the left and the right of the partition 40. Lower ends of the left and right side walls 47 are welded to the first supporting member 41, and inner surfaces 47A of the left and right side walls 47 are welded to lateral ends of the partition 40. With this configuration, the strength of the center pillar 13 is improved.

As shown in FIGS. 5, 7, and 10 to 15, the left and right side walls 47 include left and right positioning members 48 that are welded to the left and right side walls 47. The left and right positioning members 48 are each made of a steel plate and curved into a U-shape, and vertically elongated slits 47C are formed between the left and right positioning members 48 and outer surfaces 47B of the left and right side walls 47. Left and right front ends of the under panel 25 include insertion parts 25C that are vertically elongated and are inserted into the left and right slits 47C.

With the above-described configuration, when attaching the under panel 25 to a predetermined attachment position, an operator can easily position the under panel 25 relative to the predetermined attachment position by inserting the left and right insertion parts 25C of the under panel 25 into the slits 47C of the left and right side walls 47.

Also, since the left and right side walls 47 also serve as positioning members for positioning the under panel 25, it is possible to enable the center pillar 13 to carry out multiple functions.

Upper ends 48A of the left and right positioning members 48 are inclined in a rearward-lifted orientation, and lower ends 48B of the left and right positioning members 48 are inclined in a rearward-lowered orientation. Inner surfaces of the upper ends 48A and inner surfaces of the lower ends 48B are formed as first guide surfaces that guide and position the insertion parts 25C in the top-bottom direction.

With this configuration, an operator can easily and accurately position the under panel 25 relative to the predetermined attachment position in the top-bottom direction.

Intermediate parts 48C of the left and right positioning members 48 are inclined so as to be gradually separated from the side walls 47, in the rearward direction, and inner surfaces of the intermediate parts 48C are formed as second guide surfaces that guide and position the insertion parts 25C in the left-right direction.

With this configuration, an operator can easily and accurately position the under panel 25 relative to the predetermined attachment position in the left-right direction.

Upper and lower end portions of the front ends of the left and right insertion parts 25C are chamfered. With this configuration, it is easier to insert the left and right insertion parts 25C into the left and right slits 47C.

Figure 7:
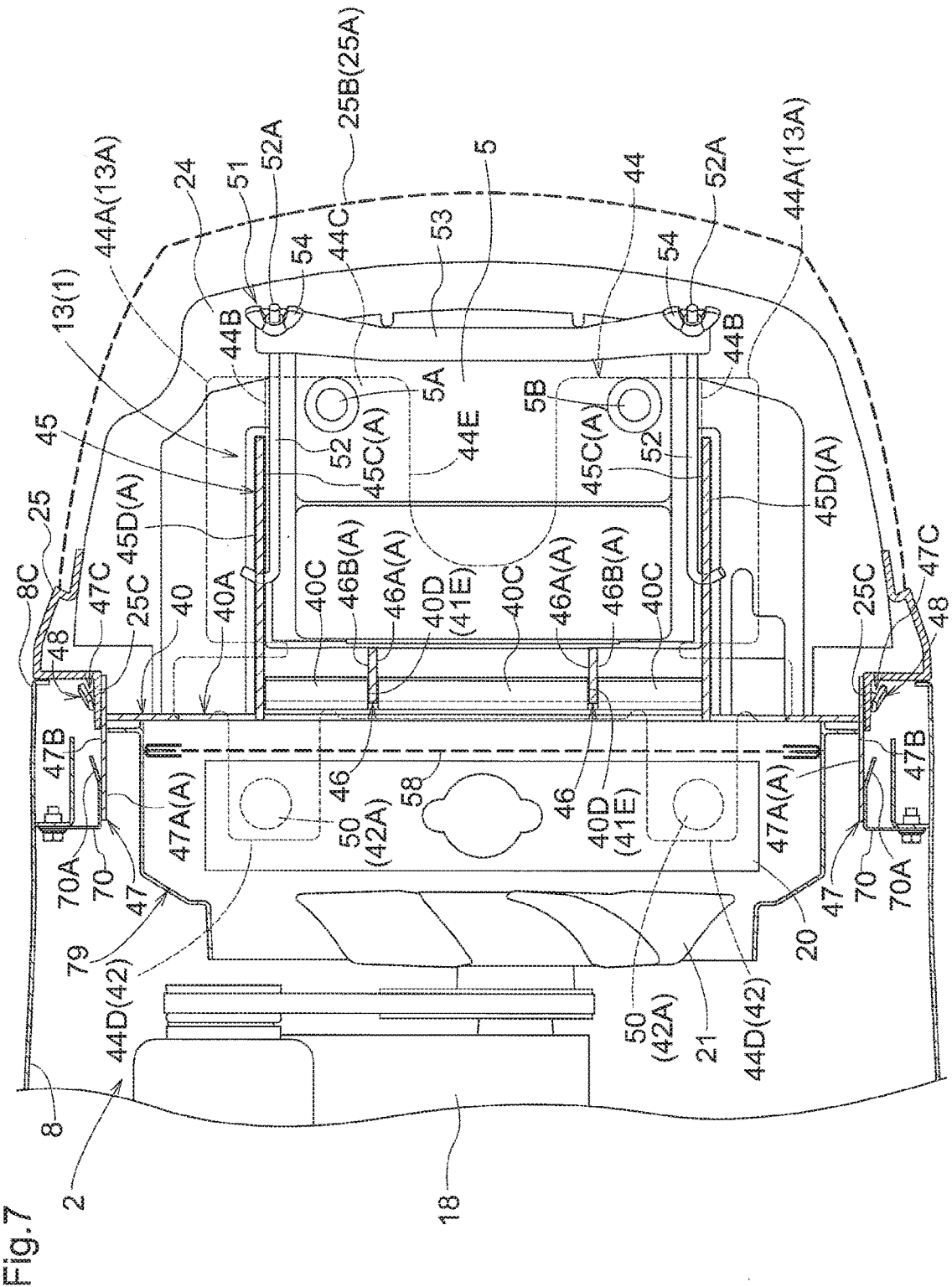
FIG. 7 is a plan view in transverse section of a primary portion showing the center pillar and the area in the vicinity thereof.
Figure 12:
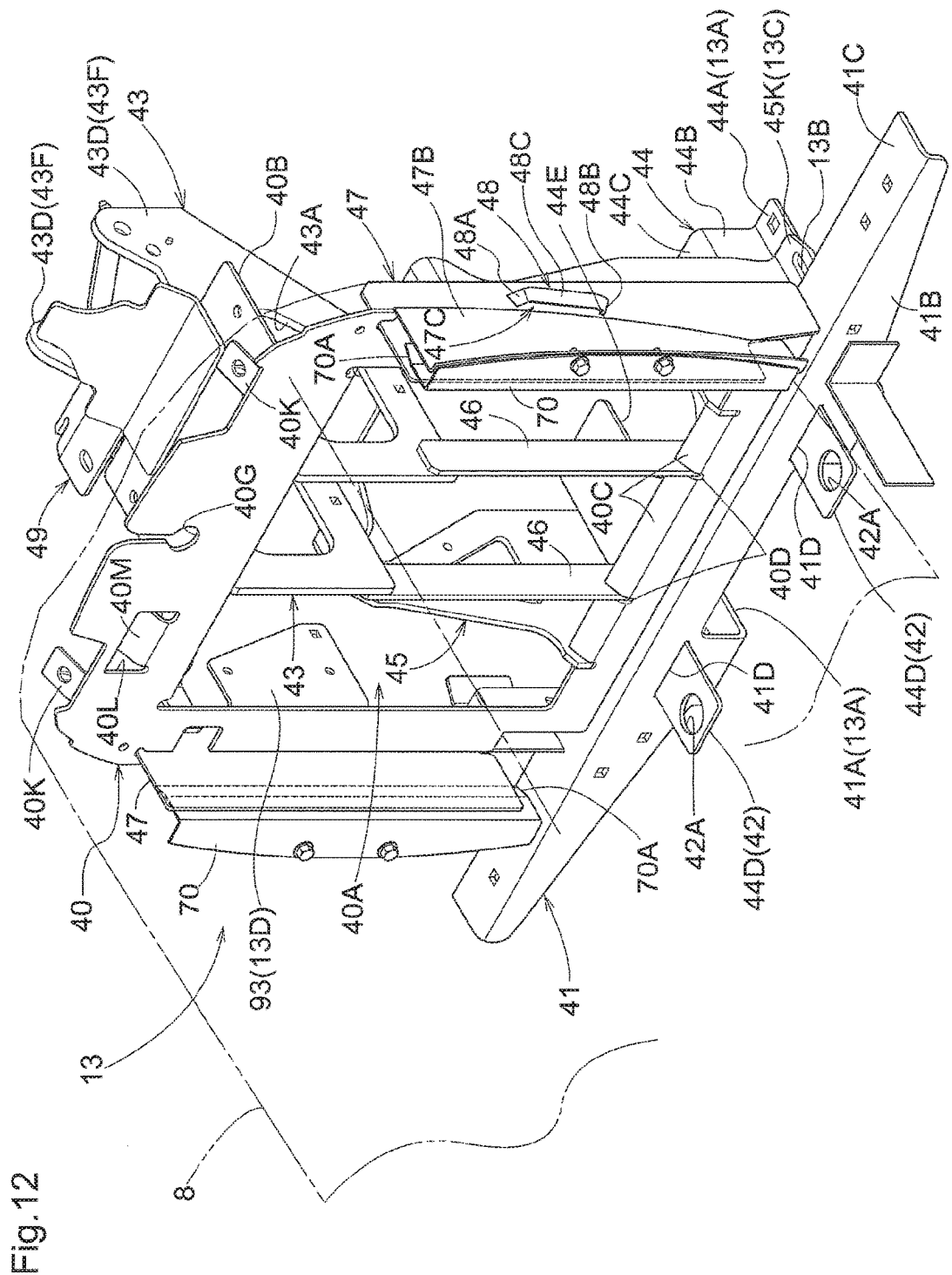
FIG. 12 is a perspective view of a primary portion showing the center pillar and a sealing structure of the center pillar and a hood using left and right leaf springs.

As shown in FIGS. 7 and 12, left and right inner surfaces of the hood 8 include left and right leaf springs 70 that span the upper ends and the lower ends of the left and right side walls 47 and are brought into surface contact with the outer surfaces 47B of the left and right side walls 47 when the hood 8 is at the closed position. The left and right leaf springs 70 are formed such that rear end edges 70A of the left and right leaf springs 70 are inclined laterally outward relative to the vehicle body, in the rearward direction.

With the above-described configuration, when the hood 8 is operated to be closed, the rear end edges 70A of the left and right leaf springs 70 are brought into contact with the outer surfaces 47B of the left and right side walls 47, and thus it is possible to position the hood 8 relative to the center pillar 13 in the left-right direction.

When the hood 8 is at the closed position, the left and right leaf springs 70 are in surface contact with the left and right side walls 47 as described above, and thus it is possible to avoid, over a long period, the risk of unnecessary gaps being formed between the hood 8 and the left and right side walls 47, without using a rubber trim having low durability.

Figure 4:
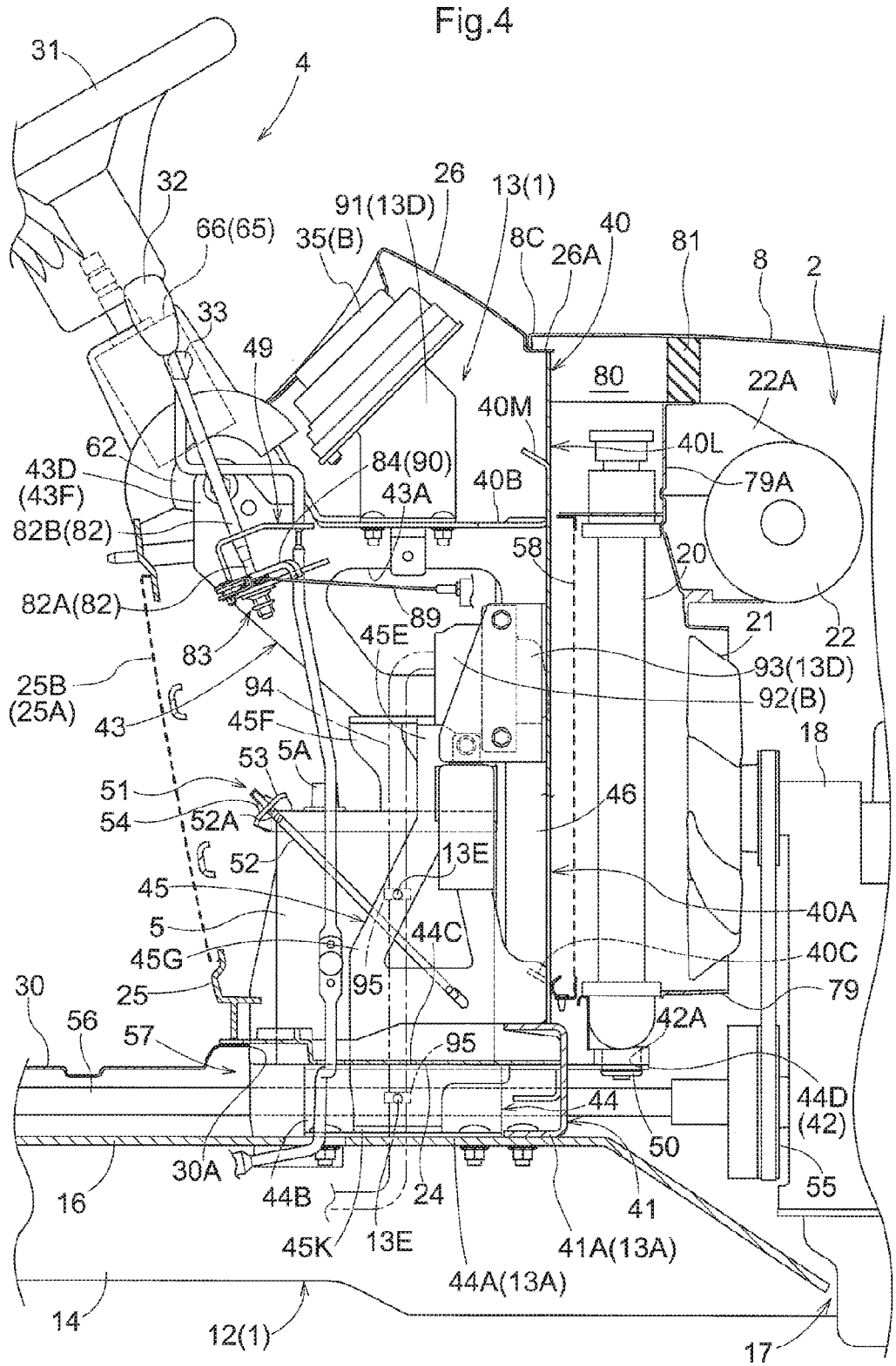
FIG. 4 is a vertical sectional right side view of a primary portion showing the center pillar and the area in the vicinity thereof.
Figure 8:
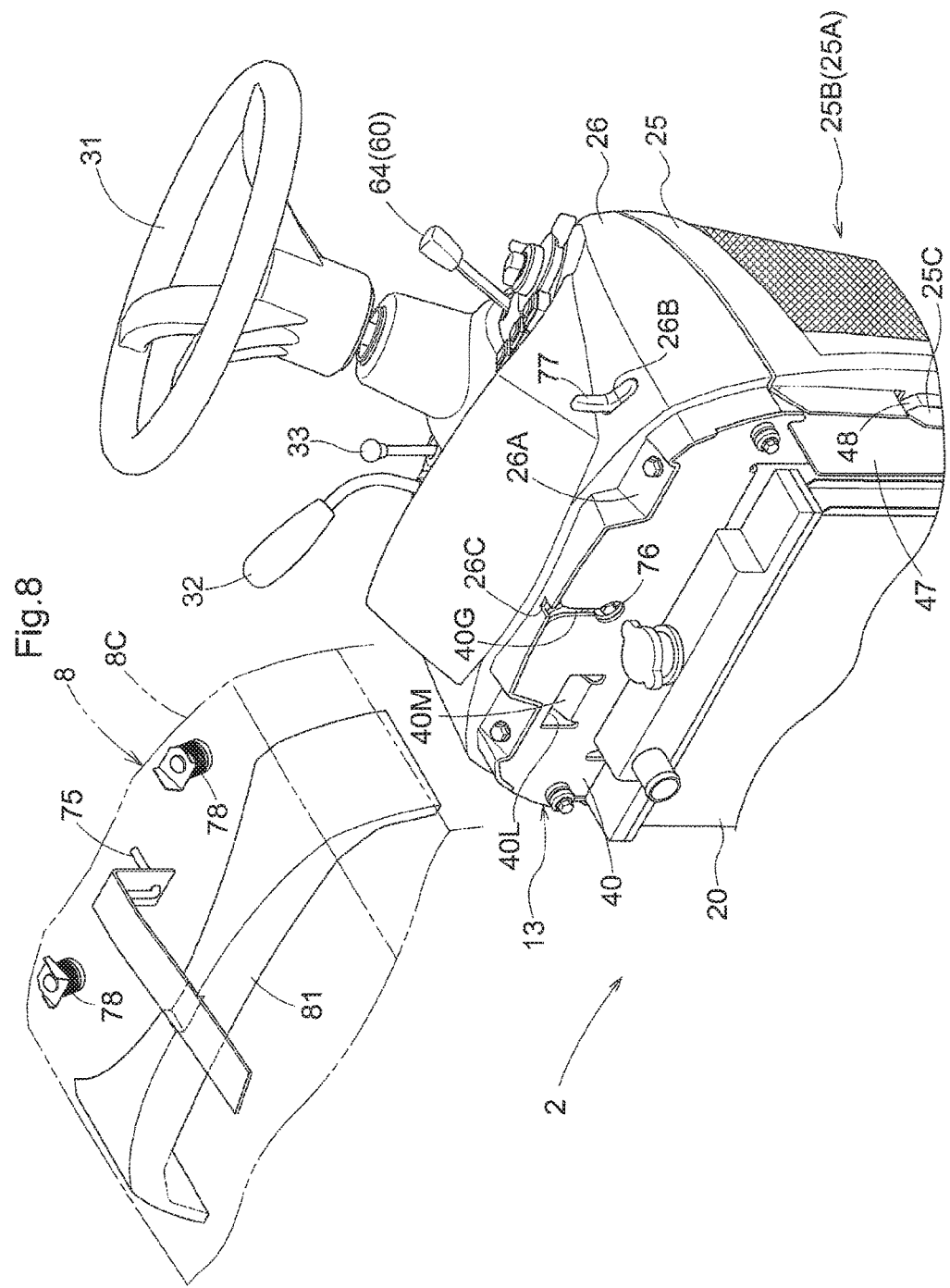
FIG. 8 is a perspective view of a primary portion showing a front upper part of the center pillar and the area in the vicinity thereof.
Figure 9:
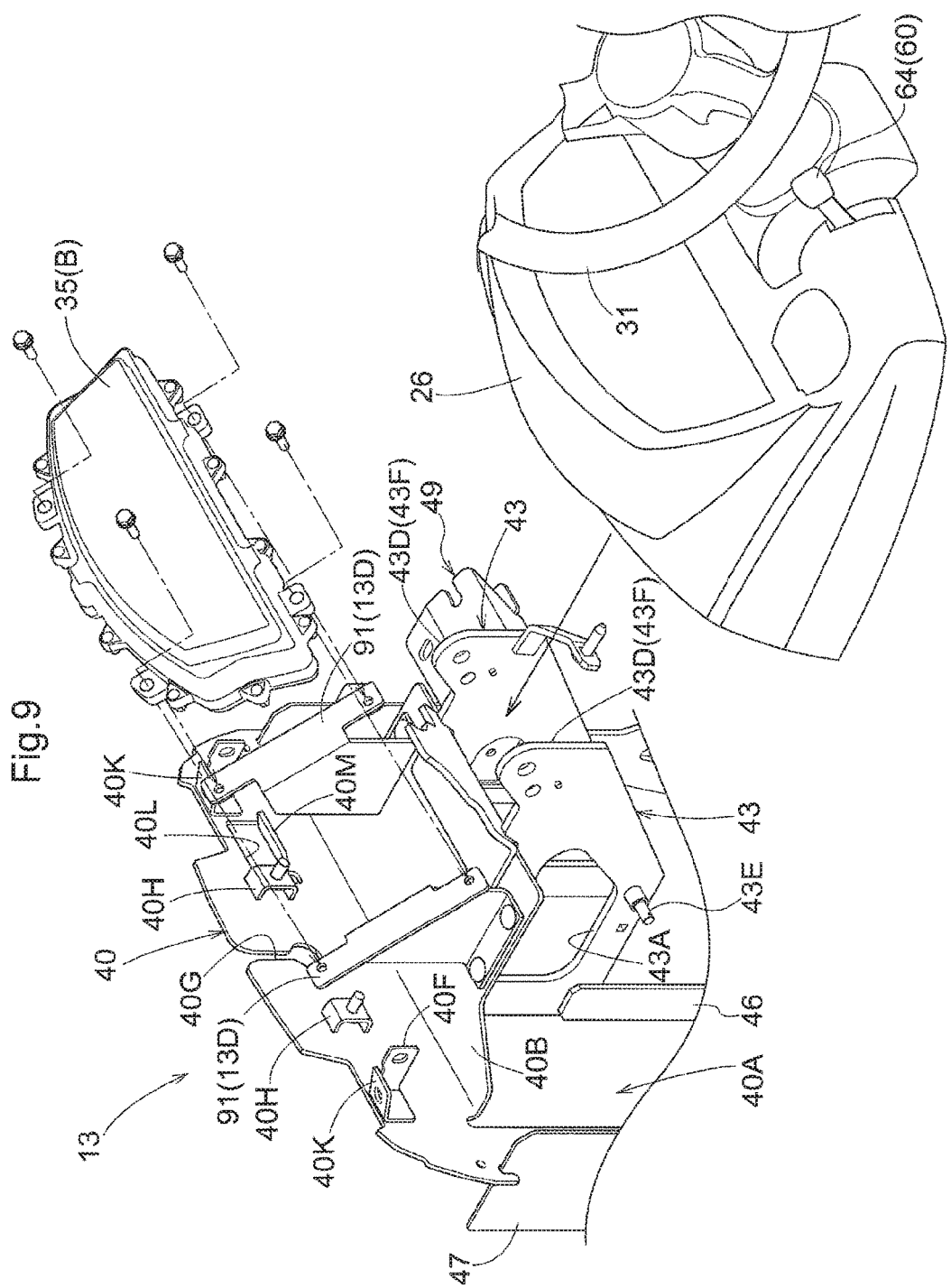
FIG. 9 is a perspective view of a primary portion showing a rear upper part of the center pillar and the area in the vicinity thereof.

As shown in FIGS. 3, 4, and 8, a front end 26A of the upper panel 26 is covered from above by a rear end 8C of the hood 8 at the closed position. An upper part of the partition 40 of the center pillar 13 is in internal contact with the front end 26A of the upper panel 26.

In contrast to this configuration, for example, if the front end of the upper panel 26 and the rear end of the partition 40 are adjacent to each other in the front-rear direction, and the front end of the partition 40 and the rear end of the hood 8 at the closed position are adjacent to each other in the front-rear direction, it is necessary to improve the finishing accuracy of the adjacent end surfaces in order to form constant gaps between the adjacent end surfaces and thereby provide a good appearance.

In the configuration according to the present embodiment, compared to this comparative configuration, the gaps between the adjacent end surfaces cannot be seen from the outside, and it is possible to provide a good appearance of the area around the rear end of the hood 8 without improving the finishing accuracy of the adjacent end surfaces.

As shown in FIGS. 3, 5, and 8 to 18, this tractor includes a lock mechanism 71 that fixes and holds the hood 8 at the closed position. The lock mechanism 71 includes, for example: a hook member 72 that swings between a lock position and an unlock position; a spring 73 that biases the hook member 72 such that the hook member 72 returns to the lock position; an operation rod 74 that allows the hook member 72 to be operated to swing to the unlock position against the force of the spring 73; and a rod 75 on which the hook member 72 at the lock position catches. An upper end of the partition 40 includes: a third supporting part 40E that supports the hook member 72 and the spring 73; and a fourth supporting part 40F that supports the operation rod 74 so as to allow the operation rod 74 to be operated.

Specifically, the partition 40 of the center pillar 13 also serves as a supporting member for the lock mechanism 71, and it is possible to more effectively enable the center pillar 13 to carry out multiple functions, while, for example, simplifying the configuration by reducing the number of parts compared to the case where a dedicated supporting member for the lock mechanism is separately provided.

The hook member 72 is attached to a central portion of the third supporting part 40E in the left-right direction, by using a step bolt 76 that is orientated in the front-rear direction and serves as the pivot of swing. An upper part of the hook member 72 includes a linkage part 72A that allows for an operation to swing to the unlock position by using the rod 75. The spring 73 is provided to span a right end of the third supporting part 40E and the hook member 72. The operation rod 74 is supported by the fourth supporting part 40F so as to be slidable in the left-right direction. A right end of the operation rod 74 is connected to the hook member 72. A left end of the operation rod 74 protrudes upward from a through hole 26B that is formed in a left end of the upper panel 26, and an operation grip 77 is attached to the left end. The rod 75 is fixed to a central portion, in the left-right direction, of a rear end upper part of the hood 8.

A central portion, in the left-right direction, of an upper part of the partition 40 includes a recessed part 40G that allows a catch part 75A to be removed from or inserted into the partition 40 when the hood 8 is operated to swing. A central portion, in the left-right direction, of an upper part of the upper panel 26 includes a recessed part 26C that allows the catch part 75A to pass therethrough when the hood 8 is operated to swing. The hood 8 includes left and right compression springs 78 that are received and supported by the center pillar 13, with the upper panel 26 being interposed therebetween.

With the above-described configuration, upon the hood 8 being manually operated to the lock position, the rod 75 and the left and right compression springs 78 of the lock mechanism 71 swing downward together with the hood 8. When the left and right compression springs 78 have been brought into contact with the upper panel 26 due to the downward swing, upon the hood 8 being manually operated to the closed position against the force of the left and right compression springs 78, and the catch part 75A of the rod 75 being brought into contact with the linkage part 72A of the hook member 72, the hook member 72 swings and retracts from the lock position to the unlock position due to the contact, against the force of the spring 73. Thereafter, upon the hood 8 reaching the closed position, the catch part 75A of the rod 75 moves to a position below the linkage part 72A due to the hood 8 reaching the closed position, and in conjunction with this movement, the hook member 72 returns to the lock position due to the effect of the spring 73, and catches on the catch part 75A of the rod 75. With this configuration, the lock mechanism 71 can fix and hold the hood 8 at the closed position. In the situation where the hood 8 is fixed and held at the closed position, it is possible to prevent a problem in which a rear end of the hood 8 rattles, due to the effect of the left and right compression springs 78.

Also, upon the operation rod 74 being manually operated to the left, the hook member 72 of the lock mechanism 71 swings and retracts to the unlock position against the force of the spring 73. As a result, the lock mechanism 71 releases the hood 8 from the closed position at which the hood 8 is fixed and held. Upon the hood 8 being released, the left and right compression springs 78 lift the hood 8 upward from the closed position, and the hood 8 is held at the unlock position that is slightly above the closed position. As a result, it is possible to prevent a problem in which the hood 8 becomes fixed and held again at the closed position by the lock mechanism 71 when the hook member 72 returns to the lock position after the unlocking operation has been performed, due to the hood 8 being located at the closed position after the unlocking operation of the lock mechanism 71 has been performed.

The third supporting part 40E is made of a steel plate and is coupled to left and right supporting members 40H that are U-shaped and are welded to an upper end of the partition 40, by using bolts. The fourth supporting part 40F is made of a steel plate and is welded to a left end portion of an upper end of the partition 40.

An upper end of the partition 40 includes left and right coupling parts 40K that allows the upper panel 26 to be coupled to the partition 40 with bolts. The left and right coupling parts 40K are located further outside of the left and right supporting members 40H in the lateral direction.

Specifically, the partition 40 of the center pillar 13 also serves as a supporting member for the upper panel 26, and it is possible to more effectively enable the center pillar 13 to carry out multiple functions.

The fourth supporting part 40F includes the left coupling part 40K out of the left and right coupling parts 40K to which the upper panel 26 is coupled. The left coupling part 40K is formed integrally with the fourth supporting part 40F.

With this configuration, it is possible to, for example, simplify the configuration by reducing the number of parts compared to the case where the fourth supporting part 40F and the left coupling part 40K are separately provided for the partition 40.

The left and right coupling parts 40K have the same shape and can be used on either of the left and right sides. With this configuration, it is possible to reduce cost, and make the part management easier by reducing the variations of component parts, for example, compared to the case where the left and right coupling parts 40K have different shapes that are specific for the left and the right.

As shown in FIGS. 3, 4, and 7 to 18, the prime mover unit 2 includes a fan shroud 79 that spans the partition 40 and the cooling fan 21. An upper part of the fan shroud 79 includes an air passage forming part 79A with which an air passage 80 is formed between the upper part of the fan shroud 79 and an upper part of the partition 40. A right end of an upper part of the partition 40 includes an air passage hole 40L that has a rectangular shape and allows air to flow into the air passage 80. The left end of the air passage forming part 79A disposed opposite the air passage hole 40L in the left-right direction of the vehicle body includes a connection hole 79B that connects the air passage 80 to an air intake part 22A of the air cleaner 22.

With the above-described configuration, it is possible to prevent the sound of intake air from increasing due to the air passage hole 40L and the connection hole 79B facing each other.

The partition 40 includes a sound isolation wall 40M that is formed so as to be curved and extend in a rearward and upward direction from a lower edge of an inner peripheral edge of the partition 40, the inner peripheral edge defining the air passage hole 40L.

With this configuration, it is possible to prevent intake air sound from increasing and leaking from the air intake port 25A due to the air passage from the air intake port 25A of the under panel 25 to the air passage hole 40L of the partition 40 being aligned in a straight line.

Also, a steel plate portion of a right side upper part of the partition, which is unnecessary after the air passage hole 40L has been formed, is effectively used as the sound isolation wall 40M, and therefore, it is possible to, for example, simplify the configuration by reducing the number of parts compared to the case where another member is provided as the sound isolation wall 40M.

As shown in FIGS. 3, 4, and 8, an inner surface of the rear end 8C of the hood 8 includes a sealing member 81 that closes a gap that is formed between the hood 8 at the closed position and an upper end of the fan shroud 79.

With this configuration, it is possible to prevent air that flows through the above-described air passage 80 from leaking from the gap between the hood 8 and the upper end of the fan shroud 79.

As shown in FIGS. 4, 5, 9, 12 to 15, 19, 20, and 21, the center pillar 13 includes a fifth supporting member 49 that is made of a steel plate and by which a swing pivot shaft 82 is supported so as to be rotatable. The swing pivot shaft 82 is formed integrally with a lower part of the accelerator lever 32 so as to be orientated in the top-bottom direction. The swing pivot shaft 82 has a small diameter part 82A that is formed as a lower end of the swing pivot shaft 82 and a large diameter part 82B disposed adjacent to and above the small diameter part 82A. The fifth supporting member 49 is curved into a U-shape such that a first supporting plate part 49A on the lower side, by which the small diameter part 82A is rotatably supported, and a second supporting plate part 49B on the upper side, by which the large diameter part 82B is rotatably supported, face each other. The fifth supporting member 49 is welded to an outer surface 43C of the third supporting members 43 on the left side. The first supporting plate part 49A includes a round hole 49C into which the small diameter part 82A is inserted. The second supporting plate part 49B includes a first recessed part 49D into which the large diameter part 82B is inserted. The first recessed part 49D includes: a hole-shaped part 49Da that has the substantially same diameter as the large diameter part 82B; and a slit part 49Db that spans the right end edge of the second supporting plate part 49B and the hole-shaped part 49Da. The slit part 49Db has a slit width that is substantially the same as the diameter of the small diameter part 82A and allows the small diameter part 82A to be inserted thereinto.

With the above-described configuration, it is possible to enable the center pillar 13 to serve as a supporting member that supports the accelerator lever 32. With this configuration, it is possible to further effectively enable the center pillar 13 to carry out multiple functions while, for example, simplifying the configuration by reducing the number of parts compared to the case where a dedicated supporting member for the accelerator lever is separately provided.

Also, the fifth supporting member 49 is curved into a U-shape, and therefore, it is possible to stably support the accelerator lever 32 at two points on the first supporting plate part 49A and the second supporting plate part 49B while simplifying the configuration by reducing the number of parts compared to the case where the first supporting plate part 49A and the second supporting plate part 49B are separately provided.

Also, it is easier to attach the accelerator lever 32, which is integrated with the swing pivot shaft 82, to the fifth supporting member 49 from the outside of the fifth supporting member 49 in the rightward direction, by using the first recessed part 49D of the second supporting plate part 49B.

As shown in FIGS. 4, 5, 19, and 21, the swing pivot shaft 82 includes a friction type holding mechanism 83 that holds the accelerator lever 32 at a desired operation position. The holding mechanism 83 includes: for example; a male screw portion 82C that is formed on the small diameter part 82A of the swing pivot shaft 82; a receiving member 84 that is fixed to a predetermined position on the small diameter part 82A; an elastic member 85 disposed between the receiving member 84 and the first supporting plate part 49A of the fifth supporting member 49 and is fitted onto the small diameter part 82A; nuts (second nuts) 86 that are attached to the male screw portion 82C; and a spacer 87 that is tube-shaped, is located between the receiving member 84 and the nuts 86, and sets the fastening limitation position of the nuts 86.

With this configuration, for example, by inserting the swing pivot shaft 82 into the round hole 49C and the slit part 49Db of the fifth supporting member 49 after fitting the elastic member 85 and the spacer 87 onto a predetermined position on the swing pivot shaft 82 where the receiving member 84 is fixed, and performing an operation to fasten the nuts 86 onto the inserted swing pivot shaft 82 from the lower end of the swing pivot shaft 82 up to the fastening limitation position that is restricted by the spacer 87, an operator can easily set a friction holding force, which results from the deformation of the elastic member 85 caused by the fastening operation and is applied to the accelerator lever 32, to a predetermined appropriate value.

In other words, the operator can easily and reliably attach the holding mechanism 83 such that friction holding force applied to the accelerator lever 32 is set to the predetermined appropriate value.

The holding mechanism 83 includes a plurality of disc springs that serve as the elastic member 85. The holding mechanism 83 includes a washer 88 disposed between the nuts 86 and the spacer 87. The two nuts 86 attached to the male screw portion 82C prevents the holding mechanism 83 from becoming loose.

The receiving member 84 also serves as a swing arm 90 of the accelerator lever 32. The swing arm 90 is linked with a speed control lever (not shown) of the engine 18, with a control cable 89 being interposed therebetween.

With this configuration, it is possible to, for example, simplify the configuration by reducing the number of parts compared to the case where the receiving member 84 and the swing arm 90 are separately provided.

The receiving member 84 is fixed to the swing pivot shaft 82 by being welded to a predetermined position on the swing pivot shaft 82. In the fifth supporting member 49, a separation distance between an upper surface of the first supporting plate part 49A and a lower surface of the second supporting plate part 49B at the supporting portion of the swing pivot shaft 82 is set so as to be longer than the length from the lower end of the swing pivot shaft 82 to the upper end of the receiving member 84 fixed at the predetermined position.

With this configuration, it is possible to attach, from the outside in the rightward direction, the second supporting plate part 49B to the fifth supporting member 49 of the swing pivot shaft 82 to which the receiving member 84 is welded, by using the first recessed part 49D.

Figure 19:
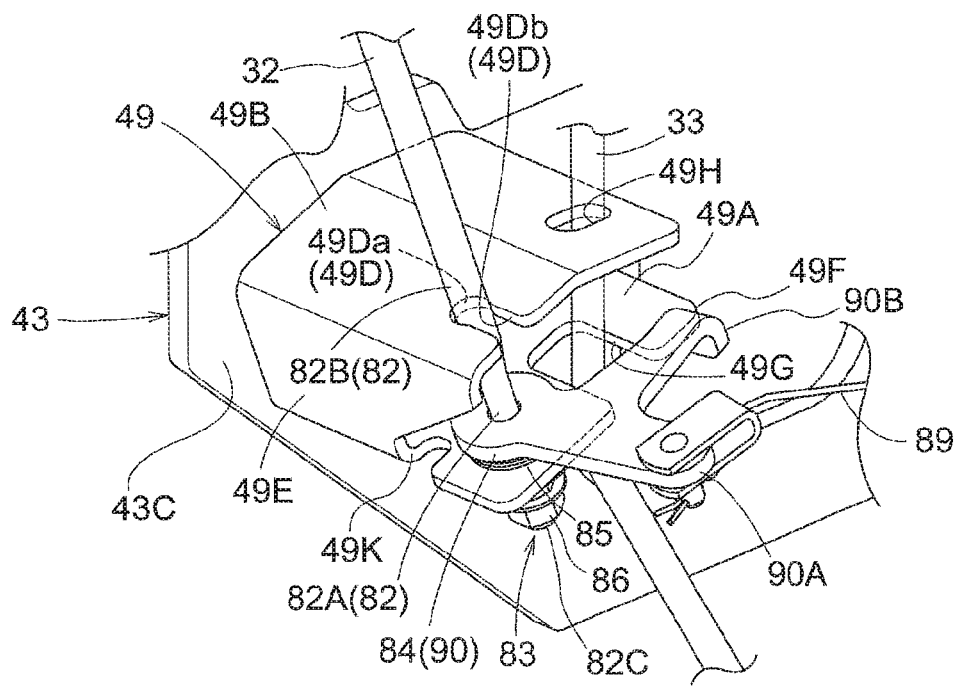
Figure 20:
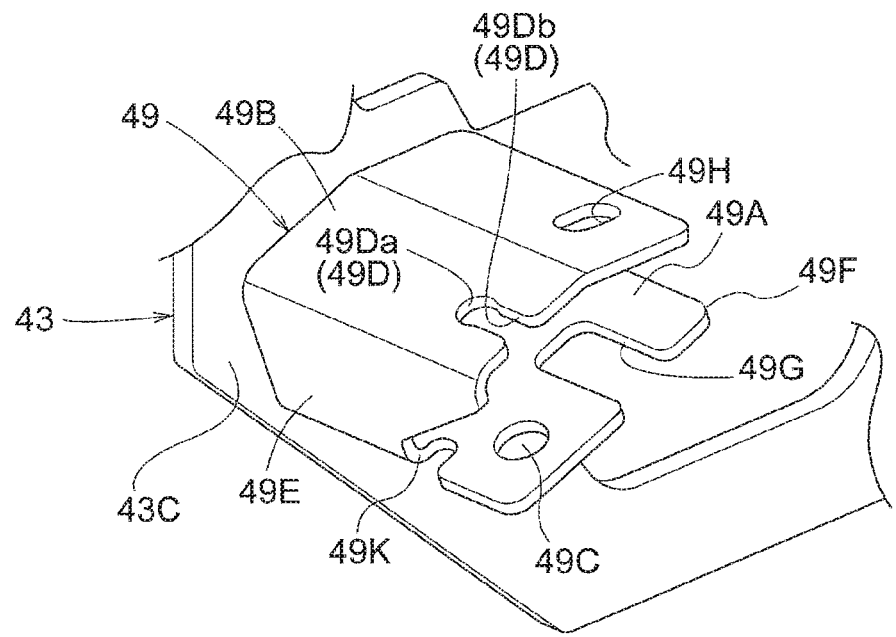
FIG. 20 is a perspective view of a primary portion showing the fifth supporting member.
Figure 21:
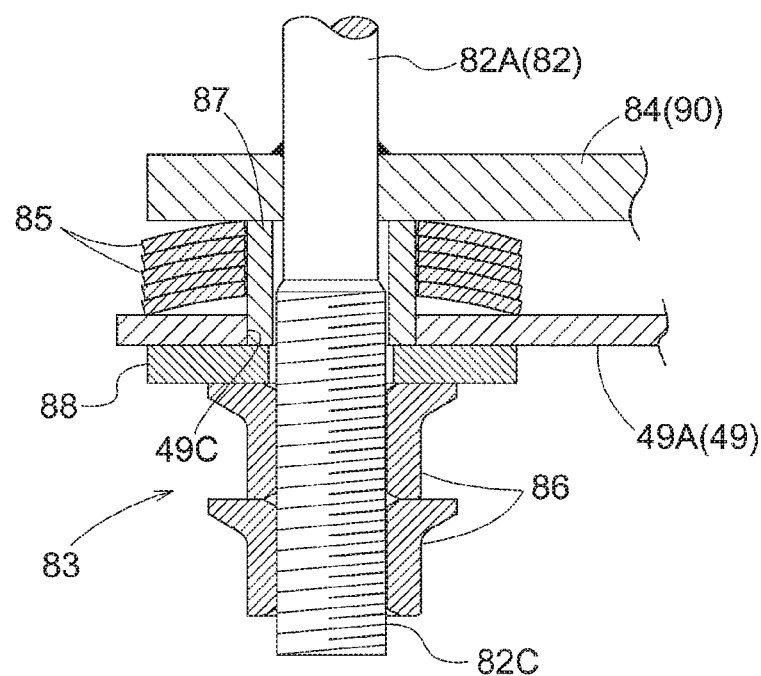
FIG. 21 is a vertical sectional right side view of a primary portion showing a friction type holding mechanism.

As shown in FIGS. 19 and 20, the swing arm 90 extends from the swing pivot shaft 82 to the outside of the fifth supporting member 49 in a rightward direction. The fifth supporting member 49 is set such that an intermediate plate part 49E that spans the first supporting plate part 49A and the second supporting plate part 49B is located at the rear end of the fifth supporting member 49. A rear part of the first supporting plate part 49A includes the round hole 49C, and a part of the first supporting plate part 49A that is forward of the round hole 49C includes: a stopper 49F that receives the swing arm 90 at a forward idling position; and a second recessed part 49G that allows the constant speed setting lever 33 to be located between the round hole 49C and the stopper 49F. A rear part of the second supporting plate part 49B includes the first recessed part 49D, and a part of the second supporting plate part 49B that is rearward of the first recessed part 49D includes a guide hole 49H that restricts the constant speed setting lever 33 from moving. The intermediate plate part 49E includes a third recessed part 49K that allows the swing arm 90 to be displaced so as to swing to a retracted position that is set at a position that is rearward of the swing pivot shaft 82.

With the above-described configuration, the fifth supporting member 49 serves as a restriction member that restricts the accelerator lever 32 from swinging forward from the idling position and as a guide member that restricts the constant speed setting lever 33 from moving. Therefore, it is possible to more effectively enable the center pillar 13 to carry out multiple functions, while, for example, simplifying the configuration by reducing the number of parts compared to the case where a dedicated restriction member and a dedicated guide member are separately provided.

Also, with the above-described configuration, when attaching/detaching the swing arm 90 to/from a predetermined attachment position on the under panel 25 that covers the swing arm 90 and so on from behind, an operator can reduce the amount of protrusion from the fifth supporting member 49 of the swing arm 90 in the leftward direction by positioning the swing arm 90 at the retracted position through operating the accelerator lever 32.

Consequently, when attaching/detaching the under panel 25, it is possible to prevent a problem in which the under panel 25 is brought into contact with the swing arm 90 and it becomes difficult to attach/detach the under panel 25 to/from the predetermined attachment position.

A right side extension end of the swing arm 90 includes: a linkage part 90A that is linked with a speed control lever; and a contact arm part 90B that extends forward from a midpoint of the extension part of the swing arm 90. Thus, the swing arm 90 is formed to have a T-shape in top plan view. The swing arm 90 is set such that, when the accelerator lever 32 is at the idling position, the contact arm part 90B is in contact with the stopper 49F. The swing arm 90 is set such that, when the swing arm 90 is at the retracted position, the linkage part 90A and the contact arm part 90B are located rearward of the swing pivot shaft 82, and thus the amount of protrusion from the fifth supporting member 49 in the leftward direction is reduced.

The guide hole 49H of the fifth supporting member 49 is formed as an elongated hole that is orientated in the front-rear direction, and allows the constant speed setting lever 33 to swing in the front-rear direction between the constant speed cancelling position and the constant speed setting position, and prevents the constant speed setting lever 33 from swinging rearward from the constant speed cancelling position on the rear side and from swinging forward from the constant speed setting position on the front side.

As shown in FIGS. 3 to 5, 9, and 11 to 15, the center pillar 13 includes fifth supporting parts 13D that support electrical components B.

With this configuration, it is possible to enable the center pillar 13 to serve as a supporting member that supports the electrical components B that are provided in the vicinity of the center pillar 13. As a result, it is possible to, for example, simplify the configuration by reducing the number of parts compared to the case where a dedicated supporting member for the electrical component is added.

The center pillar 13 includes left and right first supporting steel plates 91 that serve as fifth supporting parts 13D and that support the display panel 35 that is an example of the electrical components B. Lower ends of the left and right first supporting steel plates 91 are coupled to the extension part 40B of the partition 40 by using bolts.

The center pillar 13 includes a second supporting steel plate 93 that serves as a fifth supporting part 13D and that supports a fuse box that is an example of the electrical components B. A front end of the second supporting plate 93 is welded to a right end of the partition 40.

As shown in FIGS. 4 and 14, electrical wires 94 for the electrical components B such as the fuse box 92 are held by the center pillar 13, with clamps 95 being interposed therebetween. In the center pillar 13, a plurality of attachment holes 13E for attaching the clamps are provided in the fourth supporting member 45 and so on.

Other Embodiments Modified from First Embodiment

[1] The work vehicle may be, for example, a work vehicle that is not provided with either one of or neither of the tilt unit 60 and the power steering unit 65. Also, the work vehicle may be provided with the power steering unit 65 that is of an integral type.

[2] The prime mover unit 2 may be a hybrid type prime mover unit that includes, for example, the engine 18 and an electrical motor as prime movers.

[3] The shape, the configuration, and so on of the center pillar 13 may be variously modified when peripheral devices that are to be supported by the center pillar 13 are changed or added.

For example, the center pillar 13 may be formed from a single steel plate member such that the partition 40 and the first supporting member 41 are integrated.

For example, the center pillar 13 may be provided with the second supporting members 42 made of a dedicated steel plate member.

For example, the center pillar 13 may be a pillar that is formed without the fourth supporting member 45 such that the third supporting members 43 have a length that is sufficiently long to be directly supported by the base frame 12 or the mounting platform 44.

For example, the center pillar 13 may be provided with the fourth supporting members 45 that is formed to be bilaterally symmetric.

For example, the center pillar 13 may be a pillar that includes a single reinforcing member 46 or three or more reinforcing members 46, or a pillar that includes reinforcing members 46 that are orientated in the left-right direction.

For example, the center pillar 13 may be provided with the guide part 40C that is formed from a dedicated steel plate member. Also, it is possible that the center pillar 13 is not provided with the guide part 40C.

For example, it is possible that the space 57 where a power transmission shaft is to be located is not formed between the center pillar 13 and the top panel 16 of the base frame 12.

For example, the center pillar 13 may be provided with a dedicated second supporting part 43F for supporting the operation lever 64.

For example, the center pillar 13 may be a pillar that includes the mounting part 13C that is for the holder and made of a dedicated steel plate member, a pillar that includes the mounting part 13C that is for the holder and disposed on the right side, or a pillar that is not provided with the mounting part 13C for the holder.

For example, the center pillar 13 may be a pillar in which the slits 47C for attaching the under panel is formed by punching out left and right ends of the partition 40, a pillar in which a positioning part that is curved is formed by punching out the slits 47C from the left and right side walls 47, or a pillar in which left and right positioning members are configured by punching out the slits 47C from dedicated steel plate members.

For example, the center pillar 13 may be a pillar in which the fourth supporting part 40F for the operation rod and the coupling parts 40K for the upper panel are separately provided for the partition 40.

For example, the center pillar 13 may be provided with the sound isolation wall 40M made of a dedicated steel plate member.

For example, the center pillar 13 may be a pillar in which the first supporting plate part 49A and the second supporting plate part 49B are respectively provided with the fifth supporting members 49 that are each separately formed from a dedicated steel plate member, a pillar provided with the fifth supporting member 49 that is orientated in the left-right direction and supports the swing pivot shaft 82, or a pillar that is not provided with the fifth supporting member 49.

For example, the center pillar 13 may be a pillar that includes either one of a fifth supporting part 13D that supports the display panel 35 and a fifth supporting part 13D that supports the fuse box 92, a pillar that includes a fifth supporting part 13D that supports electrical components B other than the display panel 35 or the fuse box 92 out of the electrical components B provided in the vicinity of the center pillar 13, or a pillar that is not provided with a fifth supporting part 13D.

[4] The fifth supporting member 49 may be, for example, a supporting member that is not provided with the stopper 49F for the swing arm, a supporting member that is not provided with the second recessed part 49G or the guide hole 49H for the constant speed setting lever, or a supporting member that is not provided with the third recessed part 49K for retracting the swing arm.

[5] The sealing structure between the hood 8 at the closed position and the left and right side walls 47 of the center pillar 13 may be variously modified. The following describes another embodiment of the sealing structure as an example with reference to FIGS. 22 and 23.

Figure 22:
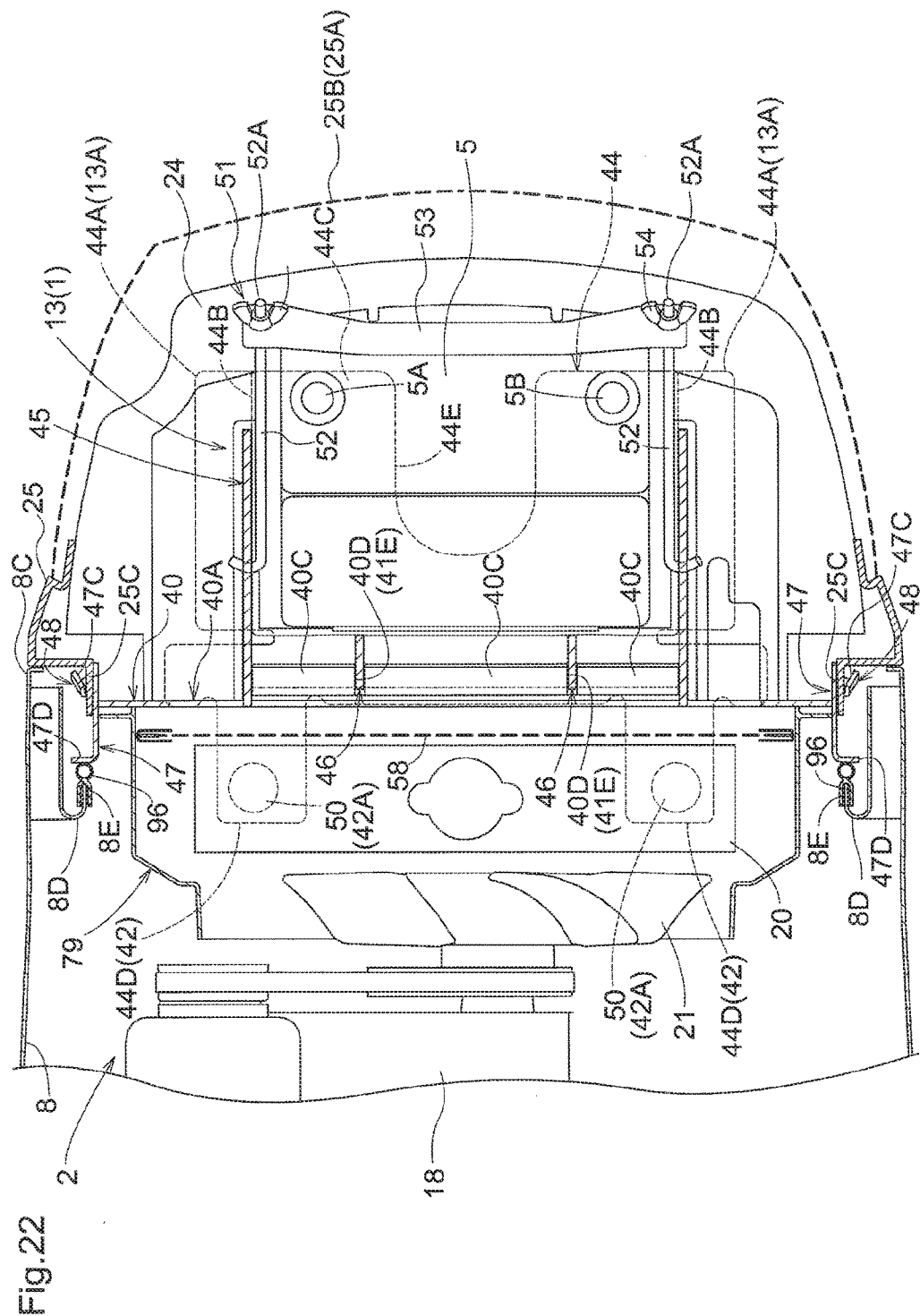
FIG. 22 is a plan view in transverse section of a primary portion showing a sealing structure of a center pillar and a hood according to another embodiment.
Figure 23:
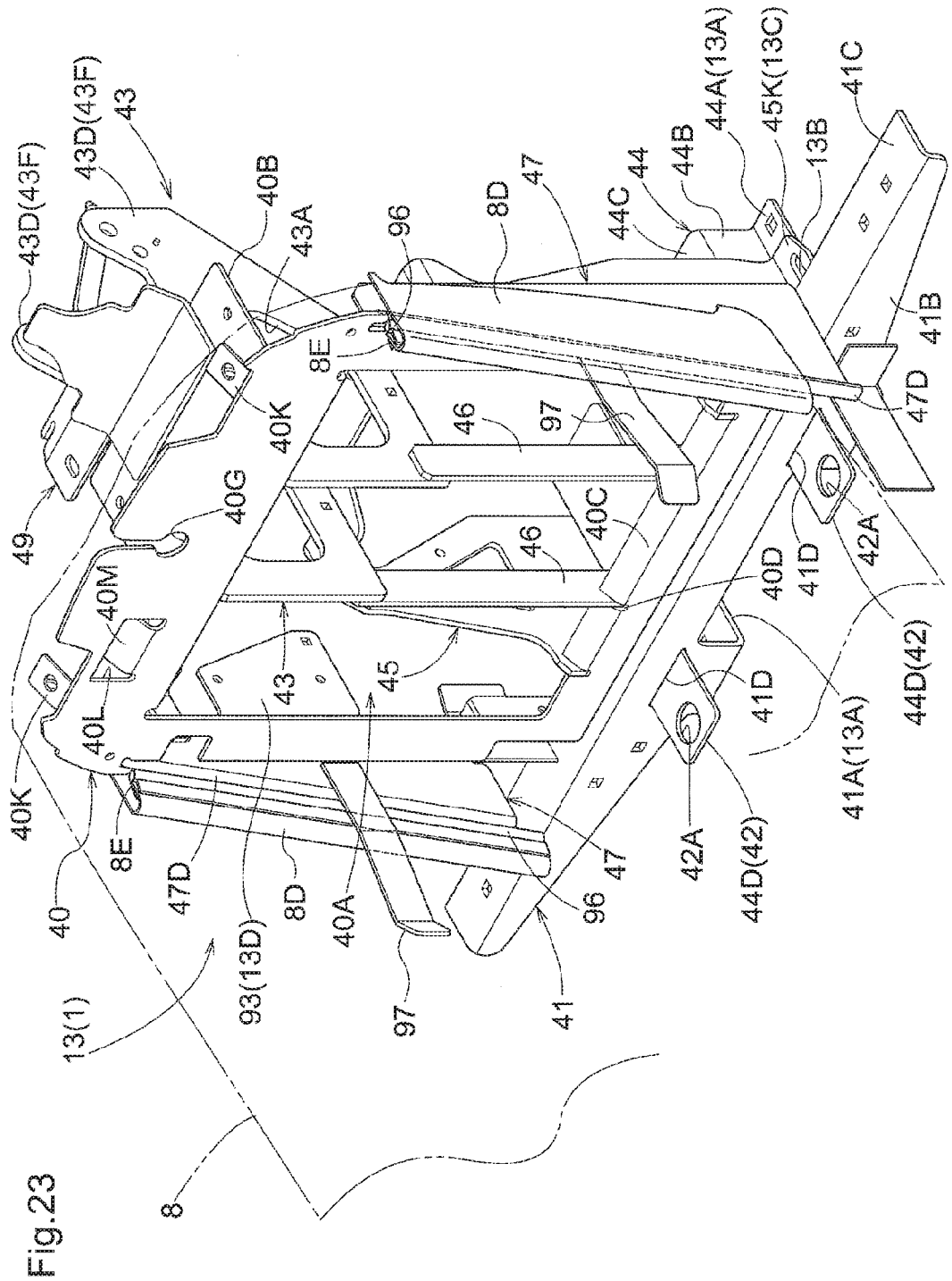
FIG. 23 is a perspective view of a primary portion showing a structure for positioning the hood in a left-right direction relative to the center pillar according to the other embodiment.

As shown in FIGS. 22 and 23, in the other embodiment, the left and right side walls 47 are inclined rearward such that the front end edges 47D of the left and right side walls 47 are inclined rearward relative to the vehicle body, in the upward direction. Left and right inner surfaces of the hood 8 each includes a seal supporting part 8D. The left and right seal supporting parts 8D have rear end edges 8E that are inclined rearward by an inclination angle that is the same as the inclination angle of front end edges 47D of the left and right side walls 47 and face the left and right front end edges 47D when the hood 8 is at the closed position, and the left and right rear end edges 8E include left and right sealing members 96 that span the upper ends and the lower ends of the left and right front end edges 47D and that are brought into linear contact with the left and right front end edges 47D when the hood 8 is at the closed position.

With this configuration, it is possible to increase the degree of intimate contact between: the left and right side walls 47; and the hood-side left and right sealing members 96 when the hood 8 is at the closed position, compared to when, for example, the front end edges 47D of the left and right side walls 47 and the rear end edges 8E of the left and right seal supporting parts 8D are orientated in a vertical direction.

Note that a trim made of rubber may be employed as the sealing members 96.

[6] The positioning structure for positioning the left-right direction when the hood 8 is operated to close may be variously modified. Here, as an example, a positioning structure that is preferable for the sealing structure shown in the other embodiment [5] described above is described with reference to FIG. 23.

As shown in FIG. 23, the center pillar 13 includes left and right guide plates 97 that extend forward from the left and right side walls 47. The left and right guide plates 97 are formed so as to be brought into contact with the left and right inner surfaces of the hood 8 and guide the hood 8 to a predetermined position in the left-right direction when the hood 8 is operated to close.

With this configuration, when the hood 8 is operated to close, it is possible to accurately position the left and right sealing members 96 on the hood side, at appropriate positions in the left-right direction, relative to the front end edges 47D of the left and right side walls 47. As a result, it is possible to reliably bring the left and right sealing members 96 into linear contact with the front end edges 47D of the left and right side walls 47.

Note that it is preferable that spring steel plates are employed as the left and right guide plates 97.

[7] The positioning of the holder 69 relative to the center pillar 13 may be achieved by, for example, using a plurality of positioning holes that are formed in the mounting part 13C of the center pillar 13, and a plurality of protrusions that are formed in the bottom surface of the holder 69, and by fitting the protrusions into the positioning holes.

[8] The left and right positioning members 48 may be, for example, positioning members that include either one of: first guide surfaces that guide the insertion parts 25C of the under panel 25 in the top-bottom direction; and second guide surfaces that guide the same in the left-right direction, or positioning members that include neither the first guide surfaces or the second guide surfaces.

[9] The holding mechanism 83 may be a mechanism that includes, as the elastic member 85, a compression spring, for example. Also, the holding mechanism 83 may be a mechanism that includes, as the receiving member 84, a ring member, for example, that is formed as a dedicated receiver for the spacer 87 and does not serve as the swing arm 90.

[10] The work vehicle is not limited to a tractor that includes: a prime mover unit disposed in a front part of a vehicle body; a driving part disposed in a rear part of the vehicle body; a battery disposed between the prime mover unit and the driving part; a base frame disposed in a lower part of the vehicle body; and a center pillar disposed between the prime mover unit and the driving part, and that extends upward from the base frame, and the work vehicle may be a passenger vehicle type mower, for example.

Second Embodiment

The following describes a second embodiment. As in the first embodiment, an example of the work vehicle in the present embodiment is a tractor.

Figure 24:
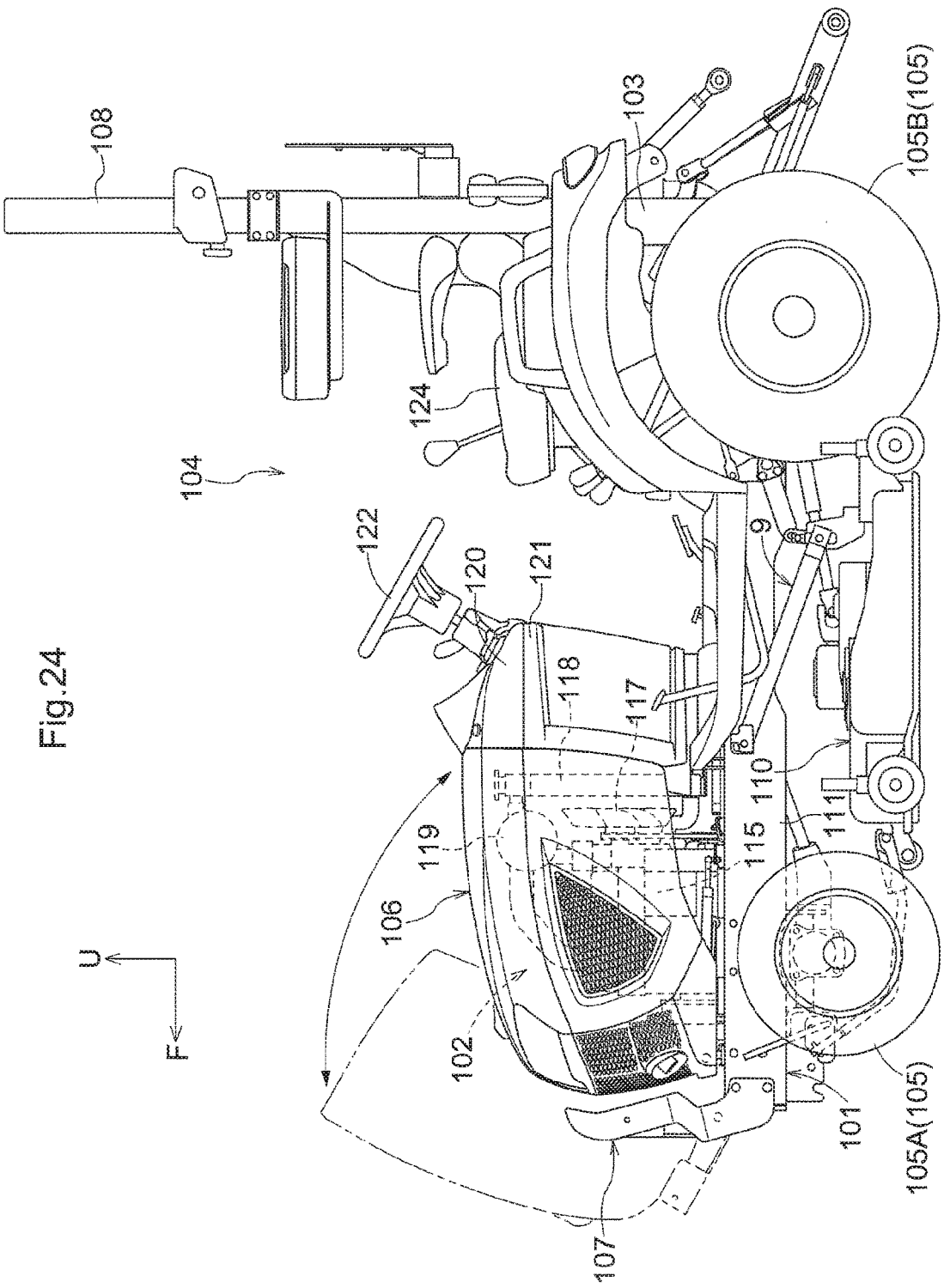
FIG. 24 is a view of a second embodiment (the same applies to the following drawings up to FIG. 31), showing a left side view of a tractor.

Note that the direction indicated by the arrow with a mark F shown in FIG. 24 is the forward direction of the tractor, and the direction indicated by the arrow with a mark U is the upward direction of the tractor.

Figure 25:
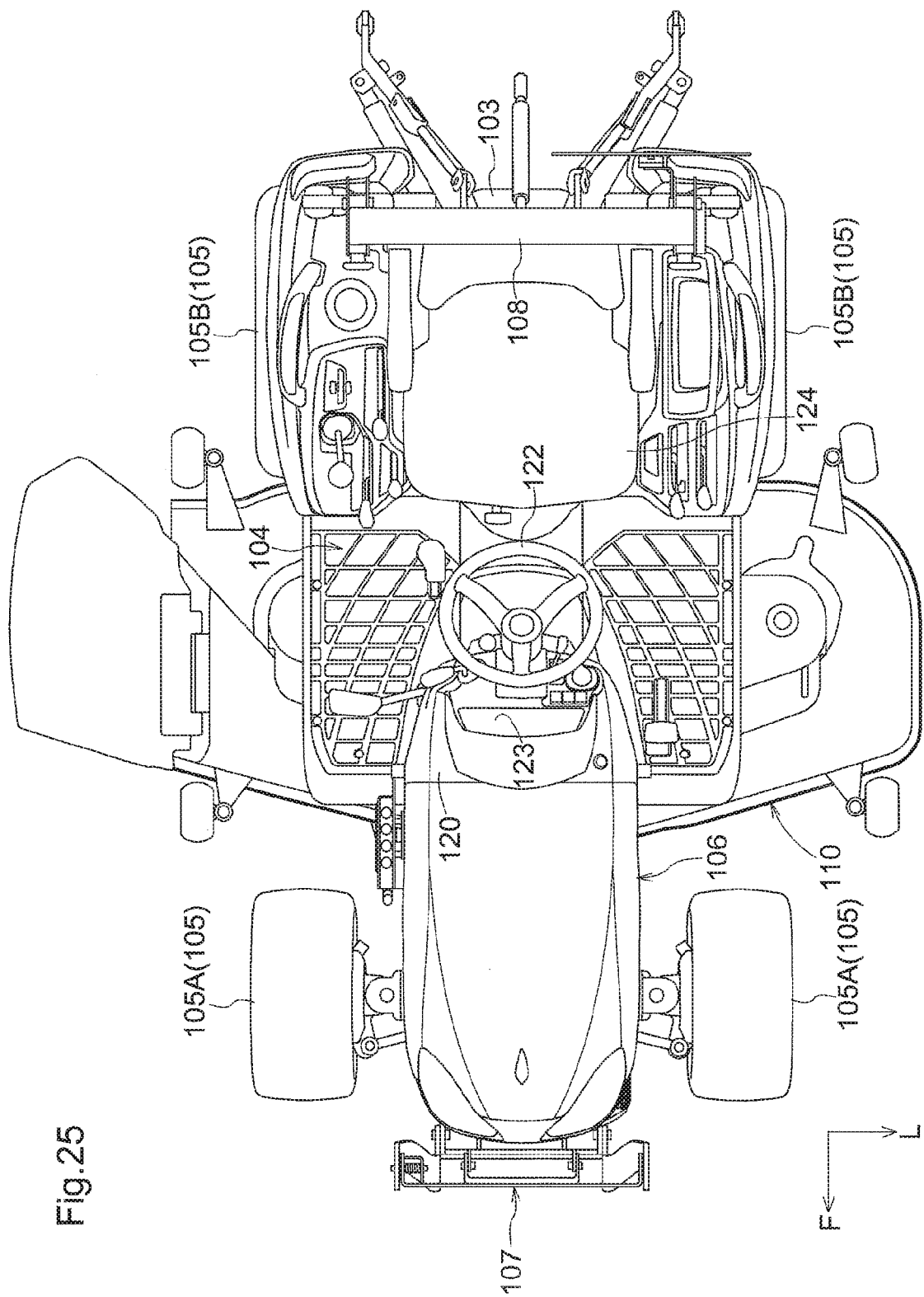
FIG. 25 is a plan view of the tractor.
Figure 26:
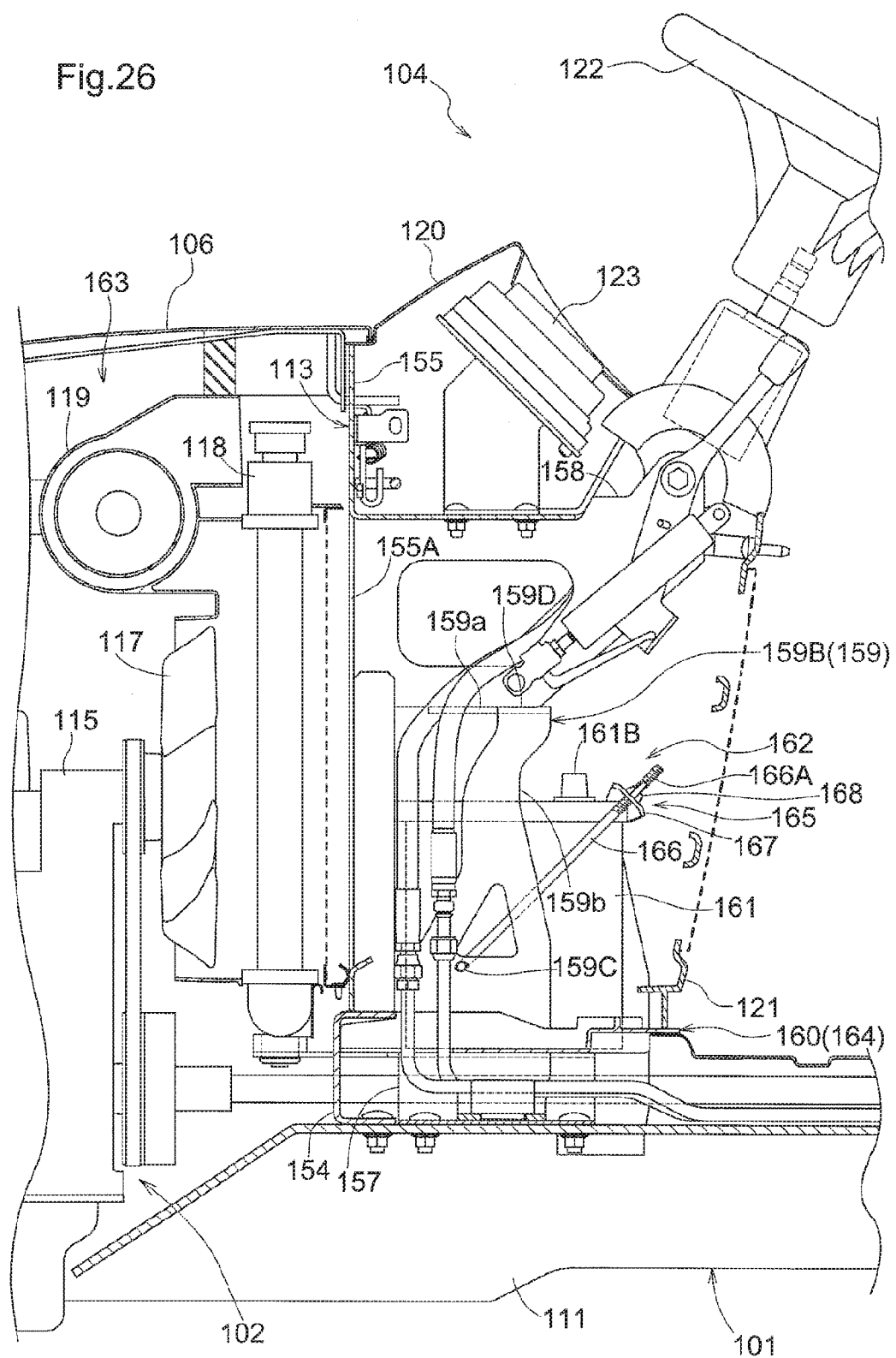
FIG. 26 is a vertical sectional left side view of a primary portion showing components associated with installation of a battery.
Figure 27:
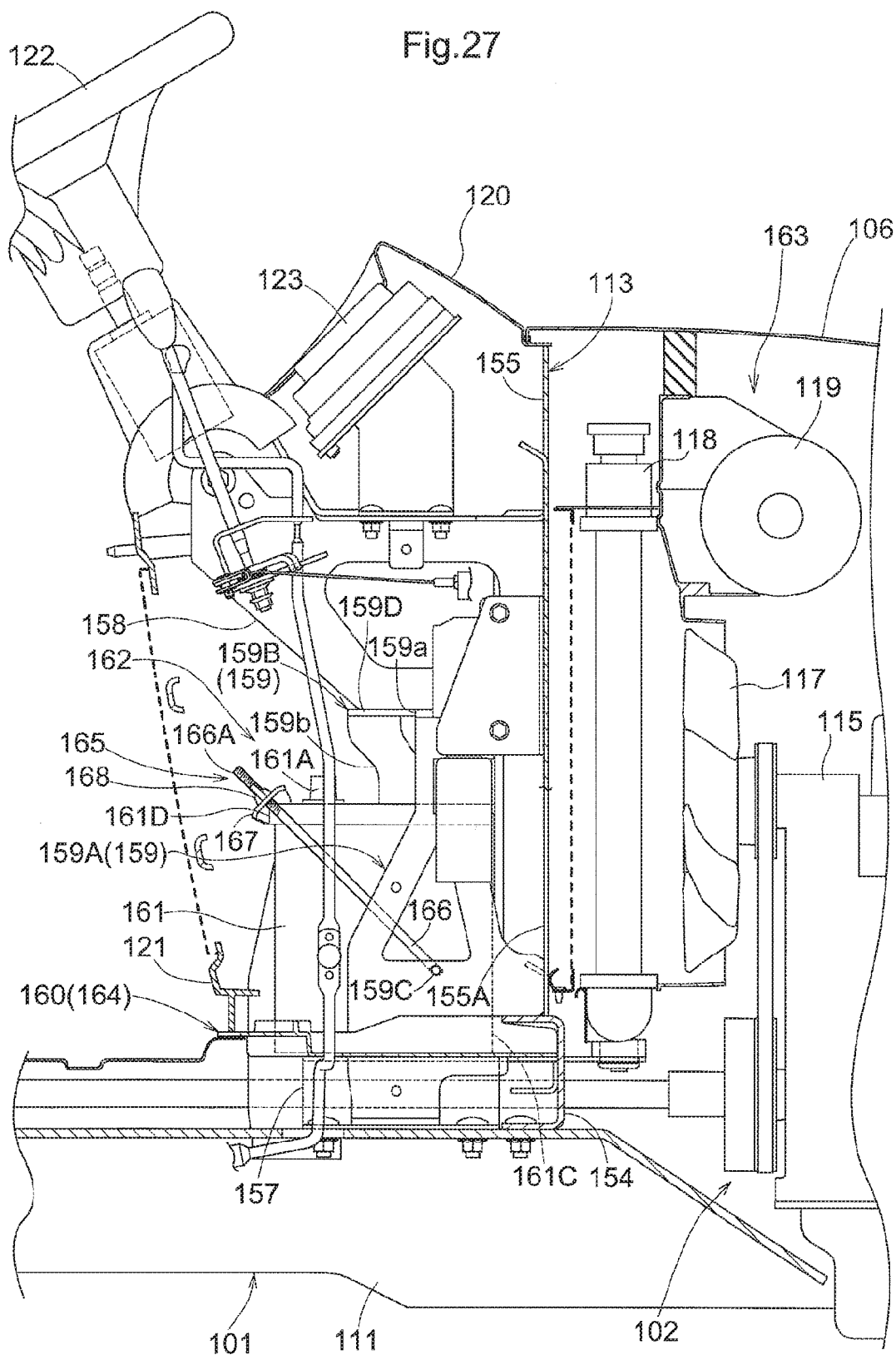
FIG. 27 is a vertical sectional right side view of a primary portion showing the components associated with installation of the battery.
Figure 28:
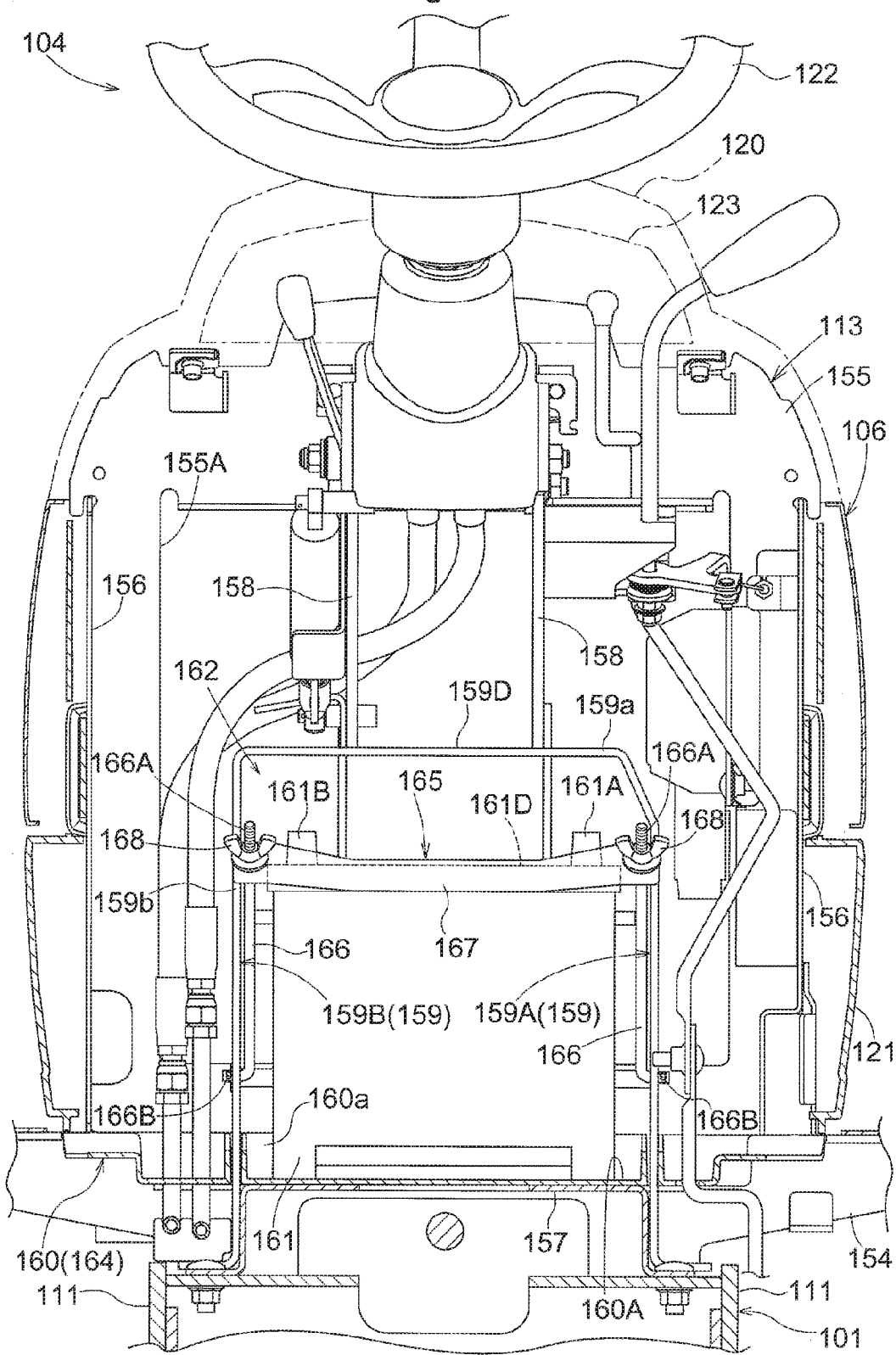
FIG. 28 is a vertical sectional rear view of a primary portion showing the components associated with installation of the battery.
Figure 29:
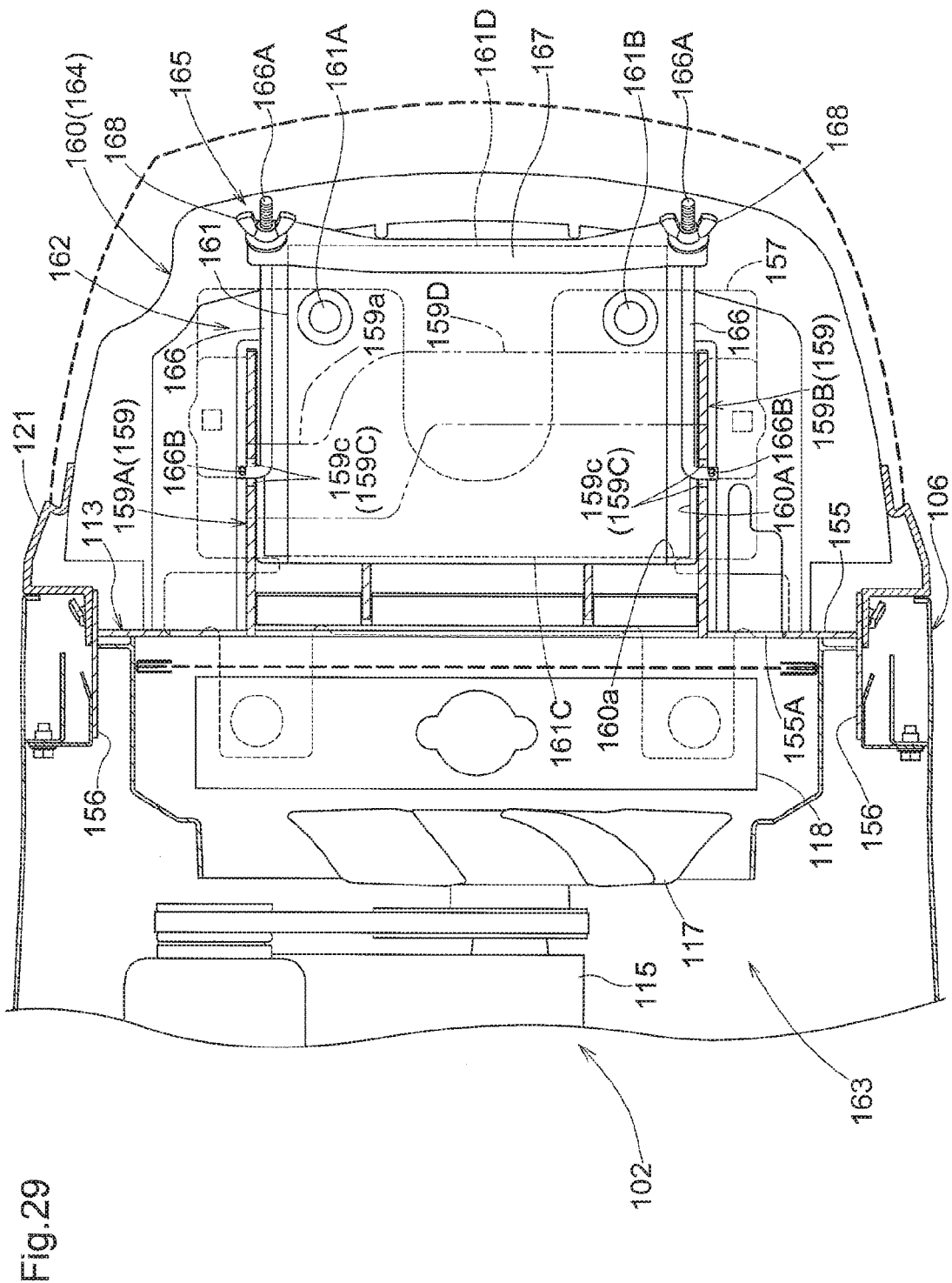
FIG. 29 is a plan view in transverse section of a primary portion showing the components associated with installation of the battery.
Figure 30:
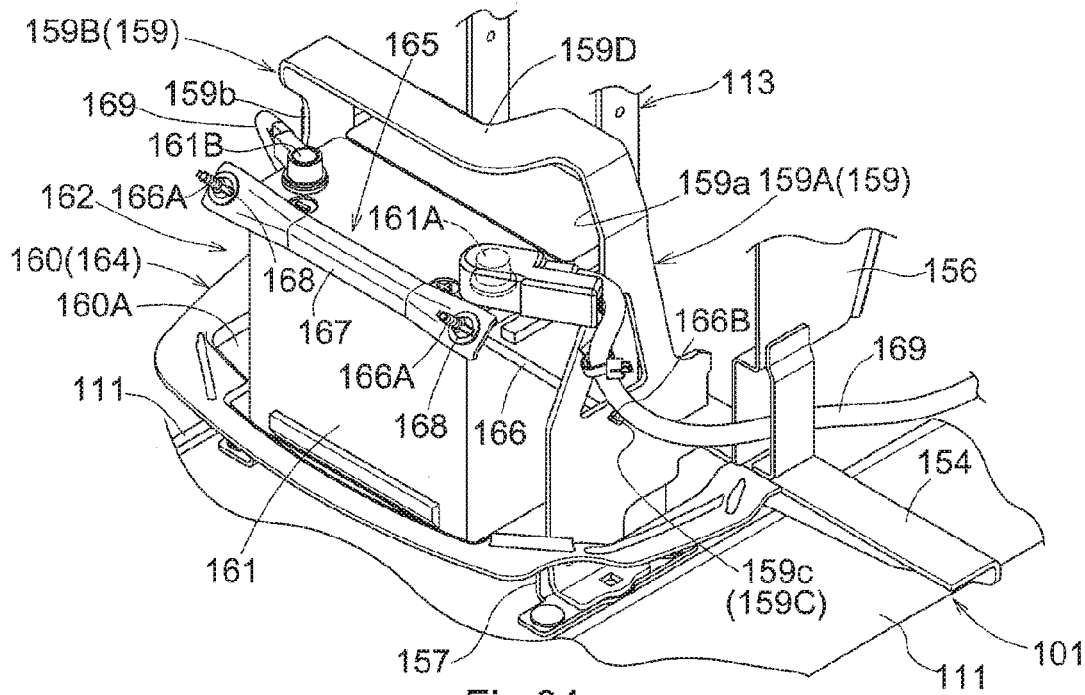
FIG. 30 is a perspective view of a primary portion showing the components associated with installation of the battery, such as a supporting frame.
Figure 31:
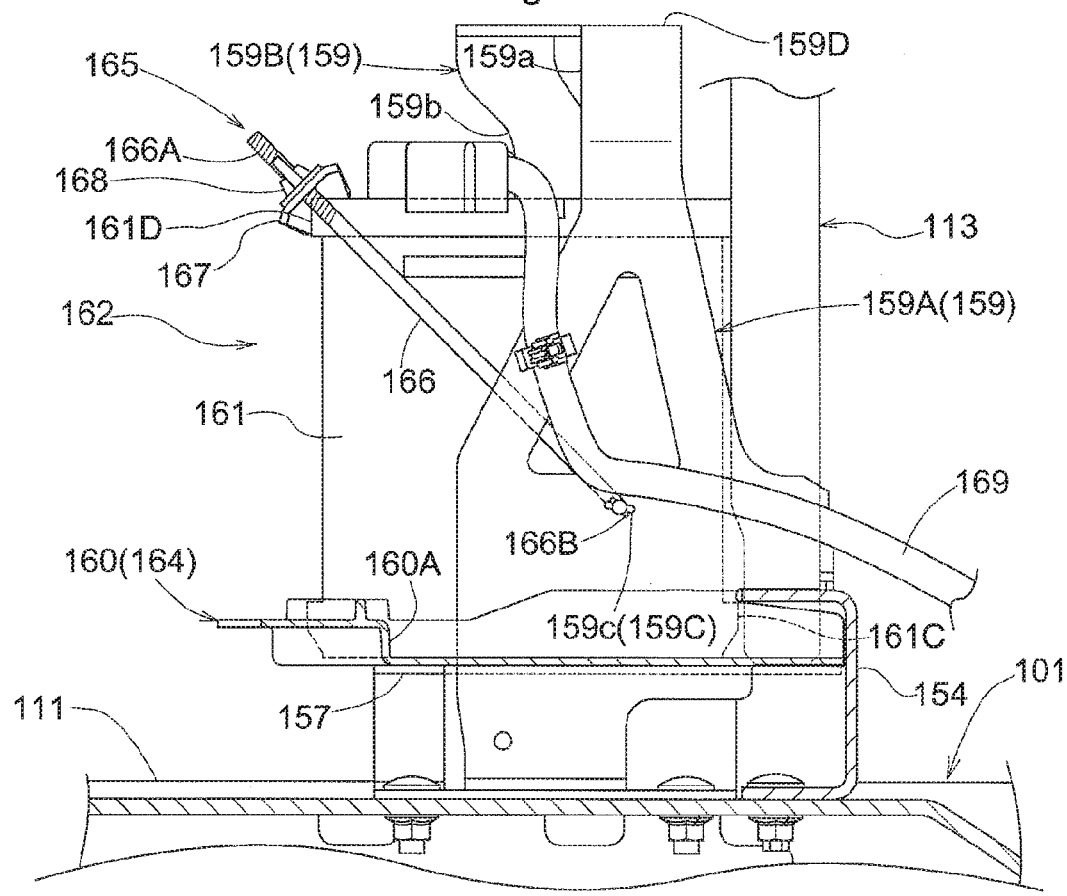
FIG. 31 is a vertical sectional right side view of a primary portion showing the components associated with installation of the battery, such as the supporting frame.

The direction indicated by the arrow with the mark F shown in FIG. 25 is the forward direction of the tractor, and the direction indicated by the arrow with a mark L is the leftward direction of the tractor.

Overall Configuration

As shown in FIGS. 24 and 25, the tractor described in the present embodiment as an example includes, for example: a vehicle body frame 101 that constitutes the framework of a vehicle body; a prime mover part 102 that is supported by a front part of the vehicle body frame 101; a transmission unit 103 that is coupled to a rear part of the vehicle body frame 101; a driving part 104 of a boarding type disposed on an upper rear part of the vehicle body frame 101; left and right travelling apparatuses 105; a hood 106 that covers the prime mover part 102 and swings to open or close; a front guard 107 that is made of a steel plate, is located immediately forward of the hood 106, and protects the hood 106 and so on; a protection frame 108 that is coupled to the rear end of the vehicle body frame 101; and a mower 110 that is coupled to the vehicle body frame 101 so as to be able to be lifted or lowered, with a link mechanism 109 being interposed therebetween. The tractor is configured as a four-wheel drive type tractor provided with, as the left and right travelling apparatuses 105: left and right front wheels 105A that are steerable and are driven by a driving force from the prime mover part 102; and left and right rear wheels 105B that are driven by a driving force from the prime mover part 102. Also, the tractor is configured as a mid-mount type tractor in which the mower 110 is located on an underbody between the left and right front wheels 105A and the left and right rear wheels 105B.

As shown in FIGS. 24 and 26 to 28, the vehicle body frame 101 includes, for example: left and right side members 111 that are each made of a steel plate and elongated in the front-rear direction; and a center pillar 113 that is coupled to central parts of the left and right side members 111 in the front-rear direction.

As shown in FIGS. 24 to 29, the prime mover part 102 includes, for example: a water-cooled type engine 115 that is supported by a front part of the vehicle body frame 101 so as to be vibration-proof; a cooling fan 117 disposed rearward of the engine 115; a radiator 118 disposed rearward of the cooling fan 117; and an air cleaner 119 disposed above the engine 115. A front part of the prime mover part 102 is covered by the hood 106, an upper part of a rear end of the prime mover part 102 is covered by an upper panel 120, and a lower part of a rear end of the prime mover part 102 is covered by an under panel 121 and so on. The upper panel 120 and the under panel 121 are detachably attached to the center pillar 113.

As shown in FIGS. 24 to 28, the driving part 104 includes, for example: a steering wheel 122 for steering the front wheels; a display panel 123 that displays the number of revolutions of the engine, and so on; and a driving seat 124 disposed above the transmission unit 103.

As shown in FIGS. 26 to 31, the center pillar 113 includes, for example: a supporting member 154 that is coupled to the vehicle body frame 101; a partition 155 whose central part includes an air inlet port 155A for the radiator and that is supported by the supporting member 154; left and right side walls 156 that are coupled to the left and right ends of the partition 155; a supporting plate 157 disposed further rearward relative to the vehicle body than the supporting member 154 and that is coupled to the vehicle body frame 101; and a supporting frame 159 that supports the steering wheel 122 and so on, with left and right supporting walls 158 being interposed therebetween. The center pillar 113 is made of a steel member, and is configured to have a high strength.

The supporting plate 157 is curved into a seat shape, and supports a battery 161 from below, with a bottom plate 160 being interposed therebetween. The supporting frame 159 has a shape that straddles, in the left-right direction, the battery 161 that is supported by the supporting plate 157, so that a first installation space 162 for the battery is formed between the supporting frame 159 and the supporting plate 157. The first installation space 162 is separated by the partition 155 from a second installation space 163 for the prime mover part. The battery 161 is covered by the under panel 121, together with the supporting plate 157, the supporting frame 159, and so on. It is possible to remove the battery 161 from or bringing the battery 161 into the first installation space 162 by removing the under panel 121 from the center pillar 113. In this tractor, with this configuration, the direction in which the battery 161 is removed from the first installation space 162 is set so as to coincide with the rearward direction relative to the vehicle body.

Battery

The bottom plate 160 includes a recessed part 160A for mounting the battery. A front wall portion 160a of this recessed part 160A can receive a lower end portion of a front end 161C of the battery 161. In other words, the bottom plate 160 functions as a receiving member 164 that receives, in the first installation space 162, the end (the front end 161C) of the battery 161 disposed on the upstream side in the direction in which the battery is removed.

This tractor includes a fixing member 165 that fixes the battery 161 at a position between the fixing member 165 and the bottom plate 160. The fixing member 165 includes, for example: left and right rods 166 that are supported on lower parts of left and right frame parts 159A and 159B of the supporting frame 159 so as to be slidable in the top-bottom direction; a supporting member 167 that is provided so as to span the left and right rods 166 and so as to be slidable relative to the left and right rods 166; and left and right nuts 168 that are attached to male screw parts 166A of free ends of the left and right rods 166. The fixing member 165 can be operated to swing between: a fixing position at which the supporting member 167 is in contact with a corner part of a rear upper edge (an upper edge disposed on the downstream side in the direction in which the battery is removed) 161D of the battery 161; and a retracted position at which the supporting member 167 is located rearward of a lower end of the battery 161.

With the above-described configuration, when installing the battery 161 in the first installation space 162, an operator can fix the battery 161 in the first installation space 162 such that the battery 161 is sandwiched between the bottom plate 160 and the supporting member 167 of the fixing member, by bringing the battery 161 that is in the above-described orientation into the first installation space 162, and then performs an operation to fasten the left and right nuts 168 under a condition where the fixing member 165 is located at the fixing position.

As a result, it is possible to prevent fretting, which is a phenomenon in which the contact surfaces of the bottom plate 160 and the battery 161 are damaged due to the battery 161 slightly sliding relative to the bottom plate 160.

Also, when removing the battery 161 from the first installation space 162 in order to perform maintenance on the battery 161, an operator can release the battery 161 from the state of being sandwiched between the bottom plate 160 and the supporting member 167 by performing an operation to unfasten the left and right nuts 168, and can displace the fixing member 165 such that the fixing member 165 swings from the fixing position to the retracted position.

As a result, when the operator removes the battery 161 from or brings the battery 161 into the first installation space 162, it is possible to prevent a problem in which the fixing member 165 hinders the movement of the battery 161.

As the supporting member 167, for example, a steel plate member that has been processed to be insulative, or an insulator that has been formed by using hard resin or the like is employed.

In other words, the supporting member 167 is insulative, and even if a problem in which the supporting member 167 is brought into contact with a positive terminal 161A and a negative terminal 161B of the battery 161 occurs, it is possible to prevent a short circuit from occurring between the terminals due to this contact.

The cross section of a central part of the supporting member 167 in the left-right direction, which is brought into contact with the rear upper edge 161D of the battery 161, is L-shaped such that the central part is brought into surface contact with a corner part of the rear upper edge 161D.

With the above-described configuration, when fixing the battery 161 by using the fixing member 165, it is possible to reliably support the rear upper edge 161D of the battery 161 by using the supporting member 167.

As a result, it is possible to more stably fix and hold the battery 161 between the bottom plate 160 and the supporting member 167 of the fixing member 165.

Swing pivot parts of the left and right rods 166 each includes a pair of anti-separation parts 166B that are formed through swaging processing. Lower parts of the left and right frame parts 159A and 159B of the supporting frame 159 include a pair of attachment holes 159C that have recessed parts 159c that allow the anti-separation parts 166B to pass through predetermined positions.

With the above-described configuration, it is possible to prevent the left and right rods 166 from becoming separated from the supporting frame 159 while reducing costs and improving attachability compared to the case where anti-separation pins or the like are used.

The battery 161 is installed in the first installation space 162 so as to take on a predetermined orientation in which the positive terminal 161A and the negative terminal 161B of the battery 161 are located rearward relative to the vehicle body (downstream in the direction in which the battery is removed) in the first installation space 162.

An upper part of the right frame part 159A of the supporting frame 159, the right frame part 159A being located on the same side as the positive terminal of the battery 161 installed in the first installation space 162, includes a retracted portion 159a disposed further forward relative to the vehicle body than the positive terminal 161A of the battery 161 (upstream of the positive terminal 161A in the direction in which the battery is removed), and that opens a space above the positive terminal 161A in top plan view.

In this way, the supporting frame 159 includes the above-described retracted portion 159a, and therefore, when an operator removes the battery 161 from or brings the battery 161 into the first installation space 162 in order to perform maintenance on the battery 161, even if the operator lifts the battery 161 above the supporting plate, for example, it is possible to avoid the risk of the positive terminal 161A of the battery 161 being brought into contact with the supporting frame 159.

Also, the battery 161 is installed in the first installation space 162 so as to take on the above-described predetermined orientation, and therefore, although the supporting frame 159 includes the above-described retracted portion 159a, the entirety of the supporting frame 159 can be located so as to surround the battery 161 in the first installation space 162 together with the supporting plate 157. With this configuration, it is possible to protect the battery 161 installed in the first installation space 162 by using the supporting plate 157 and the supporting frame 159.

As a result, it is possible to avoid the risk of the positive terminal 161A of the battery 161 being brought into contact with the supporting frame 159 and causing a short circuit when the battery 161 is removed from or brought into the first installation space 162, without impairing the supporting frame 159's function of protecting the battery 161.

An upper part of the left frame part 159B of the supporting frame 159, the left frame part 159B being located on the same side as the negative terminal of the battery 161 installed in the first installation space 162, is located further forward relative to the vehicle body than the negative terminal 161B of the battery 161, and opens a space above the negative terminal 161B in top plan view. The retracted portion 159a is located further forward relative to the vehicle body than the upper part of the left frame part 159B.

In other words, the supporting frame 159 is formed into a shape in which, while the upper part of the supporting frame 159 including the retracted portion 159a is located further rearward relative to the vehicle body than the front end of the battery 161 installed in the first installation space 162, the upper part of the supporting frame 159 is located further forward relative to the vehicle body than the positive terminal 161A and the negative terminal 161B of the battery 161.

With this configuration, the space above the negative terminal 161B of the battery 161 installed in the first installation space 162 is open, and the space above the positive terminal 161A is more widely open than the space above the negative terminal 161B.

As a result, it is easier to remove the battery 161 from or bring the battery into the first installation space 162, and it is possible to more reliably avoid the risk of the positive terminal 161A of the battery 161 being brought into contact with the supporting frame 159 and causing a short circuit when removing the battery 161 from or bringing the battery 161 into the first installation space 162.

Also, for example, when the battery 161 runs out and needs to be jump-started, an operator can remove a power line 169 from the positive terminal 161A and the negative terminal 161B of the battery 161 while maintaining the battery 161 in the state of being installed in the first installation space 162, and the operator can connect the positive terminal 161A and the negative terminal 161B of the battery 161 to the positive terminal or the negative terminal of the battery of a rescue vehicle that is not shown in the drawing, via a booster cable.

In other words, it is possible to improve workability when performing jump-start.

The retracted portion 159a is set so as to have a shape that opens a space on the right side of the positive terminal 161A of the battery 161 when seen from the right side (in the lateral direction that is orthogonal to the direction in which the battery is removed).

A right side portion of an upper part of the left frame part 159B of the supporting frame 159 includes a recessed part 159b disposed further forward relative to the vehicle body than the negative terminal 161B of the battery 161 and that opens a space on the left side of the negative terminal 161B of the battery 161 when seen from the left side (in the lateral direction that is orthogonal to the direction in which the battery is removed).

With the above-described configuration, it is possible to direct the power line 169 that is routed from the front part of the vehicle body (the side that is opposite the direction in which the battery is removed), to the battery 161 in the first installation space 162, via the outside of the supporting frame 159 in the lateral direction, to the positive terminal 161A or the negative terminal 161B of the battery 161 from the outside of the supporting frame 159 in the lateral direction, by bending the power line 169 by a small angle. Thus, it is possible to effortlessly connect the power line 169 to the positive terminal 161A and the negative terminal 161B of the battery 161.

As a result, it is easier to route the power line 169 when connecting the power line 169 to the positive terminal 161A or the negative terminal 161B of the battery 161. Also, it is possible to improve the durability of the power line 169.

The supporting frame 159 is made of a steel plate that is curved into an inverted U shape, and a top plate part 159D of the supporting frame 159 is, in top plan view, formed into a crank shape that includes the retracted portion 159a.

With this configuration, it is possible to easily obtain the supporting frame 159 that includes the retracted portion 159a and that has a shape that straddles the battery 161, by using press processing. Also, it is possible to reduce the weight of the supporting frame 159.

Other Embodiments Modified from Second Embodiment

[1] The following configurations may be work vehicle may be employed in the work vehicle.

For example, the work vehicle may be configured as a semi-crawler vehicle that includes left and right crawlers instead of the left and right rear wheels 105B.

For example, the work vehicle may be configured as a full crawler work vehicle that includes left and right crawlers instead of the left and right front wheels 105A and the left and right rear wheels 105B.

For example, the work vehicle may be provided with an air-cooled type engine 115.

For example, the work vehicle may be configured as an electrical work vehicle that includes an electrical motor instead of the engine 115.

For example, the work vehicle may be configured as a hybrid work vehicle that includes the engine 115 and an electrical motor.

For example, the work vehicle may be provided with an exhaust processing apparatus having a diesel particulate filter (DPF).

For example, the work vehicle may be configured such that the hood 106 is provided on the rear part side of the vehicle body frame 101.

For example, the work vehicle may be configured without the front guard 107.

[2] The positions of the supporting plate 157, the supporting frame 159, and the battery 161 may be variously modified.

For example, the supporting plate 157, the supporting frame 159, and the battery 161 may be located in a front end of the work vehicle, or a rear end of the work vehicle.

For example, the supporting plate 157, the supporting frame 159, and the battery 161 may be located in one of left and right side parts of the work vehicle.

[3] The configuration of the supporting plate 157 may be variously modified.

For example, the supporting plate 157 may directly support the battery 161 from below, without the bottom plate 160 interposed therebetween.

For example, the supporting plate 157 may also serve as the receiving member 164.

[4] The configuration of the supporting frame 159 may be variously modified.

For example, the supporting frame 159 may be individually provided in the vehicle body frame 101 independent of the center pillar 113.

For example, the supporting frame 159 may be provided with, for example, a pair of supporting pillar members, a coupling member that is orientated in the lateral direction and couples upper ends of the pair of supporting pillars, and formed in an inverted U shape or an H shape that straddles the battery 161.

For example, the supporting frame 159 may be configured such that an upper end of the frame part 159B disposed on the same side as the negative terminal of the battery 161 is located above the negative terminal 161B.

For example, the supporting frame 159 may be provided with the retracted portion 159a such that, in top plan view, an upper end (the top panel part 159D) of the supporting frame 159 has an inclined straight line shape that obliquely spans the position disposed above the negative terminal 161B of the battery 161 and a position disposed upstream of the positive terminal 161A in the direction in which the battery is removed.

For example, in a lateral view in a direction that is orthogonal to the direction in which the battery is removed, the supporting frame 159 may have a shape that does not open a space on the lateral side of the positive terminal 161A of the battery 161.

For example, in a lateral view in a direction that is orthogonal to the direction in which the battery is removed, the supporting frame 159 may have a shape that does not open a space on the lateral side of the negative terminal 161B of the battery 161.

[5] The positions of the retracted portion 159a and the recessed part 159b of the supporting frame 159 may be changed according to the orientation in which the battery 161 is installed.

For example, if the battery 161 is installed in an orientation in which the positive terminal 161A is located on the left side of the vehicle body and the negative terminal 161B is located on the right side of the vehicle body, the retracted portion 159a is to be provided for the left frame part of the supporting frame 159, i.e. the frame part 159A on the positive terminal side in this case, and the recessed part 159b is to be provided for the right frame part of the supporting frame 159, i.e. the frame part 159B on the negative terminal side in this case.

For example, if the battery 161 is installed in an orientation in which the positive terminal 161A is located on the front side of the vehicle body and the negative terminal 161B is located on the rear side of the vehicle body, the retracted portion 159a is to be provided for the front frame part of the supporting frame 159, i.e. the frame part 159A on the positive terminal side in this case, and the recessed part 159b is to be provided for the rear frame part of the supporting frame 159, i.e. the frame part 159B on the negative terminal side in this case.

[6] The direction in which the battery 161 is removed from the installation space (the first installation space 162) for the battery may be changed to the forward direction relative to the vehicle body, the rightward direction relative to the vehicle body, the leftward direction relative to the vehicle body, or the like, depending on the position of the battery 161.

Also, the lateral view in a direction that is orthogonal to the direction in which the battery is removed is changed as the direction in which the battery 161 is removed is changed. For example, the lateral view is changed to a front view and a rear view when the direction in which the battery is removed is changed to the rightward direction relative to the vehicle body and the leftward direction relative to the vehicle body, respectively.

[7] The configuration of the receiving member 164 may be variously modified.

For example, the receiving member 164 may also serve as the supporting member 154, the partition 155, or the like.

For example, the receiving member 164 may be a dedicated member that is supported by the supporting plate 157, the bottom plate 160, or the like.

For example, the receiving member 164 may be configured to receive the entirety of the end portion of the battery 161 disposed upstream in the direction in which the battery is removed (the front end 161C) in the installation space (the first installation space 162) for the battery.

[8] The fixing member 165 may be configured such that, when the fixing member 165 is located at the fixing position, the supporting member 167 is in surface contact with an upper surface of the upper edge 161D of the battery 161 disposed downstream in the direction in which the battery is removed, or a vertical surface disposed downstream in the direction in which the battery is removed (e.g. the rear surface of the battery 161 in the above-described embodiment).

[9] The work vehicle according to the second embodiment is not limited to a tractor, and may be a tractor, a front loader, a mower, a rice transplanter, a combine, a wheel loader, a backhoe, or the like that includes a supporting plate that supports a battery from below and a supporting frame by which an installation space for the battery is provided between the supporting frame and the supporting plate.

What is claimed is:

1. A work vehicle comprising:
   a vehicle body frame;
   a prime mover unit disposed in a front part of a vehicle body;
   a driving part disposed in a rear part of the vehicle body; and
   a battery disposed between the prime mover unit and the driving part:
   the vehicle body frame including:
     a base frame disposed in a lower part of the vehicle body; and
     a center pillar disposed between the prime mover unit and the driving part, the center pillar extending upward from the base frame;
   the prime mover unit including a radiator disposed immediately forward of the center pillar;
   the driving part including a steering wheel disposed above the battery; and
   the center pillar including:
     a partition that is made of a steel plate, the partition dividing a storage space, formed in the front part of the vehicle body, fore and aft into a first space adjacent the prime mover unit and a second space adjacent the battery;
     a first supporting member that is made of a steel plate and supports the partition from below;
     a second supporting member that is made of a steel plate and supports the radiator from below;
     a third supporting member that is made of a steel plate and supports the steering wheel; and
     a mounting platform that is made of a steel plate and on which the battery is mounted,
   the partition, the first supporting member, the second supporting member, the third supporting member and the mounting platform being configured as an integrated structure by welding.

2. The work vehicle according to claim 1, wherein the mounting platform has a front end thereof extending forward of the first supporting member to serve as the second supporting member.

3. The work vehicle according to claim 1, wherein the partition includes a frame shape with a central portion thereof forming an air inlet port for the radiator, the partition further including an extension part that is bent to extend rearward from an upper edge of an inner peripheral edge of the partition, the inner peripheral edge defining the air inlet port, and the third supporting member has an upper part thereof welded to the extension part.

4. The work vehicle according to claim 3, wherein the third supporting member is located rearward of the air inlet port and has an attachment orientation in which flat surfaces of the third supporting member do not face the air inlet port.

5. The work vehicle according to claim 3, wherein the center pillar includes a fourth supporting member that is made of a steel plate, the fourth supporting member supporting the third supporting member while being supported by the base frame, the fourth supporting member is curved into an inverted U shape to straddle the battery in a left-right direction, the fourth supporting member having an attachment orientation in which flat surfaces of the fourth supporting member do not face the air inlet port, and the third supporting member has a lower end thereof welded to an upper surface of the fourth supporting member.

6. The work vehicle according to claim 5, wherein the fourth supporting member is formed asymmetrical in the left-right direction, one of left/right upper parts of the fourth supporting member adjacent positive terminal of the battery being located more forward relative to the vehicle body, than the other of the left/right upper parts of the fourth supporting member adjacent the negative terminal.

7. The work vehicle according to claim 5, wherein the vehicle body frame includes a fixing mechanism that fixes the battery on the mounting platform, the fixing mechanism including:
left and right rods that are supported by left and right side parts of the fourth supporting member so as to be swingable in a top-bottom direction;
a pressing member that spans the left and right rods so as to be slidable relative to the left and right rods; and
left and right nuts that are attached to male screw parts formed on respective free ends of the left and right rods, and the pressing member being swingable between: a fixing position at which the pressing member comes into contact with a corner part of a front end upper part of the battery; and a retracted position at which the pressing member goes rearward of a lower end of the battery.

8. The work vehicle according to claim 5, wherein the center pillar includes a fifth supporting member that is made of a steel plate and that rotatably support a swing pivot shaft that is provided at a lower part of an accelerator lever integrally with the lower part, the swing pivot shaft has a small diameter part that is formed on an end of the swing pivot shaft and a large diameter part disposed adjacent to the small diameter part, the fifth supporting member is curved into a U-shape such that a first supporting plate part thereof for rotatably supporting the small diameter part is faced to a second supporting plate part thereof for rotatably supporting the large diameter part, the fifth supporting member being welded to lateral outer surfaces of the third supporting member, the first supporting plate part includes a round hole into which the small diameter part is inserted, the second supporting plate part includes a first recessed part into which the large diameter part is inserted, the first recessed part includes: a hole-shaped part that has the substantially same diameter as the large diameter part; and a slit part that spans one end edge of the second supporting plate part and the hole-shaped part, and the slit part has a slit width thereof with substantially the same dimension as a diameter of the small diameter part for receiving the small diameter part.

9. The work vehicle according to claim 8, wherein the swing pivot shaft includes a friction type holding mechanism that holds the accelerator lever at a desired operation position, the holding mechanism includes:
a male screw portion that is formed on the small diameter part;
a receiving member that is fixed to a predetermined position on the small diameter part;
an elastic member fitted onto the small diameter part between the receiving member and the first supporting plate part;
a nut that is attached to the male screw portion; and
a tube-shaped spacer that is located between the receiving member and the nut for setting a fastening limitation position of the nut.

10. The work vehicle according to claim 8, further comprising:

a constant speed setting lever disposed adjacent to the accelerator lever, wherein the swing pivot shaft for the accelerator lever is set to be orientated in a top-bottom direction, and the accelerator lever includes a swing arm that extends from the swing pivot shaft to an outside of the fifth supporting member in a lateral direction, and that is linked with a speed control lever of the prime mover unit, the fifth supporting member is set such that the first supporting plate part is located on a lower side, the second supporting plate part is located on an upper side, and an intermediate plate part that spans the first supporting plate part and the second supporting plate part is located at a rear end of the fifth supporting member, the first supporting plate part includes the round hole a rear part thereof; and at positions forward of the round hole, the first supporting plate part further includes: a stopper that receives the swing arm at a forward idling position; and a second recessed part that allows arrangement of the constant speed setting lever between the round hole and the stopper, the second supporting plate part includes the first recessed part at a rear part thereof, and at a position rearward of the first recessed part, the second supporting plate further includes a guide hole for restricting movement of the constant speed setting lever, and the intermediate plate part includes a third recessed part that allows displacement of the swing arm to a retracted position that is set at a position rearward of the swing pivot shaft.

11. The work vehicle according to claim 3, wherein the center pillar includes a reinforcing member that is made of a steel plate, and spans the first supporting member and the third supporting member such that the reinforcing member has an attachment orientation in which flat surfaces of the reinforcing member do no face the air inlet port, and a lower end of the reinforcing member is welded to the first supporting member, and an upper end of the reinforcing member is welded to the third supporting member.

12. The work vehicle according to claim 3, wherein the radiator includes a dust proof net at a rear part thereof, the dust proof net being configured to be removable upward from the radiator, and
the partition includes a guide part that guides dust fallen downward from the dust proof net to a position below the radiator, the guide part being curved so as to have a rearward-lifted orientation in which the guide part extends from a lower edge of the inner peripheral edge in a rearward and upward direction.

13. The work vehicle according to claim 1, further comprising:
a transmission unit disposed in the rear part of the vehicle body; and
a power transmission shaft that extends below the radiator and transmits power from an output part of the prime mover unit to an input part of the transmission unit
wherein the center pillar includes left and right leg parts that are supported by a top panel of the base frame, and a space for extending power transmission shaft is formed between the center pillar and the top panel,
the top panel has a front part thereof located below the radiator, an opening being formed in the front part for allowing entrance of the power transmission shaft when the power transmission shaft is attached or removed, and
the mounting platform includes a recessed part extending forward from a rear end of the mounting platform for allowing entrance of the power transmission shaft when the power transmission shaft is attached or removed.

14. The work vehicle according to claim 1, further comprising:
a tilt unit that supports the steering wheel such that the steering wheel is swingable in a top-bottom direction, wherein the tilt unit includes:
a swing member that swings integrally with the steering wheel about a first pivot shaft that is orientated in a left-right direction;
a gas spring that assists an operation to swing the swing member; and
an operation lever that is operated between a lock position at which the swing member is prevented from swinging in the top-bottom direction, and an unlock position at which the swing member is allowed to swing in the top-bottom direction, and
the third supporting member includes:
a first supporting part that supports the swing member, with the first pivot shaft being interposed therebetween;
a pivot shaft that is orientated in the left-right direction and supports one end of the gas spring such that the one end of the gas spring is relatively swingable; and
a second supporting part that supports the operation lever such that the operation lever is swingable.

15. The work vehicle according to claim 14, wherein the operation lever is supported by the first pivot shaft so as to be relatively swingable.

16. The work vehicle according to claim 14, further comprising:
a power steering unit of a hydraulic type,
wherein the power steering unit includes:
a hydraulic control part that is supported by the swing member;
a hydraulic hose that is connected to the hydraulic control part; and
a hydraulic pipe that is made of metal and is connected to the hydraulic hose, and
the center pillar has a holder at a lower end thereof, the holder being made of rubber and holding the hydraulic pipe.

17. The work vehicle according to claim 16, wherein the center pillar includes a mounting part at the lower end thereof, the mounting part defining a positioning elongated hole, and
the holder includes a fitting hole in an upper surface thereof for receiving the hydraulic pipe from above, and
the holder further includes a protrusion on a bottom surface thereof to be fitted into the elongated hole from above.

18. The work vehicle according to claim 1, wherein the center pillar includes left and right side walls that are each made of a steel plate and are located on left and right sides of the partition, and
lower ends of the left and right side walls are welded to the first supporting member,
and inner surfaces of the left and right side walls are welded to lateral ends of the partition.

19. The work vehicle according to claim 18, further comprising:
an under panel that is U-shaped in top plan view and covers the battery from behind,
wherein the left and right side walls of the center pillar include left and right positioning members welded respectively thereto, each of the left and right positioning members being made of a steel plate and curved into a U-shape to form a vertically elongated slit between the left/right positioning member and an outer surface of the left/right side wall, and
the under panel includes vertically elongated insertion parts at left and right front ends thereof, each of the insertion parts being inserted into the slit associated therewith.

20. The work vehicle according to claim 19, wherein upper ends of the left and right positioning members are inclined in a rearward-lifted orientation, lower ends of the left and right positioning members are inclined in a rearward-lowered orientation, and inner surfaces of the upper ends and inner surfaces of the lower ends are formed as first guide surfaces that guide and position the insertion parts in a top-bottom direction.

21. The work vehicle according to claim 19, wherein intermediate parts of the left and right positioning members are inclined so as to be gradually separated from the side walls in a rearward direction, and inner surfaces of the intermediate parts are formed as second guide surfaces that guide and position the insertion parts in a left-right direction.

22. The work vehicle according to claim 18, further comprising:
a hood that swings in the top-bottom direction between a closed position at which the hood covers the prime mover unit, and an open position at which the hood exposes the prime mover unit to an outside,
wherein the left and right side walls are inclined rearward such that front end edges of the left and right side walls are inclined rearward relative to the vehicle body, in an upward direction,
left and right inner surfaces of the hood each includes a seal supporting part, the left and right seal supporting parts have rear end edges that are inclined rearward by an inclination angle that is the same as an inclination angle of front end edges of the left and right side walls and face the left and right front end edges when the hood is at the closed position, and the left and right rear end edges include left and right sealing members that span upper ends and lower ends of the left and right front end edges and that are brought into linear contact with the left and right front end edges when the hood is at the closed position.

23. The work vehicle according to claim 22, wherein the center pillar includes left and right guide plates that extend forward from the left and right side walls, and the left and right guide plates are formed so as to be brought into contact with the left and right inner surfaces of the hood, respectively, and guide the hood to a predetermined position in the left-right direction when the hood is operated to close.

24. The work vehicle according to claim 22, further comprising:

an upper panel that covers an upper part of the center pillar from above, wherein a front end of the upper panel is covered from above by a rear end of the hood at the closed position, and an upper part of the partition of the center pillar is in internal contact with the front end of the upper panel.

25. The work vehicle according to claim 22, further comprising:

a lock mechanism that fixes and holds the hood at the closed position, wherein the lock mechanism includes:

a hook member that swings between a lock position and an unlock position;

a spring that biases the hook member to return to the lock position;

an operation rod that allows the hook member to be operated to swing to the unlock position against the force of the spring; and a rod on which the hook member at the lock position catches, wherein the partition has an upper end thereof a third supporting part that supports the hook member and the spring, and a fourth supporting part that operably supports the operation rod.

26. The work vehicle according to claim 25, wherein the fourth supporting part includes a coupling part to which an upper panel that covers an upper part of the center pillar from above is coupled, the coupling part being formed integrally with the fourth supporting part.

27. The work vehicle according to claim 25, wherein the center pillar includes a fifth supporting part that supports an electrical component that is provided in a vicinity of the center pillar.

28. The work vehicle according to claim 18, further comprising:

a hood that swings in the top-bottom direction between a closed position at which the hood covers the prime mover unit, and an open position at which the hood exposes the prime mover unit to an outside, wherein the hood include left and right leaf springs on left and right inner surfaces thereof spanning upper ends and lower ends of the left and right side walls, to be brought into surface contact with outer surfaces of the left and right side walls, respectively, when the hood is at the closed position, and the left and right leaf springs are formed such that rear end edges of the left and right leaf springs are inclined laterally outward relative to the vehicle body, in a rearward direction, respectively.

29. The work vehicle according to claim 1, further comprising:

a cooling fan disposed immediately forward of the radiator;

an air cleaner disposed forward of the radiator and above the cooling fan; and a fan shroud that spans the partition and the cooling fan, wherein the fan shroud has an upper part thereof an air passage forming part for forming an air passage between the upper part of the fan shroud and an upper part of the partition, the partition has, at one of left and right ends of an upper part thereof, an air passage hole that is formed to allow air to flow into the air passage, and the air passage forming part has, at the other of the left/right ends thereof disposed opposite the air passage hole in a left-right direction of the vehicle body, a connection hole that is formed to connect the air passage to an air intake part of the air cleaner.

30. The work vehicle according to claim 29, further comprising:

an air intake port that allows air to be taken into the storage space from a foot space of the driving part, wherein the partition includes a sound isolation wall that is formed so as to be curved and extend in a rearward and upward direction from a lower edge of an inner peripheral edge of the partition, the inner peripheral edge defining the air passage hole.

31. A work vehicle comprising:

a supporting plate that supports a battery from below; and a supporting frame that has a shape that straddles the battery to form an installation space for installing the battery between the supporting frame and the supporting plate;

wherein the battery is located in the installation space so as to have a predetermined orientation in which a positive terminal and a negative terminal of the battery are located downstream in a direction in which the battery is removed from the installation space;

the supporting frame includes a frame part located on the same side as the positive terminal of the battery when the battery is installed in the installation space; and an upper part of the frame part has a retracted portion that is formed upstream of the positive terminal in the direction in which the battery is removed, the retracted portion opening a space above the positive terminal in top plan view, wherein the supporting frame has a second frame part that is located on the same side as the negative terminal of the battery when the battery is installed in the installation space; and an upper part of the second frame part is located upstream of the negative terminal in the direction in which the battery is removed, and opens a space above the negative terminal in top plan view, and the retracted portion is located upstream of the upper part of the second frame part in the direction in which the battery is removed.

32. The work vehicle according to claim 31, wherein the retracted portion is shaped to open a space on a lateral side of the positive terminal when seen in a lateral direction that is orthogonal to the direction in which the battery is removed, and the supporting frame has a second frame part that is located on the same side as the negative terminal of the battery when the battery is installed in the installation space; and the second frame part includes a recessed part at a lateral portion thereof for opening a space on a lateral side of the negative terminal when seen in the lateral direction, the recessed part being formed upstream of the negative terminal in the direction in which the battery is removed.

33. The work vehicle according to claim 31, wherein the supporting frame is made of a steel plate that is curved into an inverted U shape, and a top plate part of the supporting frame is formed into a crank shape that includes the retracted portion.

34. The work vehicle according to claim 31, further comprising:
- a receiving member that receives an end of the battery in the installation space located on an upstream side in the direction in which the battery is removed; and
- a fixing member that fixes the battery at a position between the fixing member and the receiving member,
- wherein the fixing member includes a supporting member having an insulating property, the supporting member supporting an upper edge of the battery located on a downstream side in the direction in which the battery is removed.

* * * * *